(12) United States Patent
Wu et al.

(10) Patent No.: US 12,074,752 B2
(45) Date of Patent: Aug. 27, 2024

(54) METHOD AND APPARATUS FOR TRANSMITTING AND RECEIVING DATA IN A WIRELESS COMMUNICATION SYSTEM

(71) Applicant: Samsung Electronics Co., Ltd., Suwon-si (KR)

(72) Inventors: Min Wu, Beijing (CN); Jingxing Fu, Beijing (CN); Yi Wang, Beijing (CN); Feifei Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 17/609,943

(22) PCT Filed: May 15, 2020

(86) PCT No.: PCT/KR2020/006444
§ 371 (c)(1),
(2) Date: Nov. 9, 2021

(87) PCT Pub. No.: WO2020/235884
PCT Pub. Date: Nov. 26, 2020

(65) Prior Publication Data
US 2022/0217756 A1 Jul. 7, 2022

(30) Foreign Application Priority Data

May 17, 2019 (CN) .......................... 201910412965.4
May 17, 2019 (CN) .......................... 201910413475.6
(Continued)

(51) Int. Cl.
*H04L 5/00* (2006.01)
*H04L 1/1812* (2023.01)
(Continued)

(52) U.S. Cl.
CPC ........ *H04L 27/2636* (2013.01); *H04L 1/1812* (2013.01); *H04L 5/0055* (2013.01);
(Continued)

(58) Field of Classification Search
CPC . H04L 27/2636; H04L 1/1812; H04L 5/0055; H04L 27/2602; H04L 27/2613;
(Continued)

(56) References Cited

U.S. PATENT DOCUMENTS 9,332,582 B2 5/2016 Ulupinar et al.
11,412,503 B2 8/2022 Chen et al.
(Continued)

FOREIGN PATENT DOCUMENTS

CN 102948249 A 2/2013
CN 103298118 A 9/2013
(Continued)

OTHER PUBLICATIONS

VIVO; Further Discussion on Multi-TRP Transmission; 3GPP TSG RAN WG1 #96bis; R1-1904096; Apr. 8-12, 2019; Xi'an, China (Year: 2019).*
(Continued)

*Primary Examiner* — Lan-Huong Truong
(74) *Attorney, Agent, or Firm* — Jefferson IP Law, LLP

(57) ABSTRACT

A terminal and a base station in a wireless communication system and a method performed by the terminal and the base station are disclosed. According to an embodiment, the method performed by the terminal in the wireless communication system comprises: receiving a physical downlink control channel (PDCCH), the PDCCH including downlink control information (DCI) for scheduling one or more physical downlink shared channels (PDSCHs); receiving the PDSCHs according to the DCI; and transmitting a hybrid
(Continued)

automatic repeat request acknowledgement (HARQ-ACK/NACK) codebook for the PDSCHs.

14 Claims, 29 Drawing Sheets

(30) Foreign Application Priority Data

May 17, 2019 (CN) .......................... 201910413483.0
Oct. 12, 2019 (CN) .......................... 201910969304.1

(51) Int. Cl.
*H04L 27/26* (2006.01)
*H04W 72/23* (2023.01)

(52) U.S. Cl.
CPC ...... *H04L 27/2602* (2013.01); *H04L 27/2613* (2013.01); *H04W 72/23* (2023.01); *H04L 27/26035* (2021.01); *H04L 27/26136* (2021.01)

(58) Field of Classification Search
CPC ......... H04L 27/26035; H04L 27/26136; H04L 1/1861; H04L 1/0001; H04L 1/1614; H04L 1/1896; H04L 5/001; H04L 5/0091; H04L 5/0044; H04L 5/0051; H04L 27/2607; H04W 72/23; H04W 72/20; H04W 52/346; H04W 52/367; H04W 72/1273
See application file for complete search history.

(56) References Cited

U.S. PATENT DOCUMENTS

| | | | | |
|---|---|---|---|---|
| 2017/0134140 | A1* | 5/2017 | Park | H04B 7/0413 |
| 2018/0042015 | A1* | 2/2018 | Yin | H04W 72/23 |
| 2018/0205504 | A1* | 7/2018 | Lyu | H04L 5/0055 |
| 2019/0103943 | A1 | 4/2019 | Wang et al. | |
| 2021/0159948 | A1* | 5/2021 | Li | H04L 1/0023 |
| 2022/0000503 | A1 | 1/2022 | Ma | |

FOREIGN PATENT DOCUMENTS

| | | |
|---|---|---|
| CN | 105471567 A | 4/2016 |
| CN | 108401284 A | 8/2018 |
| CN | 109565817 A | 4/2019 |
| WO | 2012/130088 A1 | 10/2012 |
| WO | 2018/085701 A1 | 5/2018 |
| WO | 2018/143778 A1 | 8/2018 |
| WO | 2019/052455 A1 | 3/2019 |

OTHER PUBLICATIONS

ZTE et al.; Discussion on scheduling and HARQ for NR-U; 3GPP TSG RAN WG1 #97; R1-1905953; May 13-17, 2019; Reno, USA.
VIVO; Further Discussion on Multi-TRP Transmission; 3GPP TSG RAN WG1 #96bis; R1-1904096; Apr. 8-12, 2019; Xi'an, China.
Wilus Inc.; On UCI enhancement for NR URLL; 3GPP TSG RAN WG1 #97; R1-1907385; May 13-17, 2019; Reno, USA.
Samsung; Cross-carrier Scheduling with Different Numerologies; 3GPP TSG RAN WG1 #96bis; R1-1904399; Apr. 8-12, 2019; Xi'an, China.
European Search Report dated Jul. 14, 2022; European Appln. No. 20809994.5-1213 / 3949243 PCT/KR2020006444.
Geng et al.; A Pilot-Aided Channel Estimation Scheme for DFT Spread Generalized Multi-carrier System; Journal of Shanghai Jiaotong University; vol. 42 No. 4; Apr. 2008.
Jianming et al.; A Novel Resource Allocation Algorithm for the LTE-A Uplink; Microcomputer Applications; vol. 33, No. 8; 2017.
Chinese Office Action dated Apr. 28, 2023; Chinese Appln No. 201910969304.1.
Sierra Wireless; Ack Bundling Design Considerations; 3GPP TSG RAN WG1 Meeting #87; R1-1612380; Nov. 14-18, 2016; Reno, USA.
European Search Report dated Apr. 12, 2022; European Appln. No. 20809994.5-1213 / 3949243 PCT/KR2020006444.
LG Electronics, DCI format for UL non-contiguous resource allocation, R1-101351, 3GPP TSG RAN WG1 #60, Feb. 16, 2010.
Chinese Office Action dated Mar. 6, 2024, issued in Chinese Patent Application No. 201910969304.1.

* cited by examiner

METHOD AND APPARATUS FOR TRANSMITTING AND RECEIVING DATA IN A WIRELESS COMMUNICATION SYSTEM

TECHNICAL FIELD

The present disclosure relates to a field of wireless communication technology, and in particular to a communication method and device in a wireless communication network, a method for receiving data, a method for transmitting data, and a method for receiving a reference signal and a method and device for PDSCH resource allocation in an M-DFT-S-OFDM-based high-frequency communication system.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

A method performed by a terminal in a wireless communication system is disclosed. The method comprises receiving a physical downlink control channel (PDCCH), the PDCCH including downlink control information (DCI) for scheduling one or more physical downlink shared channels (PDSCHs), receiving the PDSCHs according to the DCI and transmitting a hybrid automatic repeat request acknowledgement (HARQ-ACK/NACK) codebook for the PDSCHs.

BEST MODE FOR CARRYING OUT THE INVENTION

Figure 1:
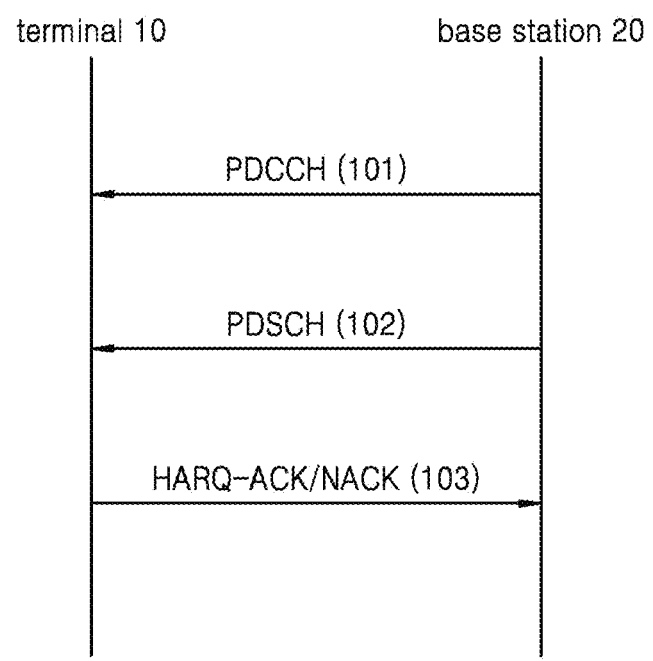
FIG. 1 schematically illustrates a signal flow transmitted between a terminal and a base station according to an embodiment of the present disclosure.

In an aspect, a method performed by a terminal in a wireless communication network is provided, the method comprising: receiving a physical downlink control channel (PDCCH), the PDCCH including downlink control information (DCI) for scheduling one or more physical downlink shared channels (PDSCHs); receiving the PDSCHs according to the DCI; and sending a hybrid automatic repeat request acknowledgement (HARQ-ACK/NACK) codebook for the PDSCHs.

In an exemplary embodiment, the DCI includes a downlink assignment index (DAI), and in a situation where one DCI schedules a plurality of PDSCHs, the DAI indicates information for a first PDSCH of the plurality of PDSCHs, or indicates information for a last PDSCH of the plurality of PDSCHs.

In an exemplary embodiment, the DCI includes the downlink assignment index (DAI), and in a situation where a plurality of PDSCHs scheduled by one PDCCH belong to one or more PDSCH groups, the DAI includes one or more DAI bit fields, and each of the DAI bit fields respectively corresponds to DAI information of one PDSCH group.

In an exemplary embodiment, before sending the HARQ-ACK/NACK codebook, the method further comprises: grouping, for a plurality of PDSCHs fed back in the HARQ-ACK/NACK codebook, the PDSCHs according to a DCI format of the DCI for scheduling each of the PDSCHs, wherein PDSCHs scheduled by DCI of a given DCI format belong to a given PDSCH group; and determining the codebook for each PDSCH group.

In an exemplary embodiment, the method further comprises: grouping, for a plurality of PDSCHs that are fed back in the HARQ-ACK/NACK codebook, the PDSCHs according to a number of PDSCHs scheduled by each DCI for scheduling the plurality of PDSCHs, wherein a PDSCH scheduled by such DCI that schedules PDSCHs, a number of which is greater than a threshold value, and a PDSCH scheduled by such DCI that schedules PDSCHs, a number of which is less than or equal to the threshold value, belong to different PDSCH groups; and determining the codebook for each PDSCH group.

In an exemplary embodiment, before sending the HARQ-ACK/NACK codebook, the method further comprises: grouping, for a plurality of PDSCHs that are fed back in the HARQ-ACK/NACK codebook, the PDSCHs according to a transmission granularity, wherein PDSCHs having a given transmission granularity belong to a given PDSCH group, and PDSCHs having different transmission granularityies belong to different PDSCH groups, or PDSCHs having different granularityies belong to a given PDSCH group determined according to a transmission granularity of a reference PDSCH; and determining the codebook for each PDSCH group.

In an exemplary embodiment, determining the codebook for each PDSCH group comprises: determining the HARQ-ACK/NACK codebook for the each PDSCH group according to a DAI of a PDSCH in the each PDSCH group and a number of bits of a HARQ-ACK/NACK corresponding to each PDSCH in the each PDSCH group.

In an exemplary embodiment, the DCI comprises a downlink assignment index (DAI) for counting the PDCCHs, and a number of bits of a HARQ-ACK/NACK corresponding to one PDCCH $N_t = N_{max\_p} \times N_{max\_pdsch}$, a total number of bits of the sent HARQ-ACK/NACK codebook $M \times N_t = M \times N_{max\_p} \times N_{max\_pdsch}$, where $N_{max\_p}$ is a number of bits of a HARQ-ACK/NACK of each PDSCH, $N_{max\_pdsch}$ is a maximum number of PDSCHs scheduled by the one PDCCH and belonging to a given PDSCH group, and M is a value of the DAI in the PDSCH group.

In an exemplary embodiment, the DCI comprises a downlink assignment index (DAI) for counting a PDSCH, the DAI indicates information on a last PDSCH of the PDSCHs scheduled by the DCI, and a total number of bits of the sent HARQ-ACK/NACK codebook is $M \times N_{max\_p}$, where $N_{max\_p}$ is a number of bits of a HARQ-ACK/NACK of each PDSCH, and M is a value of the DAI in a PDSCH group.

In an exemplary embodiment, the DCI comprises a downlink assignment index (DAI) for counting the PDCCHs, and a total number of bits of the sent HARQ-ACK/NACK codebook is $M \times N_t$, where M is a value of the DAI in a PDSCH group, $N_t$ is a number of bits of a HARQ-ACK/NACK corresponding to one PDCCH, and wherein $N_t$ is predefined or semi-statically configured, and $N_t$ is not less than a sum $\Sigma_{i=0}^{X} Ni$ of numbers of bits of the HARQ-ACK/NACKs of the PDSCHs scheduled by the one PDCCH, wherein Ni is a number of bits of the HARQ-ACK/NACK of an i-th PDSCH scheduled by the one PDCCH.

In an exemplary embodiment, where $N_{max\_p}$ is the number of the bits of the HARQ-ACK/NACK of the each PDSCH and $N_{r\_p}$ is a number of effective bits of the HARQ-ACK/NACK of the each PDSCH, a value of the effective bits of the HARQ-ACK/NACK is determined according to decoding result of the PDSCH, and a value of remaining ($N_{max\_p} - N_{r\_p}$) bits of the HARQ-ACK/NACK is determined according a predefined value if $N_{r\_p}$ is less than $N_{max\_p}$; and/or, where a number of bits of a HARQ-ACK/NACK corresponding to each PDCCH is $N_t = N_{max\_p} \times N_{max\_pdsch}$ and $N_{pdsch}$ is a number of PDSCHs scheduled by the each PDCCH, a value of a HARQ-ACK/NACK of $N_{max\_p} \times N_{pdsch}$ bits is determined according to a decoding result of $N_{pdsch}$ PDSCHs, and a value of remaining $N_{max\_p} \times (N_{max\_pdsch} - N_{pdsch})$ bits of the HARQ-ACK/NACK is determined according a predefined value, and a value of a HARQ-ACK/NACK of $N_{max\_p} \times N_{pdsch}$ bits is determined according to a decoding result of $N_{pdsch}$ PDSCHs if $N_{max\_p} \times N_{pdsch}$ is less than $N_t$.

In an exemplary embodiment, the DCI comprises zero power channel state information reference signal (ZP CSI-RS) information, wherein in a situation where one DCI schedules a plurality of PDSCHs, the method further comprises performing rate matching on the plurality of PDSCHs according to the ZP CSI-RS information.

In an exemplary embodiment, performing the rate matching on the plurality of PDSCHs according to the ZP CSI-RS information comprises at least one of: performing the rate matching on each of the PDSCHs according to the ZP CSI-RS information, performing the rate matching on a PDSCH of each downlink time unit according to the ZP CSI-RS information, performing the rate matching only on a first PDSCH according to the ZP CSI-RS information, performing the rate matching on a PDSCH only in a scheduled first time unit according to the ZP CSI-RS information, or performing the rate matching on a PDSCH overlapping the ZP CSI-RS information according to the ZP CSI-RS information.

In an exemplary embodiment, the DCI comprises control channel resource set (CORESET) information, wherein, for DCI for scheduling a plurality of PDSCHs, the CORESET information comprises a plurality of CORESETs.

In an exemplary embodiment, receiving the PDSCHs by the DCI further comprises: receiving a demodulation reference signal (DMRS) of the PDSCHs according to the DCI, and receiving the PDSCHs according to the DMRS, wherein the DCI indicates a pattern of the DMRS, and the pattern of the DMRS includes one or more of period information, time offset information, a durationduration and a symbol index.

In an exemplary embodiment, the receiving the PDSCHs according to the DCI futher comprises: receiving the demodulation reference signal (DMRS) of the PDSCHs according to the DCI, and receiving the PDSCHs according to the DMRS, wherein the DCI indicates position information of the DMRS, and the position information of the DMRS is determined by time domain information of each PDSCH; or the position information on the DMRS is determined by time domain information on all the PDSCHs scheduled by DCI of one PDCCH.

The present disclosure further provides a terminal performing the above method.

According to another aspect, a method performed by a base station in a wireless communication network is provided, the method comprising: sending a physical downlink control channel (PDCCH), the PDCCH including downlink control information (DCI) for scheduling one or more physical downlink shared channels (PDSCHs); sending the PDSCHs according to the DCI; and receiving a hybrid automatic repeat request acknowledgement (HARQ-ACK/NACK) codebook for the PDSCHs.

In an exemplary embodiment, the DCI comprises a downlink assignment index (DAI), and in a situation where one DCI schedules a plurality of PDSCHs, the DAI indicates information on a first PDSCH of the plurality of PDSCHs, or indicates information on a last PDSCH of the plurality of PDSCHs.

In an exemplary embodiment, the DCI comprises a downlink assignment index (DAI), and in a situation where a plurality of PDSCHs scheduled by one PDCCH belong to one or more PDSCH groups, the DAI comprises one or more DAI bit fields, and each of the DAI bit fields respectively corresponds to DAI information of one PDSCH group.

In an exemplary embodiment, the DCI comprises a downlink assignment index (DAI) for counting the PDCCHs, and a number of bits of a HARQ-ACK/NACK corresponding to the one PDCCH $N_t = N_{max\_p} \times N_{max\_pdsch}$, a total number of bits of the received HARQ-ACK/NACK codebook $M \times N_t = M \times N_{max\_p} \times N_{max\_pdsch}$, where $N_{max\_p}$ is a number of bits of a HARQ-ACK/NACK of each PDSCH, $N_{max\_pdsch}$ is a maximum number of PDSCHs scheduled by the one PDCCH and belonging to a given PDSCH group, and M is a value of the DAI in the PDSCH group.

In an exemplary embodiment, the DCI comprises a downlink assignment index (DAI) for counting the PDSCHs, the DAI indicates information on a last PDSCH of a plurality of PDSCHs scheduled by the DCI, and a total number of bits of the received HARQ-ACK/NACK codebook is $M \times N_{max\_p}$, where $N_{max\_p}$ is a number of bits of a HARQ-ACK/NACK of each PDSCH, and M is a value of the DAI in a PDSCH group.

In an exemplary embodiment, the DCI comprises a downlink assignment index (DAI) for counting the PDCCHs, and a total number of bits of the received HARQ-ACK/NACK codebook is $M \times N_t$, where M is a value of the DAI in a PDSCH group, $N_t$ is a number of bits of a HARQ-ACK/NACK corresponding to one PDCCH, is M, and wherein $N_t$ is predefined or semi-statically configured, and $N_t$ is not less than a sum $\Sigma_{i=0}^{X} Ni$ of numbers of bits of the HARQ-ACK/NACKs of the PDSCHs scheduled by the one PDCCH, wherein Ni is a number of bits of the HARQ-ACK/NACK of an i-th PDSCH scheduled by the one PDCCH.

In an exemplary embodiment, where $N_{max\_p}$ is the number of the bits of the HARQ-ACK/NACK of the each PDSCH and $N_{r\_p}$ is a number of effective bits of the HARQ-ACK/NACK of the each PDSCH, a value of the effective bits of the HARQ-ACK/NACK is determined according to decoding result of the PDSCH, and a value of remaining ($N_{max\_p} - N_{r\_p}$) bits of the HARQ-ACK/NACK is determined according a predefined value if $N_{r\_p}$ is less than $N_{max\_p}$; and/or, where a number of bits of a HARQ-ACK/NACK corresponding to each PDCCH is $N_t = N_{max\_p} \times N_{max\_pdsch}$ and $N_{pdsch}$ is a number of PDSCHs scheduled by the each PDCCH, a value of a HARQ-ACK/NACK of $N_{max\_p} \times N_{pdsch}$ bits is determined according to a decoding result of $N_{pdsch}$ PDSCHs, and a value of remaining $N_{max\_p} \times (N_{max\_pdsch} - N_{pdsch})$ bits of the HARQ-ACK/NACK is determined according a predefined value, and a value of a HARQ-ACK/NACK of $N_{max\_p} \times N_{pdsch}$ bits is determined according to a decoding result of $N_{pdsch}$ PDSCHs if $N_{max\_p} \times N_{pdsch}$ is less than $N_r$.

In an exemplary embodiment, the DCI comprises zero power channel state information reference signal (ZP CSI-RS) information, wherein in a situation where one DCI schedules a plurality of PDSCHs, the method further comprises performing rate matching on the plurality of PDSCHs according to the ZP CSI-RS information.

In an exemplary embodiment, performing the rate matching on the plurality of PDSCHs according to the ZP CSI-RS information comprises at least one of: performing the rate matching on each of the PDSCHs according to the ZP CSI-RS information, performing the rate matching on a PDSCH of each downlink time unit according to the ZP CSI-RS information, performing the rate matching only on a first PDSCH according to the ZP CSI-RS information, performing the rate matching on a PDSCH only in a scheduled first time unit according to the ZP CSI-RS information, or performing the rate matching on a PDSCH overlapping the ZP CSI-RS information according to the ZP CSI-RS information.

In an exemplary embodiment, the DCI comprises control channel resource set (CORESET) information, wherein, for DCI for scheduling a plurality of PDSCHs, the CORESET information comprises a plurality of CORESETs.

In an exemplary embodiment, the sending the PDSCHs according to the DCI futher comprises: sending a demodulation reference signal (DMRS) of the PDSCHs according to the DCI, and sending the PDSCHs according to the DMRS, wherein the DCI indicates a pattern of the DMRS, and the pattern of the DMRS comprises one or more of period information, time offset information, a duration and a symbol index.

In an exemplary embodiment, the sending the PDSCHs according to the DCI futher comprises: sending a demodulation reference signal (DMRS) of the PDSCHs according to the DCI, and sending the PDSCHs according to the DMRS, wherein the DCI indicates position information on the DMRS, and the position information on the DMRS is determined by time domain information on each PDSCH; or the position information on the DMRS is determined by time domain information on all the PDSCHs scheduled by DCI of one PDCCH.

The present disclosure further provides a base station performing the above method.

In addition, the present disclosure further provides a computer-readable storage medium for storing computer instructions. The computer instructions, when executed by a processor, can cause the processor to perform the above method performed by the terminal or the base station in the wireless communication network.

In view of the shortcomings of the prior methods, the application further proposes a method for receiving data, a method for transmitting data, and a method for receiving a reference signal, so as to solve the problems of how to receive data, transmit data, and receive a reference signal at high frequency.

In a first aspect, a method for receiving data is provided, applied to a user equipment UE, including:
 receiving a first signaling; determining a bandwidth and a position of a frequency domain resource of at least one Discrete Fourier Transform DFT subband within a carrier bandwidth according to the first signaling; determining resources for transmitting downlink data of the UE in the at least one DFT subband according to downlink control information DCI; and receiving the downlink data on the determined resources.

In an exemplary embodiment, wherein, determining a bandwidth and a position of a frequency domain resource of at least one DFT subband comprises at least one of the following: receiving the bandwidth and the position of the frequency domain resources of the at least one DFT subband according to the first signaling, the first signaling including at least one of high-level signaling, system information, protocol presets, and physical layer signaling; and wherein, a basic unit of the bandwidth of the frequency domain resources of the DFT subband is a physical resource block (PRB).

In an exemplary embodiment, wherein, the DCI includes indication information of a resource block group (RBG), and determining resources for transmitting downlink data of the UE in the at least one DFT subband according to DCI comprises at least one of the following: determining, according to the indication information of the RBG, a PRB corresponding to the RBG in the at least one DFT subband as a resource for transmitting the downlink data of the UE; and wherein, the RBG is determined in a unit of the DFT subband, and there is not a situation that PRBs belonging to one RBG are located in two DFT subbands, respectively; or, the RBG is determined in a unit of a Carrier or Wideband Part BWP, there is a situation that the PRBs belonging to one RBG are located in two DFT subbands.

In an exemplary embodiment, wherein, determining resources for transmitting downlink data of the UE in the at least one DFT subband according to downlink control information DCI comprises at least one of the following:
 determining a resource for transmitting the downlink data of the UE in a DFT subband where the DCI is located according to the DCI;
 determining a resource for transmitting the downlink data of the UE in the at least one DFT subband according to one DCI; and
 receiving a first instruction sent by a base station through explicit signaling or implicit signaling, and determining to use one of the following ways according to the first instruction: determining a resource for transmitting the downlink data of the UE in a DFT subband where the DCI is located according to the DCI; and determining a resource for transmitting the downlink data of the UE in the at least one DFT subband according to one DCI.

In an exemplary embodiment, wherein, the determining a resource for transmitting the downlink data of the UE in the at least one DFT subband according to one DCI comprises at least one of the following: determining, according to the one DCI, resources at the same position in at least two DFT subbands among from the at least one DFT subband as resources for transmitting the downlink data of the UE; and determining, according to the one DCI, the corresponding resources in at least two DFT subbands among from the at least one DFT subbands as resources for transmitting the downlink data of the UE.

In a second aspect, a method for receiving a reference signal is provided, applied to a UE, including:
 receiving a second signaling; determining a bandwidth of a DFT subband according to the second signaling; receiving the reference signal according to the bandwidth of the DFT subband; and determining channel state information CSI according to the reference signal.

In an exemplary embodiment, wherein, determining channel state information (CSI) according to the reference signal comprises: performing DFT transform on the reference signal, and determining the CSI according to the transformed reference signal.

In a third aspect, a method for transmitting data is provided, applied to a UE, including: receiving a sending instruction configured to instruct the UE to transmit uplink data, wherein, the uplink data includes first service data and second service data, and priority for transmission of the first service data is higher than that of the second service data; determining channel transmission power of the first service data and the channel transmission power of the second service data according to the sending instruction; and transmitting at least one of the first service data and the second service data according to the channel transmission power of the first service data, the channel transmission power of the second service data, and a preset determination condition.

In an exemplary embodiment, wherein, the preset determination conditions comprise at least one of the following:
  when sum of the channel transmission power of the first service data and the channel transmission power of the second service data is greater than a maximum transmission power allowed by the UE, transmitting the first service data and not transmitting the second service data;
  when the sum of the channel transmission power of the first service data and the channel transmission power of the second service data is greater than the maximum transmission power allowed by the UE, reducing the channel transmission power of the second service data until the sum of the channel transmission power of the first service data and the channel transmission power of the second service data not greater than the maximum transmission power allowed by the UE, then transmitting the first service data and the second service data; or
  when the sum of the channel transmission power of the first service data and the channel transmission power of the second service data is not greater than the maximum transmission power allowed by the UE, transmitting the first service data and the second service data.

In a fourth aspect, a UE is provided, including: a first processing module, configured to receive a first signaling; a second processing module, configured to determine a bandwidth and a position of a frequency domain resource of at least one DFT subband within a carrier bandwidth according to the first signaling; a third processing module, configured to determine resources for transmitting downlink data of the UE in the at least one DFT subband according to DCI; and a fourth processing module, configured to receive the downlink data on the determined resources.

In a fifth aspect, a UE is provided, including: a fifth processing module, configured to receive a second signaling; a sixth processing module, configured to determine a bandwidth of a DFT subband according to the second signaling; a seventh processing module, configured to receive the reference signal according to the bandwidth of the DFT subband; and an eighth processing module, configured to determine CSI according to a reference signal.

In a sixth aspect, a UE is provided, including: a ninth processing module, configured to receive a sending instruction configured to instruct the UE to transmit uplink data, wherein, the uplink data includes first service data and second service data, and priority for transmission of the first service data is higher than the priority for transmission of the second service data; a tenth processing module, configured to determine channel transmission power of the first service data and the channel transmission power of the second service data according to the sending instruction; and an eleventh processing module, configured to send at least one of the first service data and the second service data according to the channel transmission power of the first service data, the channel transmission power of the second service data, and a preset determination condition.

In a seventh aspect, a UE is provided, including: a processor; and a memory, configured to store machine-readable instructions, when executed by the processor, cause the processor to execute the method for receiving data in the first aspect.

In an eighth aspect, a UE is provided, including: a processor; and a memory, configured to store machine-readable instructions, when executed by the processor, cause the processor to execute the method for receiving a reference signal in the second aspect.

In a ninth aspect, a UE is provided, including: a processor; and a memory, configured to store machine-readable instructions, when executed by the processor, cause the processor to execute the method for transmitting data in the third aspect.

The technical solutions provided in the embodiments of the present application have at least the following beneficial effects: receiving a first signaling; determining a bandwidth and a position of a frequency domain resource of at least one Discrete Fourier Transform DFT subband within a carrier bandwidth according to the first signaling; determining resources for transmitting downlink data of the UE in the at least one DFT subband according to downlink control information DCI; receiving the downlink data on the determined resources and thus, receiving data at a high frequency is achieved.

In addition, the following technical solutions are proposed:

The present application provides a method for PDSCH resource allocation in an MDFT-S-OFDM-based high-frequency communication system, implemented on a user equipment side, wherein the method includes: obtaining frequency domain resource allocation information and virtual resource allocation information in DFT; and determining the PDSCH resource according to the frequency domain resource allocation information and the virtual resource allocation information in the DFT.

In an exemplary embodiment, wherein the obtaining frequency domain resource allocation information and virtual resource allocation information in DFT comprises any one of the following:
  receiving a DCI transmitted by a base station, wherein the DCI includes an indication about the frequency domain resource allocation information and an indication about the virtual resource allocation information in the DFT;
  receiving a high-layer signaling transmitted by a base station, wherein the high-layer signaling includes an indication about the frequency domain resource allocation information, and receiving a DCI transmitted by the base station, wherein the DCI includes an indication about the virtual resource allocation in the DFT;
  receiving a high-layer signaling transmitted by a base station, wherein the high-layer signaling includes an indication about the virtual resource allocation in the DFT, and receiving a DCI transmitted by the base station, wherein the DCI includes an indication about the frequency domain resource allocation information;
  receiving a high-layer signaling transmitted by a base station, wherein the high-layer signaling includes an indication about the size of the frequency domain resource allocation, and receiving a DCI transmitted by the base station, wherein the DCI includes an indication about the frequency domain resource allocation position and the virtual resource allocation information in the DFT;

receiving a high-layer signaling transmitted by a base station, wherein the high-layer signaling includes an indication about the relative size of the virtual resource in the DFT, and receiving a DCI transmitted by the base station, wherein the DCI includes an indication about the frequency domain resource allocation information and an indication about the virtual resource allocation position in the DFT; or receiving a first DCI and a second DCI transmitted by a base station, wherein the first DCI includes an indication about the frequency domain resource allocation information, and the second DCI includes an indication about the virtual resource allocation information in the DFT, the first DCI and the second DCI are different DCI formats, the first DCI is a UE group DCI, and a group of UEs receiving the UE group DCI transmitted by the base station use the same frequency domain resource and different virtual resources in a same DFT.

In an exemplary embodiment, wherein the granularity of virtual resource allocation in the DFT is configurable.

In an exemplary embodiment, wherein if there is a process of interleaving input of the DFT before DFT transform in system, the method further comprises: receiving interleaving information in the DFT transmitted by the base station; and wherein, the determining the PDSCH resource according to the frequency domain resource allocation information and the virtual resource allocation information in the DFT comprises: determining the PDSCH resource according to the frequency domain resource allocation information, the virtual resource allocation in the DFT and the interleaving information in the DFT.

In an exemplary embodiment, wherein if there is a process of zero-input input of the DFT before DFT transform in system, the method further comprises: receiving zero-input information in the DFT transmitted by the base station; and determining a subsample position where the input is zero in the DFT according to the zero-input information in the DFT, to assist PDSCH detection.

In an exemplary embodiment, wherein if one DCI schedules PDSCHs of multiple UEs simultaneously, the multiple UEs use the same frequency domain resource and different virtual resources in the same DFT. The present application provides a method for assisting PDSCH resource allocation in an M-DFT-S-OFDM-based high-frequency communication system, implemented on a base station side, wherein the method includes: transmitting frequency domain resource allocation information and virtual resource allocation information in DFT to a user equipment, such that the user equipment determines a PDSCH resource according to the frequency domain resource allocation information and the virtual resource allocation information in the DFT.

In an exemplary embodiment, wherein transmitting frequency domain resource allocation information and virtual resource allocation information in DFT to a user equipment comprises any one of the following:

transmitting a DCI to the user equipment, wherein the DCI includes an indication about the frequency domain resource allocation information and an indication about the virtual resource allocation information in the DFT;

transmitting a high-layer signaling to the user equipment, wherein the high-layer signaling includes an indication about the frequency domain resource allocation information, and transmitting a DCI to the user equipment, wherein the DCI includes an indication about the virtual resource allocation information in the DFT;

transmitting a high-layer signaling to the user equipment, wherein the high-layer signaling includes an indication about the virtual resource allocation information in the DFT, and transmitting a DCI to the user equipment, wherein the DCI includes an indication about the frequency domain resource allocation information;

transmitting a high-layer signaling to the user equipment, wherein the high-layer signaling includes an indication about the size of the frequency domain resource allocation, and transmitting a DCI to the user equipment, wherein the DCI includes an indication about the frequency domain resource allocation position and the virtual resource allocation information in the DFT;

transmitting a high-layer signaling to the user equipment, wherein the high-layer signaling includes an indication about the relative size of the virtual resource in the DFT, and transmitting a DCI to the user equipment, wherein the DCI includes an indication about the frequency domain resource allocation information and an indication about the virtual resource allocation position in the DFT; or transmitting a first DCI and a second DCI to the user equipment, wherein the first DCI includes an indication about the frequency domain resource allocation information, and the second DCI includes an indication about the virtual resource allocation information in the DFT, the first DCI and the second DCI are different DCI formats, the first DCI is a UE group DCI, and a group of UEs receiving the UE group DCI transmitted by the base station use the same frequency domain resource and different virtual resources in a same DFT.

In an exemplary embodiment, wherein if there is a process of interleaving input of the DFT before DFT transform in system, the method further comprises: transmitting interleaving information in the DFT to the user equipment. The present application provides a user equipment for PDSCH resource allocation in an MDFT-S-OFDM-based high-frequency communication system, wherein the user equipment includes: an information obtaining apparatus, configured to obtain frequency domain resource allocation information and virtual resource allocation information in DFT; and a PDSCH resource determining apparatus, configured to determine the PDSCH resource according to the frequency domain resource allocation information and the virtual resource allocation information in the DFT.

In an exemplary embodiment, wherein the information obtaining apparatus is configured to perform any one of the following:

receiving a DCI transmitted by a base station, wherein the DCI includes an indication about the frequency domain resource allocation information and an indication about the virtual resource allocation information in the DFT;

receiving a high-layer signaling transmitted by a base station, wherein the high-layer signaling includes an indication about the frequency domain resource allocation information, and receiving a DCI transmitted by the base station, wherein the DCI includes an indication about the virtual resource allocation in the DFT;

receiving a high-layer signaling transmitted by a base station, wherein the high-layer signaling includes an indication about the virtual resource allocation in the DFT, and receiving a DCI transmitted by the base station, wherein the DCI includes an indication about the frequency domain resource allocation information;

receiving a high-layer signaling transmitted by a base station, wherein the high-layer signaling includes an indication about the size of the frequency domain resource allocation, and receiving a DCI transmitted by the base station, wherein the DCI includes an indication about the frequency domain resource allocation position and the virtual resource allocation information in the DFT;

receiving a high-layer signaling transmitted by a base station, wherein the high-layer signaling includes an indication about the relative size of the virtual resource in the DFT, and receiving a DCI transmitted by the base station, wherein the DCI includes an indication about the frequency domain resource allocation information and an indication about the virtual resource allocation position in the DFT; or receiving a first DCI and a second DCI transmitted by the base station, wherein the first DCI includes an indication about the frequency domain resource allocation information, and the second DCI includes an indication about the virtual resource allocation information in the DFT, the first DCI and the second DCI are different DCI formats, the first DCI is a UE group DCI, and a group of UEs receiving the UE group DCI transmitted by the base station use the same frequency domain resource and different virtual resources in a same DFT.

In an exemplary embodiment, wherein the granularity of virtual resource allocation in the DFT is configurable.

In an exemplary embodiment, wherein if there is a process of interleaving input of the DFT before DFT transform in system, the user equipment further comprises: a first receiving apparatus, configured to receive interleaving information in the DFT transmitted by the base station;

wherein the PDSCH resource determining apparatus is configured to: determine the PDSCH resource according to the frequency domain resource allocation information, the virtual resource allocation in the DFT and the interleaving information in the DFT.

In an exemplary embodiment, wherein if there is a process of zero-input input of the DFT before DFT transform in system, the user equipment further comprises: a second receiving apparatus, configured to receive zero-input information in the DFT transmitted by the base station; and a position determining apparatus, configured to determine a sub-sample position where the input is zero in the DFT according to the zero-input information in the DFT, to assist PDSCH detection.

In an exemplary embodiment, wherein if one DCI schedules PDSCHs of multiple UEs simultaneously, the multiple UEs use the same frequency domain resource and different virtual resources in the same DFT. The present application provides a base station for assisting PDSCH resource allocation in an M-DFT-S-OFDM-based high-frequency communication system, wherein the base station includes: an information transmitting apparatus, configured to transmit frequency domain resource allocation information and virtual resource allocation information in DFT to a user equipment, such that the user equipment determines a PDSCH resource according to the frequency domain resource allocation information and the virtual resource allocation information in the DFT.

In an exemplary embodiment, wherein the information transmitting apparatus is configured to perform any one of the following:

transmitting a DCI to the user equipment, wherein the DCI includes an indication about the frequency domain resource allocation information and an indication about the virtual resource allocation information in the DFT;

transmitting a high-layer signaling to the user equipment, wherein the high-layer signaling includes an indication about the frequency domain resource allocation information, and transmitting a DCI to the user equipment, wherein the DCI includes an indication about the virtual resource allocation information in the DFT;

transmitting a high-layer signaling to the user equipment, wherein the high-layer signaling includes an indication about the virtual resource allocation information in the DFT, and transmitting a DCI to the user equipment, wherein the DCI includes an indication about the frequency domain resource allocation information;

transmitting a high-layer signaling to the user equipment, wherein the high-layer signaling includes an indication about the size of the frequency domain resource allocation, and transmitting a DCI to the user equipment, wherein the DCI includes an indication about the frequency domain resource allocation position and the virtual resource allocation information in the DFT;

transmitting a high-layer signaling to the user equipment, wherein the high-layer signaling includes an indication about the relative size of the virtual resource in the DFT, and transmitting a DCI to the user equipment, wherein the DCI includes an indication about the frequency domain resource allocation information and an indication about the virtual resource allocation position information in the DFT; or transmitting a first DCI and a second DCI to the user equipment, wherein the first DCI includes an indication about the frequency domain resource allocation information, and the second DCI includes an indication about the virtual resource allocation information in the DFT, the first DCI and the second DCI are different DCI formats, the first DCI is a UE group DCI, and a group of UEs receiving the UE group DCI transmitted by the base station use the same frequency domain resource and different virtual resources in a same DFT.

In an exemplary embodiment, wherein if there is a process of interleaving input of the DFT before DFT transform in system, the base station further comprises: a first transmitting apparatus, configured to transmit interleaving information in the DFT to the user equipment. The present application provides a system for PDSCH resource allocation in an M-DFT-S-OFDM-based high-frequency communication system, wherein the system includes the foregoing user equipment for PDSCH resource allocation in an M-DFT-S-OFDM-based high-frequency communication system in the third aspect of the present application, and the foregoing base station for assisting PDSCH resource allocation in an M-DFT-S-OFDM-based high-frequency communication system in the fourth aspect of the present application.

Compared with the prior art, PDSCH resource allocation in an MDFT-S-OFDM-based high-frequency communication system, and signaling overhead can be further reduced in the present application.

Additional aspects and advantages of the present application will be given in the following description, which will become apparent from the following description or be learned through the practice of the present application.

MODE FOR THE INVENTION

The embodiments of the present disclosure will be described below in detail with rererence to the accompanying drawings. It may be appreciated that the specific embodiments described herein are merely used for explaining the relevant exemplary implementation scheme, rather than limiting the present disclosure.

It should be noted that the embodiments in the present disclosure and the features in the embodiments may be combined with each other on a non-conflict basis. The present disclosure will be provided below in detail with reference to the accompanying drawings and in combination with the correndponding embodiments.

The terms used in the present disclosure are used to describe particular embodiments, and do not intend to limit the scope of other embodiments. The expression that does not definitely limit a specific number may generally refer to one or more, unless there are otherwise any clear definication. All terms (including technical and scientific terms) used herein may have the same meaning as those commonly understood by those skilled in the art.

In the following description, a base station is an access device that enables a communication device to access to a cellular network, and is used to allocate communication resources to the communication device. The base station may be any of the following entities: a gNB, a ng-eNB, an eNB, a radio access unit, a base station controller, a base transceiver station, and the like. The communication device may be any device that intends to access a service via an access network and may be configured to communicate over the access network. For example, the communication device may include, but not limited to, a user equipment UE, a mobile station MS, a cellular phone, a smart phone, a computer, or a multimedia system configured with a communication function. It should be noted that, the terms "communication device," "user device," "user equipment," "terminal" and "UE" may be used interchangeably hereinafter.

In a wireless communication system, the transmission of a physical downlink shared channel (PDSCH) and the transmission of a physical uplink shared channel (PUSCH) are scheduled through a downlink control information (DCI) transmitted by a physical downlink control channel (PDCCH). One DCI may schedule a single PDSCH or PUSCH, or schedule a plurality of PDSCHs or PUSCHs at the same time.

In a Long-term Evolution (LTE) system, the transmission of the Physical Downlink Shared Channel (PDSCH) and the Physical Uplink Shared Channel (PUSCH) is scheduled by the Downlink Control Information (DCI) transmitted on Physical Downlink Control Channel (PDCCH). The DCI and data are transmitted in the mode of the Orthogonal Frequency Division Multiplexing (OFDM). In order to reduce the Peak-to-Average Power Ratio (PAPR) of signals, the Discrete Fourier Transform-Spread OFDM (DFT-S-OFDM) is used for transmission in the uplink, which can improve the efficiency of the power amplifier of the UE.

In the frequency band higher than 52.6 GHz, in order to improve the efficiency of the power amplifier, DFT-S-OFDM is used for transmission in the downlink.

DFT-S-OFDM (also known as SC-FDMA) is to divide the coded and modulated data symbol sequence $d(0)$, $d(1), \ldots, d(M_{symb}-1)$ into $M_{symb}/N_{sc}^{DFT}$ sets. DFT transformation is performed according to the following formula (1):

$$z(l \cdot M_{sc}^{DFT} + k) = \frac{1}{\sqrt{M_{sc}^{DFT}}} \sum_{i=0}^{M_{sc}^{DFT}-1} d(l \cdot M_{sc}^{DFT} + i) e^{-j\frac{2\pi i k}{M_{sc}^{DFT}}} \quad (1)$$

$$k = 0, \ldots, M_{sc}^{DFT} - 1$$
$$l = 0, \ldots, \frac{M_{symb}}{N_{sc}^{DFT}} - 1$$

The transformed symbol sequences $z(0), z(1), \ldots, z(M_{symb}-1)$ are obtained, wherein, the variable $M_{sc}^{DFT} = M_{RB}^{DFT} \cdot N_{sc}^{RB}$, $M_{RB}^{DFT}$ represents the frequency domain resources for performing DFT (the number of RBs), $N_{sc}^{RB}$ is the number of subcarriers included in a PRB, for example, $N_{sc}^{RB}$ is 12.

In 3GPP LTE protocols, a CP-OFDM (OFDM with a Cyclic Prefix) access technology with multi-carrier waveform characteristics is used in downlink, and in order to reduce PAPR (Peak to Average Power Ratio), a DFT-S-OFDM (Discrete Fourier Transform Spread Orthogonal Frequency Division Multiplexing) access technology with signal-carrier waveform characteristic is used in uplink. Wherein, for the DFT-S-OFDM access technology, the transmission signal is DFT-transformed before being mapped to a frequency-domain sub-carrier, so that the time-domain waveform has a single-carrier characteristic, thereby reducing PAPR and increasing utilization efficiency of an RF (Radio Frequency) power amplifier.

In an ultrahigh-frequency communication system, such as the spectrum near 62.5 GHz, signal attenuation is more serious, coverage is small, and PAPR performance is worsened. New waveforms may be required, due to that the downlink CP-OFDM waveforms used in 3GPP LTE and 5G NR systems is no longer adoptable. One of the available downlink multiple access technologies is M-DFT-S-OFDM (Multi Discrete Fourier Transform Spread Orthogonal Frequency Division Multiplexing), wherein, as shown in FIG. 1, downlink transmission signals of different UEs or different UE groups undergo DFT transforms with the same or different size and then are mapped to frequency domains, thereby reducing PAPR. The PAPR performance of MDFT-S-OFDM is between DFT-S-OFDM and CP-OFDM, that is, PAPR performance is better than CP-OFDM, but slightly worse than DFT-S-OFDM. However, how to perform PDSCH (Physical Downlink Shared Channel) resource allocation in this system needs to be explored.

It should be understood that the embodiments disclosed herein may be applicable to various types of cellular networks.

The disclosure described below is to solve the issues on PDSCH transmission over multiple slots due to the assumed large SCS (then very short TTI), then support PDSCH across multiple slot and related issues on DMRS/HARQ/Rate matching. In an exemplary embodiment, a downlink signal transmission method (STD) may be disclosed as described below. For example, DMRS configuration/indication according to scheduled PDSCH(s) over multiple slots or outside scheduled PDSCH may be disclosed in this disclosure. For example, HARQ design in case of multi-PDSCH scheduling (including DAI counter design and HARQ-ACK sub-codebook) may be disclosed in this disclosure. For example, rate matching in case of PDSCH over multiple slots (including ZP/NZP CSI-RS indication and multiple CORESET indication) may be disclosed in this disclosure. More details will be described below using the following drawings.

FIG. 1 schematically illustrates a signal flow transmitted between a terminal 10 and a base station 20 according to an embodiment of the present disclosure. It may be understood by those skilled in the art that, for purpose of example and to facilitate understanding, one or more specific technical details are provided in the following description, but the embodiments of the present disclosure may also be practiced without these features.

In step 101, the terminal 10 receives PDCCHs from the base station 20. The received PDCCH may include DCIs for scheduling one or more PDSCHs.

In step 102, the terminal 10 receives the PDSCHs from the base station 20 according to the received DCIs.

In step 103, the terminal 10 sends a hybrid automatic repeat request acknowledgement (HARQ-ACK/NACK) codebook for the PDSCHs to the base station 20.

According to an embodiment, the DCI of the PDCCH may include at least one of: information on a coding block group (CBG), information on rate matching, information on a demodulation reference signal (DMRS), information on HARQ-ACK/NACK timing, information on a downlink assignment index (DAI), or the like. According to the received PDCCH, the terminal 10 may determine at least one of time-frequency resource information, rate matching information, HARQ-ACK/NACK feedback information, transmission block group information, or reference information on a PDSCH scheduled by the PDCCH, and receive the PDSCH from the base station 20 and perform a HARQ-ACK/NACK feedback according to the above information.

The DCI of the PDCCH may include the information on the coding block group (CBG). For example, the DCI includes CBG transmission information (CBGTI) and/or CBG flushing out information (CBGFI) indicating whether the coding block may be polluted. If one DCI may schedule M PDSCHs, the CBGTI and/or the CBGFI of each PDSCH may be independently indicated; or the CBGTI and/or the CBGFI of N PDSCHs of the M PDSCHs are independently indicated. Here, N is based on a predefinition or configured by signaling. The UE may determine what N PDSCHs of the M PDSCHs shall be indicated, according to the indication of the base station. Alternatively, the UE may determine the N PDSCHs according to a special value of other bit fields in the DCI. For example, the UE may determine the N PDSCHs of the M PDSCHs through whether a new data indicator (NDI) is inverted. Alternatively, the M PDSCHs share one CBGTI and/or CBGFI bit field.

The DCI of the PDCCH may include the information on the rate matching. The information on the rate matching may be, for example, rate matching information based on a resource element RE as a granularity. Alternatively, the information on the rate matching may be rate matching information based on a control channel resource set (CORESET).

If the base station is configured with the rate matching information based on the resource element RE as the granularity, such as, a zero power channel state information reference signal (ZP CSI-RS), the PDSCH cannot be mapped to the position of the ZP CSI-RS indicated in the DCI. If one DCI schedules a plurality of PDSCHs, each PDSCH performs the rate matching according to the indicated same aperiodic ZP CSI-RS information, or the PDSCH of each downlink time unit performs the rate matching according to the same indicated aperiodic ZP CSI-RS information, or only the first PDSCH performs the rate matching according to the indicated aperiodic ZP CSI-RS information, or only the PDSCH in a scheduled first time unit performs the rate matching according to the indicated aperiodic ZP CSI-RS information, or the rate matching is performed on the PDSCH overlapping with the aperiodic ZP CSI-RS information, according to the aperiodic ZP CSI-RS information. The downlink time unit may be one or more time slots, mini-time slots, sub-time slots, or OFDM symbols.

For example, according to the rule that each PDSCH performs the rate matching according to the indicated same aperiodic ZP CSI-RS information, 4 PDSCHs will avoid the resource of the aperiodic ZP CSI-RS in the second to third symbols, the fifth to sixth symbols, the eighth to ninth symbols, and the eleventh to twelfth symbols, respectively, if the 4 PDSCHs are scheduled by one DCI and the following criterions are met:

the 4 PDSCHs may respectively occupy, in the same downlink time slot, first to third symbols, fourth to sixth symbols, seventh to ninth symbols and tenth to twelfth symbols, the DCI indicates that the aperiodic ZP CSI-RS is offset one symbol from the starting symbol of the PDSCH, and the aperiodic ZP CSI-RS occupies two consecutive symbols.

For example, according to the rule that the PDSCH of the each downlink time unit performs the rate matching according to the indicated same aperiodic ZP CSI-RS information, only the second PDSCH and the fourth PDSCH will avoid the resource of the aperiodic ZP CSI-RS in the eighth to ninth symbols in the first downlink time slot and in the second downlink time slot, respectively, if the following criterions are met:

the one DCI schedules 4 PDSCHs, the 4 PDSCHs respectively occupy, in two consecutive downlink time slots, the first to seventh symbols and the eighth to fourteenth symbols in the first downlink time slot and the first to seventh symbols and the eighth to fourteenth symbols in the second downlink time slot, and the DCI indicates that the aperiodic ZP CSI-RS is at the eighth to ninth symbols in one time slot.

For example, according to the rule that the rate matching is performed on the PDSCH overlapping with the aperiodic ZP CSI-RS information according to the aperiodic ZP CSI-RS information, the base station may configure a set of combinations of aperiodic ZP CSI-RSs included in a plurality of PDSCHs or a plurality of downlink time units, and indicate one of the combinations through the DCI. Alternatively, for the DCI that may only schedule a single PDSCH and the DCI that may schedule a plurality of PDSCHs, the base station may independently configure an aperiodic ZP CSI-RS set. For example, for the DCI that may only schedule the single PDSCH, the aperiodic ZP CSI-RS set configured by the base station is applicable to one PDSCH. For the DCI that may schedule the plurality of PDSCHs, the aperiodic ZP CSI-RS set configured by the base station may be applicable to the plurality of PDSCHs. For example, in the DCI that may schedule the plurality of PDSCHs, a 2-bit aperiodic ZP CSI-RS indication corresponds to 3 combinations of aperiodic ZP CSI-RSs, wherein combination 1 indicates that the first to third PDSCHs respectively have an aperiodic ZP CSI-RS group, combination 2 indicates that the first PDSCH has an aperiodic ZP CSI-RS group, and combination 3 indicates that all PDSCHs respectively have an aperiodic ZP CSI-RS group. The base station indicates different combinations through the 2-bit dynamic. If the DCI schedules 4 PDSCHs and indicates the combination 1, the first to third PDSCHs need to avoid the indicated aperiodic ZP CSI-RS, and the fourth PDSCH does not need to avoid the indicated aperiodic ZP CSI-RS.

If the base station configures the rate matching information based on the control channel resource set (CORESET), the base station may independently configure a CORESET set for the DCI that may only schedule the single PDSCH and the DCI that may schedule the plurality of PDSCHs. For example, for the DCI that may only schedule the single PDSCH, the CORESET set configured by the base station only includes one CORESET. For the DCI that may schedule the plurality of PDSCHs, the CORESET set configured by the base station includes a plurality of CORESETs. According to the time resource information on the configured CORESET set, it is possible to determine in which PDSCHs and at which positions of the PDSCHs the rate matching is performed.

The DCI of the PDCCH may include the information on the demodulation reference signal (DMRS), for indicating the position and the pattern information on the DMRS. The DMRS will be further described below in detail.

The DCI of the PDCCH may include the information on the HARQ-ACK/NACK timing.

Optionally, in the situation where one DCI schedules a plurality of PDSCHs, the HARQ-ACK/NACKs of the PDSCHs correspond to the same uplink time unit. In this case, only one HARQ-ACK/NACK timing information bit field is required in the DCI. The uplink time unit may be determined according to HARQ-ACK/NACK timing information by using the first PDSCH or the last PDSCH of the scheduled plurality of PDSCHs as a time reference.

Optionally, the HARQ-ACK/NACKs of the PDSCHs scheduled by the one DCI may correspond to different uplink time units. According to an implementation, only one HARQ-ACK/NACK timing information bit field is required in the DCI to indicate one HARQ-ACK/NACK timing information so as to determine the uplink time unit of the first PDSCH of the scheduled plurality of PDSCHs. The DCI may further include a bit field to indicate the time offset of the uplink time unit of each PDSCH, and thus the uplink time unit of the each PDSCH may be determined. Optionally, the time offset may be configured by a high-level signaling, and does not need to be indicated in the DCI. According to another implementation, only one HARQ-ACK/NACK timing information bit field is required in the DCI, to indicate the HARQ-ACK/NACK timing information on the plurality of PDSCHs. The base station may configure a set of combinations of HARQ-ACK/NACK timing information on the plurality of PDSCHs through the high-level signaling, and indicate one of the combinations through the HARQ-ACK/NACK timing information bit field of the DCI.

The DCI of the PDCCH may include the information on the downlink assignment index (DAI). For example, the DCI may include one or more of a first type of DAI, a second type of DAI, and a third type of DAI, as will be described below.

The first type of DAI may be referred to as a counter DAI or C-DAI, which is used to indicate the information on the number of PDSCHs scheduled up to the current PDCCH within a HARQ-ACK/NACK feedback binding window; and/or the information on the number of PDCCHs sent up to the current PDCCH within the HARQ-ACK/NACK feedback binding window. That is, the DAI is used to indicate the counting information on the PDSCHs scheduled up to the current PDCCH or the counting information on the PDCCHs sent up to the current PDCCH within the HARQ-ACK/NACK feedback binding window.

Optionally, the number of the PDCCHs sent up to the current PDCCH is determined according to the number of PDCCHs up to the current carrier and the current PDCCH within the current PDCCH monitoring occasion. If there are a plurality of PDCCHs corresponding to the same carrier in the same PDCCH monitoring occasion, the plurality of PDCCHs are counted according to a predefined rule.

Optionally, the number of the PDSCHs scheduled up to the current PDCCH is determined according to the number of the PDSCHs scheduled up to the current carrier and the current PDCCH within the current PDCCH monitoring occasion.

Optionally, if the one DCI may schedule the plurality of PDSCHs, and the DAI is the information indicating the number of the PDSCHs, the DAI may be the information indicating the first PDSCH scheduled by the PDCCH, or the information indicating the last PDSCH scheduled by the PDCCH.

The second type of DAI may be referred to as a total DAI or T-DAI, which is used to indicate the information on the number of the PDSCHs scheduled up to the PDCCH monitoring occasion in which the current PDCCH is present in the HARQ-ACK/NACK feedback binding window; and/or the information on the sum of the numbers of the PDCCHs sent up to the PDCCH monitoring occasion in which the current PDCCH is present in the HARQ-ACK/NACK feedback binding window. That is, the DAI is used to indicate the counting information on the PDSCHs scheduled up to the PDCCH monitoring occasion in which the current PDCCH is present or the counting information on the PDCCHs sent up to the PDCCH monitoring occasion in which the current PDCCH is present in the HARQ-ACK/NACK feedback binding window.

Optionally, when a user is configured to work in a multi-carrier mode, or is configured to be able to receive downlink on a plurality of bandwidth parts (BWPs) or sub-bands (e.g., LBT sub-bands) at the same time, the number of the PDSCHs scheduled up to the PDCCH monitoring occasion in which the current PDCCH is present is determined by the number of PDCCHs sent in all the carriers, BWPs and/or sub-bands in PDCCH monitoring opportunities up to the PDCCH monitoring occasion.

Optionally, when the user is configured to work in the multi-carrier state, or is configured to enable to receive the downlink on the plurality of bandwidth parts (BWPs) or sub-bands (e.g., LBT sub-bands) at the same time, the sum of the numbers of the PDCCHs sent up to the PDCCH monitoring occasion, in which the current PDCCH is present, is determined by the number of PDCCHs sent in all the carriers, BWPs and/or sub-bands in PDCCH monitoring opportunities up to the PDCCH monitoring occasion.

The third type of DAI may also be referred to as the total DAI or T-DAI, which is used to indicate information on the number of PDCCHs corresponding to a HARQ-ACK/NACK that is fed back on a PUSCH; and/or information on the number of PDSCHs corresponding to the HARQ-ACK/NACK that is fed back on the PUSCH.

Optionally, in order to reduce the number of bits of the DAI, a larger actual value range of the DAI may be represented by a limited number of DAI bits by modulo. For example, for a 2-bit DAI, if T-DAI=9, the operation of modulo 4 needs to be performed with the result of 1.

Optionally, in order to reduce the number of the bits of the DAI, the actual value of the DAI may also be represented by a coarser granularity. The relationship between the value of the bits of the DAI and the actual value of the DAI is, for example, the value of the bits of the DAI X the granularity of the DAI. For example, if the granularity of the DAI is 4, the 2-bit DAI will be 4, 8, 12 and 16, respectively. This method may be used in combination with the method of taking the modulo. Therefore, the actual value range of the DAI may be 4, 8, 12, 16, 20 . . . .

It should be noted that the counting the DAI is performed on PDCCHs and/or PDSCHs feedbacking a HARQ-ACK/NACK in the same uplink time unit.

If the PDSCHs need to be grouped, the counting of the DAI is performed on each of PDCCHs and/or PDSCHs in the same PDSCH group that feeds back a HARQ-ACK/NACK in the same uplink time unit. In a situation where a plurality of PDSCHs scheduled by one PDCCH belong to one or more PDSCH groups, the DAI may include one or more DAI bit fields, and each of the DAI bit fields respectively corresponds to DAI information of one PDSCH group. The grouping the PDSCHs will be further described below.

Optionally, in the situation where the grouping is performed on the PDSCHs, the DCI of the PDCCH may include a plurality of groups of the first type of DAI and the second type of DAI, which respectively represent the counting of the PDCCHs and/or PDSCHs in PDSCH groups. For example, the base station configures two PDSCH groups, wherein PDSCH group 1 includes a PDSCH based on a transmission block (TB) as a granularity transmission, and PDSCH group 2 includes a PDSCH based on a coding block group (CBG) as a granularity transmission. If the one DCI may schedule the plurality of PDSCHs, and the transmission granularities of the PDSCHs may be different, the DCI includes two groups of first type of DAI and the second type of DAI, which respectively indicate the DAI information of each PDSCH in a corresponding PDSCH group. For example, if the one DCI schedules 4 PDSCHs (PDSCH 1, PDSCH 2, PDSCH 3, and PDSCH 4, where PDSCH 1, PDSCH 2 and PDSCH 3 belongs to PDSCH group 1, and PDSCH 4 belongs to group 2), T-DAI=3 of the first group represents that the PDSCH group 1 has 3 PDSCHs, and T-DAI=1 of the second group represents that the PDSCH group 2 has 1 PDSCH. If the one DCI can only schedule the PDSCHs belonging to one PDSCH group, the DCI only needs to include one group of the first type of DAI and the second type of DAI, which represents the counting of the DAI in the PDSCH group.

The HARQ-ACK/NACK feedback binding window is determined by a set of all downlink time units that may simultaneously feedback a HARQ-ACK/NACK in the same uplink time unit and/or a set of all carriers. An uplink/downlink time unit may be one or more time slots, mini-time slots, sub-time slots, or OFDM symbols.

According to an embodiment, before sending the hybrid automatic repeat request acknowledgement (HARQ-ACK/NACK) codebook for the PDSCHs to the base station 20, the terminal 10 may determine an uplink time unit feedbacking a HARQ-ACK/NACK of a PDSCH according to the PDCCH and the PDSCHs received from the base station 20, and send the HARQ-ACK/NACK codebook in the uplink time unit.

The uplink time unit for sending the HARQ-ACK/NACK codebook is determined by, for example, the HARQ-ACK/NACK timing indicated by the PDCCH. Optionally, the HARQ-ACK/NACK timing for determining the uplink time unit sending the HARQ-ACK/NACK codebook is configured by the high-level signaling and/or determined by a predefined rule. For example, the HARQ-ACK/NACK timing may be determined according to a minimum delay of the UE in processing the PDSCH.

Optionally, the HARQ-ACK/NACKs of the PDSCHs scheduled by one PDCCH correspond to the same uplink time unit. Optionally, the HARQ-ACK/NACKs of the PDSCHs scheduled by the one PDCCH correspond to the same uplink time unit or different uplink time units. The maximum number of PDSCHs that may be scheduled by one PDCCH described below is limited to the maximum number of PDSCHs that may be scheduled to send HARQ-ACK/NACKs in the same uplink time unit. For example, one PDCCH may schedule at most 4 PDSCHs. However, if the base station configures the HARQ-ACK/NACKs of the 4 PDSCHs to belong to different PUCCHs, when HARQ-ACK/NACK feedbacks are calculated below, the calculation is performed according to the situation where the one PDCCH may schedule at most 1 PDSCH. As another example, if the one PDCCH may schedule at most 4 PDSCHs, and these 4 PDSCHs feed back HARQ-ACK/NACKs in the same PUCCH, when the HARQ-ACK/NACK feedbacks are calculated below, the calculation is performed according to the situation where the one PDCCH may schedule at most 4 PDSCHs.

The HARQ-ACK/NACK feedback binding window may be determined by the set of all downlink time units that may simultaneously feedback the HARQ-ACK/NACK in the same uplink time unit and/or the set of all carriers. The uplink/downlink time unit may be the one or more time slots, mini-time slots, sub-time slots, or OFDM symbols.

According to an embodiment, sending the HARQ-ACK/NACK codebook in the uplink time unit includes: grouping the PDSCHs that are to feed back HARQ-ACK/NACKs in the uplink time unit; and determining a HARQ-ACK/NACK codebook for each PDSCH group.

For example, the PDSCHs that are to feed back the HARQ-ACK/NACKs in the uplink time unit may be grouped according to a DCI format of the DCI for scheduling PDSCHs, or a number of PDSCHs indicated in the DCI, or the number of bits of a HARQ-ACK/NACK corresponding to a PDSCH scheduled by one PDCCH, a transmission granularity of each scheduled PDSCH, and/or a transmission granularity of a reference PDSCH. The determining a HARQ-ACK/NACK codebook for each PDSCH group may include: determining the HARQ-ACK/NACK codebook for the each PDSCH group according to the DAI in this PDSCH group.

For the grouping performed on the PDSCHs according to the DCI format of the DCI for scheduling the PDSCHs, the base station configures or predefines a rule to determine a corresponding relationship between a DCI format and a PDSCH group. It is assumed that the DCI format that may schedule a plurality of PDSCHs is DCI format A, and the DCI format that can only schedule a single PDSCH is DCI format B. The plurality of PDSCHs scheduled by the DCI format A correspond to different transmission blocks (TBs). Then, the PDSCHs scheduled by the DCI format A and the PDSCH scheduled by the DCI format B belong to different PDSCH groups.

Optionally, if a UE is configured with a plurality of DCI formats, a corresponding relationship between each DCI format and a PDSCH group is determined according to the rule configured or predefined by the base station. For example, the UE is configured with DCI format C of a fallback mode, the DCI format B that can only schedule the single PDSCH, and the DCI format A that may schedule the plurality of PDSCHs. The PDSCHs scheduled by the DCI format C and the DCI format B are classified into PDSCH group 1, and the PDSCHs scheduled by the DCI format A are classified into PDSCH group 2.

For the grouping performed on the PDSCHs according to the number of the PDSCHs indicated in the DCI, it is assumed that the threshold Th1 of the number of the PDSCHs is predefined or is configured by the base station. If the number X of PDSCHs actually scheduled by one PDCCH is greater than the threshold Th1, the X PDSCHs belong to PDSCH group i, and if X is less than or equal to the threshold Th1, the X PDSCHs belong to PDSCH group j, where i≠j.

For example, if Th1=1, PDCCH 1 schedules 4 PDSCHs (which are PDSCH 1, PDSCH 2, PDSCH3 and PDSCH4, respectively), and PDCCH 2 schedules 1 PDSCH (which is PDSCH 5), the PDSCHs 1-4 and the PDSCH 5 belong to different PDSCH groups. In this example, the DCI format of the PDCCH 1 and the DCI format of the PDCCH 2 may be the same or different. For example, the DCI format of the PDCCH 1 and the DCI format of the PDCCH 2 may both be the DCI format A, or the DCI formats of the two may be different, where one is the DCI format A and the other is the DCI format B.

For the grouping determined for the PDSCHs according to the number of the bits of the HARQ-ACK/NACK corresponding to the PDSCH scheduled by the one PDCCH, it is assumed that the threshold Th2 of the number of the bits of the HARQ-ACK/NACK is predefined or is configured by the base station. If the sum of the numbers of the bits of the HARQ-ACK/NACKs corresponding to all X PDSCHs scheduled by one PDCCH is greater than Th2, the X PDSCHs belong to PDSCH group i, and if X is less than or equal to the threshold Th2, the X PDSCHs belong to PDSCH group j, where i≠j.

For example, if Th2=4 bits, the PDCCH 1 schedules two PDSCHs which are respectively PDSCH 1 and PDSCH2, where the PDSCH 1 is a TB based transmission, and the PDSCH 2 is a coding block group (CBG) based transmission, where 2 CBGs are actually scheduled; the PDCCH 2 schedules one PDSCH 3, and PDSCH 3 is the coding block group (CBG) based transmission, where 8 CBGs are actual scheduled; and PDCCH3 schedules 2 PDSCHs which are respectively PDSCH 4 and PDSCH 5, the PDSCH4 is the coding block group (CBG) based transmission, where 4 CBGs are actually scheduled, and PDSCH 5 is the coding block group (CBG) based transmission, where 4 CBGs are actually scheduled, the total number of the bits of the PDSCH 1 and the PDSCH 2 does not exceed 4 bits and the PDSCH 1 and the PDSCH 2 belong to PDSCH group 1; and the total number of the bits of the PDSCH 3, the PDSCH 4 and the PDSCH 5 exceeds 4 bits and the PDSCH 3, the PDSCH 4 and the PDSCH 5 belong to PDSCH group 2.

For the grouping determined for the PDSCHs according to the granularity of the transmission of the PDSCH scheduled by the one PDCCH and/or the HARQ-ACK/NACK feedback of the PDSCH. It is assumed that the UE is configured to work on at least one carrier in a scheduling and HARQ-ACK/NACK feedback mode that is based on a coding block group (CBG) as a granularity, and thus, the grouping of a PDSCH is determined according to whether the PDSCH is based on the CBG or a transmission block (TB).

Optionally, if one PDCCH may schedule a plurality of PDSCHs, and the transmission granularities of the PDSCHs scheduled by this PDCCH are the same, a PDSCH group of all the PDSCHs scheduled by this PDCCH may be determined according to the transmission granularities, and all the PDSCHs belong to the same PDSCH group.

Optionally, if one PDCCH may schedule a plurality of PDSCHs, and the transmission granularities of the PDSCHs scheduled by this PDCCH may be different, a PDSCH group of the PDSCHs may be determined according to the transmission granularities of the PDSCHs, and the PDSCHs may belong to different PDSCH groups.

Optionally, if one PDCCH may schedule a plurality of PDSCHs, and the transmission granularities of the PDSCHs scheduled by this PDCCH may be different, a PDSCH group of all the PDSCHs scheduled by this PDCCH is determined according to the transmission granularity of a reference PDSCH, and all the PDSCHs belong to the same PDSCH group. That is, even if the transmission granularities of the PDSCHs are different, all the PDSCHs are divided into the same PDSCH group, and the specific grouping is determined according to a reference PDSCH group. The reference PDSCH is predefined, or determined according to a predefined rule, or semi-statically configured. Optionally, the transmission granularity of the reference PDSCH is predefined, or determined according to a predefined rule, or semi-statically configured. For example, if the one PDCCH schedules two PDSCHs, one is the TB based transmission, and the other is the CBG based transmission, these two PDSCHs may belong to the same PDSCH group. When the transmission granularity of the reference PDSCH is the CBG, the two PDSCHs belong to the PDSCH group of the CBG transmission.

Determining, according to a DAI in each PDSCH group, the HARQ-ACK/NACK codebook for the PDSCH group may include: determining the HARQ-ACK/NACK codebook for the PDSCH group according to the DAI in the PDSCH group and a number of bits of a HARQ-ACK/NACK corresponding to each PDSCH in the PDSCH group. Specifically, the HARQ-ACK/NACK codebook for the PDSCH group may be determined according to one of the following methods:

Method 1: In a PDSCH group, the number $N_{max\_p}$ of bits of the HARQ-ACK/NACK of each PDSCH is predefined, or is configured by the base station, and the maximum number $N_{max\_pdsch}$ of PDSCHs that may be scheduled by one PDCCH and may belong to this PDSCH group is predefined, or is configured by the base station. If the DAI counts PDCCHs, the number of bits of a HARQ-ACK/NACK corresponding to one PDCCH is $N_t=N_{max\_p}\times N_{max\_pdsch}$. According to the actual value M of the DAI in the PDSCH group, the total number of bits of the HARQ-ACK/NACK codebook is determined as $M\times N_t=M\times N_{max\_p}\times N_{max\_pdsch}$. Optionally, if the DAI counts PDSCHs, the number of bits of a HARQ-ACK/NACK corresponding to one PDSCH is $N_t=N_{max\_p}$. When the value M of the DAI is the information on the last PDSCH of the plurality of PDSCHs scheduled by the DCI, according to the actual value M of the DAI in the PDSCH group, the total number of the bits of the HARQ-ACK/NACK codebook is determined as $M\times N_t=M\times N_{max\_p}$. Optionally, if the DAI counts the PDSCHs, and the value M of the DAI is the information on the first PDSCH of n PDSCHs scheduled by the DCI, then the total number of the bits of the HARQ-ACK/NACK codebook is determined as $(M+n-1)\times N_t=(M+n-1)\times N_{max\_p}$ according to the actual value M of the DAI in the PDSCH group.

Method 2: In a PDSCH group, the number $N_t$ of bits of a HARQ-ACK/NACK corresponding to one PDCCH is predefined, or is configured by the base station. If the DAI counts a PDCCH, the total number of bits of the HARQ-ACK/NACK codebook is determined as $M\times N_t$ according to the actual value M of the DAI in the PDSCH group. Optionally, when the base station perform the proceess of scheduling, it needs to ensure that the number $N_t$ of the bits of the HARQ-ACK/NACK corresponding to the one PDCCH is not less than the sum $\Sigma_{i=0}^{X} Ni$ of numbers of bits of HARQ-ACK/NACKs of PDSCHs actually scheduled by the one PDCCH, where Ni is a number of bits of a HARQ-ACK/NACK of an i-th PDSCH. For example, if the UE is configured to dynamically work based on the transmission of the CBG or TB, the Ni of each PDSCH may be different.

Optionally, if the UE is configured to send at most L TBs in at least one frequency domain or time unit, the number $N_{max\_p}$ of bits of the HARQ-ACK/NACK of a PDSCH is determined by L and the number of bits of a HARQ-ACK/NACK of each TB. For example, if it is configured to transmit the data based on the CBG, the number of bits of a HARQ-ACK/NACK of one TB is $N_{max\_cbg}$. If it is configured to transmit the data based on t the TB, the number of the bits of the HARQ-ACK/NACK of the one TB is 1.

The step of sending the HARQ-ACK/NACK codebook for the PDSCH in the uplink time unit also includes: connecting HARQ-ACK/NACK codebooks of all groups in a set sequential order to constitute the HARQ-ACK/NACK codebook, and sending corresponding HARQ-ACK/NACK information through a PDCCH or a PUSCH. Optionally, sending the HARQ-ACK/NACK codebook for the PDSCH in the uplink time unit includes: sending HARQ-ACK/NACK information corresponding to the HARQ-ACK/NACK codebooks of the groups through a respective PUCCH or PUSCH, respectively.

The steps described above, the processes of counting the DAI according to the PDSCH or the PDCCH, the methods of grouping the PDSCH, and the various methods of determining the HARQ-ACK/NACK codebook for the each PDSCH group according to the DAI in the PDSCH group may be combined, to obtain different implementations of determining the HARQ-ACK/NACK codebook. A few specific examples are given below, but the implementations thereof are not limited to the examples.

Example 1: The PDSCHs are grouped according to the number of PDSCHs indicated in the DCI for scheduling the PDSCHs. If the number of the PDSCHs indicated in the DCI of one PDCCH is 1, this group of PDSCH is indicated as PDSCH group 1. If the number of the PDSCHs indicated in the DCI of the one PDCCH is greater than 1, this group of PDSCHs is indicated as PDSCH group 2. It is assumed that, in the PDSCH group 1, the number of the PDSCHs actually scheduled by the one PDCCH is 1, and each PDSCH corresponds to 1 bit of HARQ-ACK/NACK. In the PDSCH group 2, the number of bits of a HARQ-ACK/NACK corresponding to the one PDCCH is $N_f=4$, the maximum number of PDSCHs that may be scheduled by the one PDCCH is X=4, and each PDSCH corresponds to 1 bit of HARQ-ACK/NACK. If the number of PDSCHs actually scheduled by the one PDCCH is less than 4, placeholder bits are sent until the total number of bits of HARQ-ACK/NACKs corresponding to this PDCCH is 4. The DCI of the PDCCH for scheduling the PDSCH includes the first type of DAI and the second type of DAI, which respectively represent the sum of the numbers of the PDCCHs sent up to the current PDCCH in the HARQ-ACK/NACK feedback binding window and the sum of the numbers of the PDCCHs sent up to the PDCCH monitoring occasion in which the current PDCCH is present. The first type of DAI and the second type of DAI are used for counting in two PDSCH groups, respectively. For the PDSCH group 1, if the actual value of the second type of DAI of the last PDSCH in the binding window is M1, the total number of bits of the HARQ-ACK/NACK codebook for the PDSCH group 1 is M1. For the PDSCH group 2, if the actual value of the second type of DAI of the last PDSCH in the binding window is M2, the total number of bits of the HARQ-ACK/NACK codebook for the PDSCH group 2 is M2×4. The HARQ-ACK/NACK codebook for the PDSCH group 1 and the HARQ-ACK/NACK codebook for the PDSCH group 2 are connected in series, and the total number of bits of the HARQ-ACK/NACK codebooks is M1+M2×4.

Figure 2:
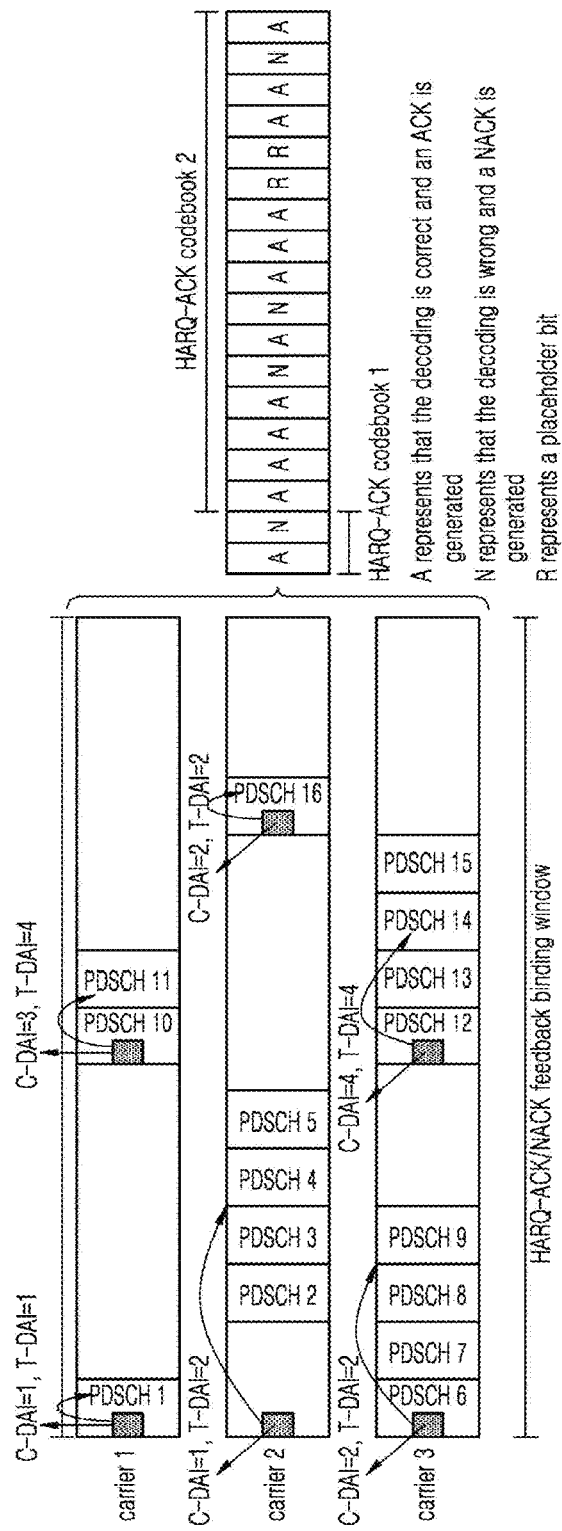
FIG. 2 schematically illustrates a HARQ-ACK/NACK feedback binding window and a HARQ-ACK/NACK codebook according to Example 1.

FIG. 2 schematically illustrates the HARQ-ACK/NACK feedback binding window and the HARQ-ACK/NACK codebook according to Example 1. As shown in FIG. 2, the base station configures three carriers for the UE. In the HARQ-ACK/NACK binding window, the UE monitors the PDCCHs on all the three carriers in the first PDCCH monitoring occasion. Here, the PDCCH of carrier 1 schedules PDSCH 1, and the PDSCH 1 belongs to the PDSCH group 1. C-DAI=1 represents that this PDCCH is the first PDCCH belonging to the PDSCH group 1 in this PDCCH monitoring occasion, and T-DAI=1 represents that the PDSCH group 1 only has one PDCCH in this PDCCH monitoring occasion. The PDCCH of carrier 2 schedules PDSCHs 2-5, and the PDSCHs 2-5 belong to PDSCH group 2. C-DAI=1 represents that this PDCCH is the first PDCCH belonging to the PDSCH group 2 in this PDCCH monitoring occasion, and T-DAI=2 represents that the PDSCH group 2 has 2 PDCCHs in this PDCCH monitoring occasion. The PDCCH of carrier 3 schedules PDSCHs 6-9, and the PDSCHs 6-9 belong to the PDSCH group 2. C-DAI=2 represents that this PDCCH is the second PDCCH belonging to the PDSCH group 2 in this PDCCH monitoring occasion, and T-DAI=2 represents that the PDSCH group 2 has 2 PDCCHs in this PDCCH monitoring occasion. Then, in the next PDCCH monitoring occasion, the UE monitors a PDCCH on two carriers (the carrier 1 and the carrier 3). The PDCCH of the carrier 1 schedules PDSCHs 10-11, and the PDSCHs 10-11 belong to the PDSCH group 2. C-DAI=3 represents that this PDCCH is the third PDCCH belonging to the PDSCH group 2 up to this PDCCH monitoring occasion, and T-DAI=4 represents that the PDSCH group 2 has 4 PDCCHs up to this PDCCH monitoring occasion. The PDCCH of the carrier 3 schedules PDSCHs 12-15, and the PDSCHs 12-15 belong to the PDSCH group 2. C-DAI=4 represents that this PDCCH is the fourth PDCCH belonging to the PDSCH group 2 up to this PDCCH monitoring occasion, and T-DAI=4 represents that the PDSCH group 2 has 4 PDCCHs up to this PDCCH monitoring occasion. Then, in the next PDCCH monitoring occasion, the UE monitors a PDCCH on one carrier (the carrier 2). Here, the PDCCH of the carrier 1 schedules PDSCH 16, and the PDSCH 16 belongs to the PDSCH group 1. C-DAI=2 represents that this PDCCH is the second PDCCH belonging to the PDSCH group 1 up to this PDCCH monitoring occasion, and T-DAI=2 represents that the PDSCH group 1 has 2 PDCCHs up to this PDCCH monitoring occasion. When the UE generates a codebook, the HARQ-ACK/NACK codebook 1 of the PDSCH group 1 includes 2 bits of HARQ-ACK/NACKs which are the HARQ-ACK/NACK of PDSCH 1 and the HARQ-ACK/NACK of PDSCH 16, respectively, and the HARQ-ACK/NACK codebook 2 of the PDSCH group 2 includes 16 bits of HARQ-ACK/NACKs which are the HARQ-ACK/NACKs of PDSCHs 2-15 and 2 bits of HARQ-ACK/NACK bits for placeholders. The 2 bits of placeholder bits are located after the HARQ-ACK/NACK of PDSCH 10 and the HARQ-ACK/NACK of PDSCH 11, such that the number of bits of the HARQ-ACK/NACK corresponding to the one PDCCH is 4.

Example 2: The PDSCHs are grouped according to the granularity of the transmission of the PDSCH scheduled by the one PDCCH and/or the HARQ-ACK/NACK feedback of the PDSCHs. It is assumed that the base station only configures the TB-based transmission, all PDSCHs belong to the same group. The DCI of the PDCCH scheduling the PDSCHs includes the first type of DAI and the second type of DAI, which respectively represent the sum of the numbers of the PDSCHs sent up to the current PDCCH in the HARQ-ACK/NACK feedback binding window and the sum of the numbers of the PDSCHs sent up to the PDCCH monitoring occasion in which the current PDCCH is present. If the actual value of the second type of DAI of the last PDSCH in the binding window is M1, the total number of bits of the HARQ-ACK/NACK codebook is M1 (assuming that the base station configures one PDSCH and can only send one TB).

Figure 3:
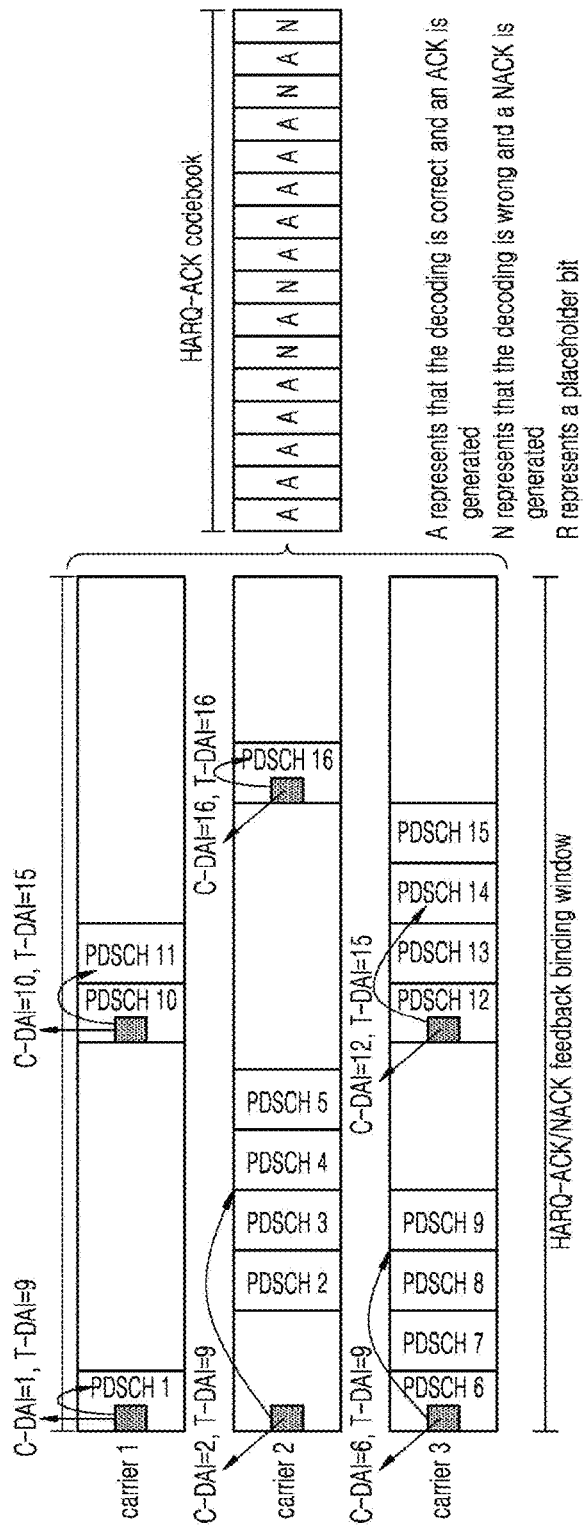
FIG. 3 schematically illustrates a HARQ-ACK/NACK feedback binding window and a HARQ-ACK/NACK codebook according to Example 2.

FIG. 3 schematically illustrates the HARQ-ACK/NACK feedback binding window and the HARQ-ACK/NACK codebook according to Example 2. As shown in FIG. 3, the base station configures three carriers for the UE. In the HARQ-ACK/NACK binding window, the UE monitors PDCCHs on the three carriers in the first PDCCH monitoring occasion. Here, the PDCCH of carrier 1 schedules PDSCH 1. C-DAI=1 represents that this PDSCH is the first PDSCH scheduled in this PDCCH monitoring occasion, and T-DAI=1 represents that the number of all the PDSCHs scheduled in this PDCCH monitoring occasion is 9. The PDCCH of carrier 2 schedules PDSCHs 2-5. C-DAI=2 represents that this PDSCH is the second PDSCH scheduled in this PDCCH monitoring occasion, and T-DAI=9 represents that the number of all the PDSCHs scheduled in this PDCCH monitoring occasion is 9. The PDCCH of carrier 3 schedules PDSCHs 6-9. C-DAI=6 represents that this PDSCH is the sixth PDSCH scheduled in this PDCCH monitoring occasion, and T-DAI=9 represents that the number of all the PDSCHs scheduled in this PDCCH monitoring occasion is 9. Then, in the next PDCCH monitoring occasion, the UE monitors a PDCCH on two carriers (the carrier 1 and the carrier 3). The PDCCH of the carrier 1 schedules PDSCHs 10-11. C-DAI=10 represents that this PDSCH is the tenth PDSCH scheduled up to this PDCCH monitoring occasion, and T-DAI=15 represents that the number of all the PDSCHs scheduled up to this PDCCH monitoring occasion is 15. The PDCCH of the carrier 3 schedules PDSCHs 12-15. C-DAI=4 represents that this PDSCH is the twelfth PDSCH scheduled up to this PDCCH monitoring occasion, and T-DAI=15 represents that the number of all the PDSCHs scheduled up to this PDCCH monitoring occasion is 15. Then, in the next PDCCH monitoring occasion, the UE monitors a PDCCH on one carrier (the carrier 2). Here, the PDCCH of the carrier 1 schedules PDSCH 16. C-DAI=16 represents that this PDSCH is the sixteenth PDSCH scheduled up to this PDCCH monitoring occasion, and T-DAI=16 represents that the number of all the PDSCHs scheduled up to this PDCCH monitoring occasion is 16. When generateing a codebook, the UE only generates a codebook including 16 bits of HARQ-ACK/NACKs, which are the HARQ-ACK/NACKs of the PDSCHs 1-16, respectively. The values given in the figures are the actual DAI values. The method of Example 2 saves the cost of the HARQ-ACK/NACK more than the method of Example 1. However, in order to achieve the same robustness, for example, in order to ensure that the HARQ-ACK/NACK codebook is not affected when a certain number of PDCCHs are lost, the number of DAI bits required in Example 2 is more.

Example 3: The PDSCHs are grouped according to the granularity of the transmission of the PDSCH scheduled by the one PDCCH and/or the HARQ-ACK/NACK feedback of the PDSCHs. It is assumed that the base station only configures the TB-based transmission, all PDSCHs belong to the same group. The DCI of the PDCCH for scheduling the PDSCHs includes the first type of DAI and the second type of DAI, which respectively represent the sum of the numbers of the PDCCHs sent up to the current PDCCH in the HARQ-ACK/NACK feedback binding window and the sum of the numbers of the PDCCHs sent up to the PDCCH monitoring occasion in which the current PDCCH is present. It is assumed that the number $N_t$ of bits of a HARQ-ACK/NACK corresponding to one PDCCH is configured to be $N_t=4$ by the base station, the maximum number of PDSCHs that may be scheduled by the one PDCCH is X=4, and each PDSCH corresponds to 1 bit of HARQ-ACK/NACK. If the number of PDSCHs actually scheduled by the one PDCCH is less than 4, placeholder bits are sent until the total number of bits of HARQ-ACK/NACKs corresponding to this PDCCH is 4. If the actual value of the second type of DAI of the last PDSCH in the binding window is M1, the total number of bits of the HARQ-ACK/NACK codebook is M1×4.

Figure 4:
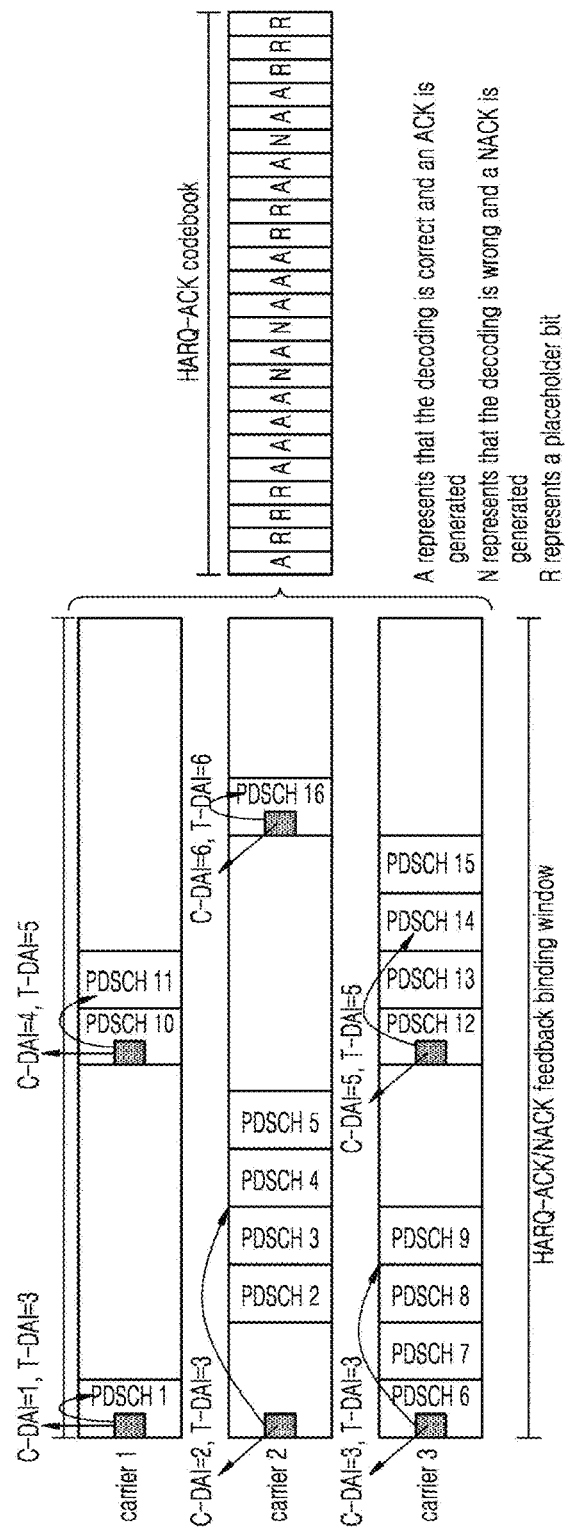
FIG. 4 schematically illustrates a HARQ-ACK/NACK feedback binding window and a HARQ-ACK/NACK codebook according to Example 3.

FIG. 4 schematically illustrates the HARQ-ACK/NACK feedback binding window and the HARQ-ACK/NACK codebook according to Example 3. As shown in FIG. 4, the base station configures three carriers for the UE. In the HARQ-ACK/NACK binding window, the UE monitors a PDCCH on all the three carriers in the first PDCCH monitoring occasion. Here, the PDCCH of carrier 1 schedules PDSCH 1. C-DAI=1 represents that this PDCCH is the first PDCCH scheduled in this PDCCH monitoring occasion, and T-DAI=3 represents that the number of all the PDCCHs in this PDCCH monitoring occasion is 3. The PDCCH of carrier 2 schedules PDSCHs 2-5. C-DAT=2 represents that this PDCCH is the second PDCCH in this PDCCH monitoring occasion, and T-DAI=3 represents that the number of all the PDCCHs in this PDCCH monitoring occasion is 3. The PDCCH of carrier 3 schedules PDSCHs 6-9, and the PDSCHs 6-9 belong to the PDSCH group 2. C-DAI=3 represents that this PDCCH is the third PDCCH in this PDCCH monitoring occasion, and T-DAI=3 represents that the number of all the PDCCHs in this PDCCH monitoring occasion is 3. Then, in the next PDCCH monitoring occasion, the UE monitors a PDCCH on two carriers (the carrier 1 and the carrier 3). The PDCCH of the carrier 1 schedules PDSCHs 10-11. C-DAI=4 represents that this PDCCH is the fourth PDCCH up to this PDCCH monitoring occasion, and T-DAI=5 represents that the number of all the PDCCHs up to this PDCCH monitoring occasion is 5. The PDCCH of the carrier 3 schedules PDSCHs 12-15. C-DAI=5 represents that this PDCCH is the fifth PDCCH up to this PDCCH monitoring occasion, and T-DAI=5 represents that the number of all the PDCCHs up to this PDCCH monitoring occasion is 5. Then, in the next PDCCH monitoring occasion, the UE monitors a PDCCH on one carrier (the carrier 2). Here, the PDCCH of the carrier 2 schedules PDSCH 16. C-DAI=6 represents that this PDCCH is the sixth PDCCH up to this PDCCH monitoring occasion, and T-DAI=6 represents that the number of all the PDCCHs up to this PDCCH monitoring occasion is 6. When generateing a codebook, the UE only generates a codebook including 24 bits of HARQ-ACK/NACKs, which are the HARQ-ACK/NACKs of the PDSCHs 1-16, respectively. Here, each PDCCH corresponds to 4 bits of HARQ-ACK/NACKs, and the 4 bits corresponding to the PDCCH scheduling the PDSCH 1 are the HARQ-ACK/NACK and 3 bits of placeholder bits. The 4 bits of HARQ-ACK/NACKs corresponding to the PDCCH scheduling the PDSCHs 10 and 11 are the HARQ-ACK/NACKs of the PDSCHs 10 and 11 and 2 bits of placeholder bits. The 4 bits of HARQ-ACK/NACKs corresponding to the PDCCH scheduling the PDSCH 16 are the HARQ-ACK/NACK of the PDSCH 16 and 3 bits of placeholder bits. The method of Example 3 saves the cost of the DAI more than the method of Example 2, however, the cost of the HARQ-ACK/NACK obviously increases. The method of Example 3 is simpler and more robust than the method of Example 1, however, the cost of the HARQ-ACK/NACK obviously increases.

Example 4: The PDSCHs are grouped according to the granularity of the transmission of the PDSCH scheduled by the one PDCCH and/or the HARQ-ACK/NACK feedback of the PDSCHs. It is assumed that the UE is configured to work on at least one carrier in a scheduling and HARQ-ACK/NACK feedback mode that is based on a coding block group (CBG) as a granularity, and thus, the PDSCHs are grouped according to whether the PDSCHs are based on the CBG or a transmission block (TB). If the transmission granularity of the PDSCHs is the TB, the PDSCH belongs to PDSCH group 1, and if the transmission granularity of the PDSCHs is the CBG, the PDSCH belongs to PDSCH group 2. It is assumed that one PDCCH may schedule a plurality of PDSCHs, and the transmission granularities of the PDSCHs scheduled by this PDCCH are the same, and the PDSCHs are TB-based transmissions. Thus, all the PDSCHs of this type belong to the PDSCH group 1. The DCI of the PDCCH scheduling the PDSCHs includes the first type of DAI and the second type of DAI, which respectively represent the sum of the numbers of the PDSCHs sent up to the current PDCCH in the HARQ-ACK/NACK feedback binding window and the sum of the numbers of the PDSCHs sent up to the PDCCH monitoring occasion in which the current PDCCH is present. The first type of DAI and the second type of DAI perform the counting in the two PDSCH groups, respectively. In the PDSCH group 1, the number of bits of a HARQ-ACK/NACK corresponding to each PDSCH is 1 bit (assuming that the base station configures one PDSCH and can only send one TB). In the PDSCH group 2, the number of bits of a HARQ-ACK/NACK corresponding to each PDSCH is $N_{max\_cbg}$ (which is the maximum number of CBGs that a TB can divide). If the actual value of the second type of DAI of the last PDSCH in the binding window is M2, the total number of bits of the HARQ-ACK/NACK codebook is $M2 \times N_{max\_cbg}$ (assuming that the base station configures one PDSCH and can only send one TB).

Example 5: The PDSCHs are grouped according to the granularity of the transmission of the PDSCH scheduled by the one PDCCH and/or the HARQ-ACK/NACK feedback of the PDSCHs. It is assumed that the UE is configured to work on at least one carrier in a scheduling and HARQ-ACK/NACK feedback mode that is based on a coding block group (CBG) as a granularity, and thus, the grouping of the PDSCH is determined according to whether the PDSCH is based on the CBG or a transmission block (TB). If the transmission granularity of the PDSCH is the TB, the PDSCH belongs to PDSCH group 1, and if the transmission granularity of the PDSCH is the CBG, the PDSCH belongs to PDSCH group 2. It is assumed that one PDCCH may schedule a plurality of PDSCHs, and the transmission granularities of the PDSCHs scheduled by this PDCCH are the same, and the PDSCHs are TB-based transmissions. Thus, all the PDSCHs of this type belong to the PDSCH group 1. The DCI of the PDCCH scheduling the PDSCHs includes the first type of DAI and the second type of DAI, which respectively represent the sum of the numbers of the PDCCHs sent up to the current PDCCH in the HARQ-ACK/NACK feedback binding window and the sum of the numbers of the PDCCHs sent up to the PDCCH monitoring occasion in which the current PDCCH is present. The first type of DAI and the second type of DAI perform the counting in the two PDSCH groups, respectively. In the PDSCH group 1, the number Nt of bits of a HARQ-ACK/NACK corresponding to each PDCCH is the maximum number (X=4) of PDSCHs that may be scheduled by the PDCCH, and each PDSCH corresponds to 1 bit of HARQ-ACK/NACK. Thus, if the actual value of the second type of DAI of the last PDSCH in the binding window is M1, the total number of bits of the HARQ-ACK/NACK codebook is $M1 \times 4$ (assuming that the base station configures one PDSCH and can only send one TB). A PDCCH for scheduling PDSCHs, the number of which is less than 4 (e.g., a PDCCH scheduling only one PDSCH, a PDCCH of a DCI working in a fallback mode, etc.) needs to occupy a space using placeholder bits until 4 bits of HARQ-ACK/NACKs are satisfied. In the PDSCH group 2, the number of bits of a HARQ-ACK/NACK corresponding to each PDSCH is $N_{max\_cbg}$ (which is the maximum number of CBGs that a TB can divide). If the actual value of the second type of DAI of the last PDSCH in the binding window is M2, the total number of bits of the HARQ-ACK/NACK codebook is $M2 \times N_{max\_cbg}$ (assuming that the base station configures one PDSCH and can only send one TB).

In this situation, a special implementation is to bind the HARQ-ACK/NACKs of a plurality of PDSCHs scheduled by one PDCCH, that is, to perform an AND operation on the HARQ-ACK/NACKs of all the PDSCHs, to generate 1 bit of HARQ-ACK/NACK. Then, in PDSCH group 1, the number $N_t$ of bits of the HARQ-ACK/NACK corresponding to the each PDSCH is 1 bit (assuming that the base station configures one PDSCH and can only send one TB).

Example 6: The PDSCHs are grouped according to the granularity of the transmission of the PDSCH scheduled by the one PDCCH and/or the HARQ-ACK/NACK feedback of the PDSCHs. It is assumed that the UE is configured to work on at least one carrier in a scheduling and HARQ-ACK/NACK feedback mode that is based on a coding block group (CBG) as a granularity, and thus, the PDSCHs are grouped according to whether the PDSCHs are based on the CBG or a transmission block (TB). If the transmission granularity of the PDSCH is the TB, the PDSCH belongs to PDSCH group 1, and if the transmission granularity of the PDSCH is the CBG, the PDSCH belongs to PDSCH group 2. It is assumed that one PDCCH may schedule a plurality of PDSCHs, the transmission granularities of the PDSCHs scheduled by this PDCCH may be different, and the PDSCH groups of the PDSCHs are determined according to respective transmission granularities.

Optionally, the DCI of the PDCCH for scheduling the PDSCHs may include the first type of DAI and the second type of DAI, which respectively represent the counting on the PDSCHs in the two PDSCH groups. In each DAI bit field, the first type of DAI respectively represents the sum of the numbers of the PDSCHs scheduled up to the current PDCCH in the HARQ-ACK/NACK feedback binding window and the sum of the numbers of the PDSCHs scheduled up to the PDCCH monitoring occasion in which the current PDCCH is present. The first type of DAI and the second type of DAI respectively perform the counting in the two PDSCH groups. If all the PDSCHs belong to one PDSCH group in one scheduling, the DAI bit field of the other PDSCH group may be set to a predefined value (e.g., a special value or a value that is the same as the value of the DAI in the last received PDCCH). Optionally, the T-DAI is an actual value and the C-DAI is a special value or a value that is the same as the value of the last DAI or as the value of the next DAI.

Optionally, the value of the DAI bit field is not limited, but the UE does not determine the HARQ-ACK/NACK code according to this value.

In the PDSCH group 1, if the actual value of the second type of DAI of the last PDSCH in the binding window is M1, the total number of bits of the HARQ-ACK/NACK codebook is M1 (assuming that the base station configures one PDSCH and can only send one TB). Accordingly, if the actual value of the second type of DAI of the last PDSCH in the binding window is M2, the total number of bits of the HARQ-ACK/NACK codebook is M2 (assuming that the base station configures one PDSCH and can only send one TB).

Figure 5:
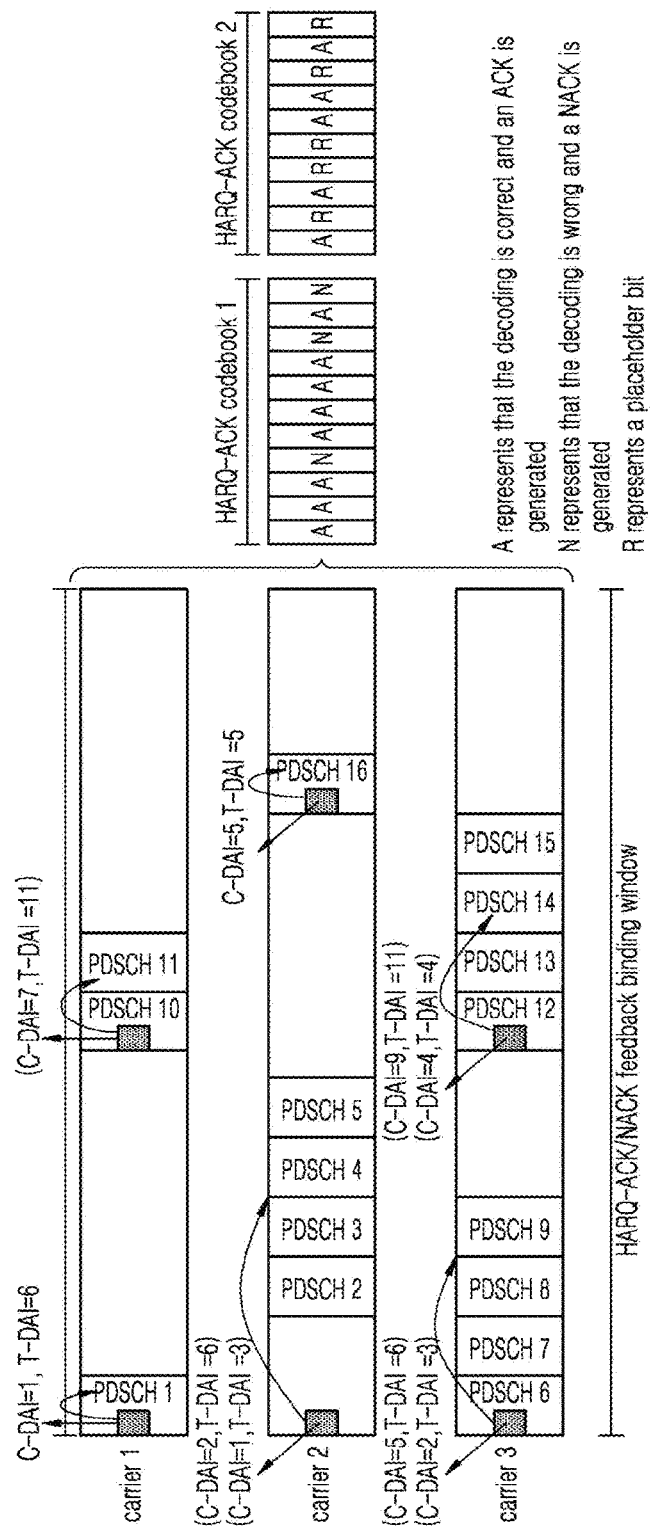
FIG. 5 schematically illustrates a HARQ-ACK/NACK feedback binding window and a HARQ-ACK/NACK codebook according to Example 6.

FIG. 5 schematically illustrates the HARQ-ACK/NACK feedback binding window and the HARQ-ACK/NACK codebook according to Example 6. As shown in FIG. 5, the base station configures three carriers for the UE. In the HARQ-ACK/NACK binding window, the UE monitors a PDCCH on all the three carriers in the first PDCCH monitoring occasion. It is assumed that carrier 1 is configured to only support a TB as the transmission granularity, and each PDSCH feeds back a 1-bit HARQ-ACK/NACK. Carrier 2 and carrier 3 are configured to use a CBG as the transmission granularity, each PDSCH based on the CBG feeds back $N_{max\_cbg}=2$ bits of HARQ-ACK/NACKs, and each PDSCH based on the TB feeds back 1 bit of HARQ-ACK/NACK. Here, the PDCCH of the carrier 1 schedules PDSCH 1, which belongs to PDSCH group 1. C-DAI=1 represents that this PDSCH is the first PDSCH scheduled in this PDCCH monitoring occasion, and T-DAI=6 represents that the number of all the PDSCHs in this PDCCH monitoring occasion is 6. The PDCCH of the carrier 2 schedules PDSCHs 2-5, the PDSCH 2, the PDSCH 3 and the PDSCH 5 are the TB based transmissions, and the PDSCH 4 is the CBG based transmission, and thus, the PDSCH 2, the PDSCH 3 and the PDSCH 5 belong to the PDSCH group 1, and the PDSCH 4 belongs to PDSCH group 2. In the group 1, C-DAI=2 and T-DAI=6, and in the group 2, C-DAI=1 and T-DAI=3. The PDCCH of the carrier 3 schedules PDSCHs 6-9, which indicates that the PDSCH 6 and the PDSCH 7 are the CBG based transmissions, and the PDSCH 8 and the PDSCH 9 are the TB based transmissions, and thus, the PDSCH 8 and the PDSCH 9 belong to the PDSCH group 1, and the PDSCH 6 and the PDSCH 7 belong to the PDSCH group 2. In the group 1, C-DAI=5 and T-DAT=6, and in the group 2, C-DAT=2 and T-DAT=3. Then, in the next PDCCH monitoring occasion, the UE monitors a PDCCH on two carriers (the carrier 1 and the carrier 3). The PDCCH of the carrier 1 schedules PDSCHs 10-11. The PDSCHs 10-11 belong to the PDSCH group 1 in which C-DAI=7 and T-DAI=11. The PDCCH of the carrier 3 schedules PDSCHs 12-15, which indicates that the PDSCHs 12-14 are the TB based transmissions, and the PDSCH 15 is the CBG based transmission, and thus, the PDSCHs 12-14 belong to the PDSCH group 1, and the PDSCH 15 belongs to the PDSCH group 2. In the group 1, C-DAI=9 and T-DAI=11, and in the group 2, C-DAI=4 and T-DAI=4. Then, in the next PDCCH monitoring occasion, the UE monitors a PDCCH on one carrier (the carrier 2). Here, the PDCCH of the carrier 2 schedules PDSCH 16. This PDCCH supports the scheduling on at most one PDSCH, and includes only one DAI bit field, which indicates the DAI of the PDSCH group to which the PDSCH belongs. The base station indicates that the PDSCH 16 is the CBG-based transmission, and thus, the PDSCH 16 belongs to the PDSCH group 2. C-DAI=5 and T-DAI=5. When generateing a codebook, the UE generates two HARQ-ACK/NACK codebooks. Codebook 1 includes HARQ-ACK/NACKs of 11 PDSCHs, which includes 11 bits in total. Codebook 2 includes HARQ-ACK/NACKs of 5 PDSCHs, which includes 10 bits in total. The total lenth of the codebooks is 21 bits.

Example 7: The PDSCHs are grouped according to the granularity of the transmission of the PDSCH scheduled by the one PDCCH and/or the HARQ-ACK/NACK feedback of the PDSCHs. It is assumed that the UE is configured to work on at least one carrier in a scheduling and HARQ-ACK/NACK feedback mode that is based on a coding block group (CBG) as a granularity, and thus, the PDSCHs are grouped according to whether the PDSCHs are based on the CBG or a transmission block (TB). If the transmission granularity of the PDSCH is the TB, the PDSCH belongs to PDSCH group 1, and if the transmission granularity of the PDSCH is the CBG, the PDSCH belongs to PDSCH group 2. It is assumed that one PDCCH may schedule a plurality of PDSCHs, the transmission granularities of the PDSCHs scheduled by this PDCCH may be different, and the PDSCH groups of the PDSCHs are determined according to respective transmission granularities.

Optionally, the DCI of the PDCCH for scheduling the PDSCHs may include the first type of DAI and the second type of DAI, which respectively represent the counting on the PDSCHs in the two PDSCH groups. In each DAI bit field, the first type of DAI respectively represents the sum of the numbers of the PDCCHs sent up to the current PDCCH in the HARQ-ACK/NACK feedback binding window and the sum of the numbers of the PDCCHs sent up to the PDCCH monitoring occasion in which the current PDCCH is present. The first type of DAI and the second type of DAI respectively perform the counting in the two PDSCH groups. If all the PDSCHs belong to one PDSCH group in one scheduling, the DAI bit field of the other PDSCH group may be set to a predefined value, or the value of the DAI bit field is not limited, but the UE does not determine the HARQ-ACK/NACK code according to this value.

In the PDSCH group 1, the number $N_t$ of bits of a HARQ-ACK/NACK corresponding to each PDCCH is the maximum number $N_{tb\_pdsch}$ of TB transmission based PDSCHs that may be scheduled by the PDCCH, and each PDSCH corresponds to 1 bit of HARQ-ACK/NACK (assuming that the base station configures one PDSCH and can only send one TB). In the PDSCH group 2, the number $N_t$ of bits of a HARQ-ACK/NACK corresponding to each PDCCH is determined by the maximum number $N_{cbg\_pdsch}$ of CGB transmission based PDSCHs that may be scheduled by the PDCCH and the number $N_{max\_cbg}$ of bits of a HARQ-ACK/NACK of each PDSCH, for example, $N_{cbg\_pdsch} \times N_{max\_cbg}$. Here, the each PDSCH corresponds to $N_{max\_cbg}$ bits of HARQ-ACK/NACKs (assuming that the base station configures one PDSCH and may only send one TB). Optionally, $N_{tb\_pdsch}$ is equal to the maximum number of PDSCHs that may be scheduled by the PDCCH. Optionally, $N_{tb\_pdsch}$ and/or $N_{cbg\_pdsch}$ are predefined, or are configured by the base station.

Figure 6:
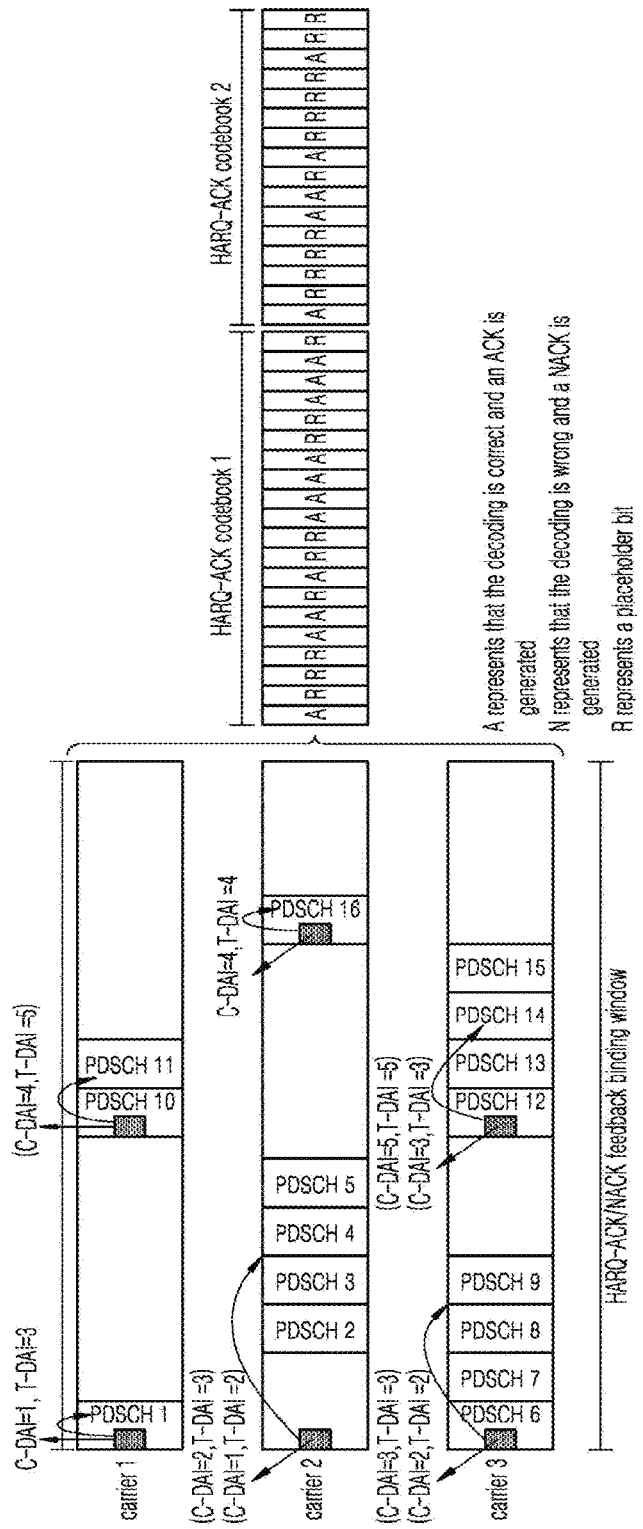
FIG. 6 schematically illustrates a HARQ-ACK/NACK feedback binding window and a HARQ-ACK/NACK codebook according to Example 7.

FIG. 6 schematically illustrates the HARQ-ACK/NACK feedback binding window and the HARQ-ACK/NACK codebook according to Example 7. As shown in FIG. 6, the base station configures three carriers for the UE. The base station configures the maximum number (N=4) of PDSCHs that may be scheduled by one PDCCH, wherein there may be at most two CBG transmission based PDSCHs, and the number of TB transmission based PDSCHs is not limited. Accordingly, $N_{cbg\_pdsch}=2$ and $N_{tb\_pdsch}=4$. In the HARQ-ACK/NACK binding window, the UE monitors a PDCCH on all the three carriers in the first PDCCH monitoring occasion. It is assumed that carrier 1 is configured to only support a TB as the transmission granularity, and each PDSCH feeds back 1 bit of HARQ-ACK/NACK. Carrier 2 and carrier 3 are configured to use a CBG as the transmission granularity, each PDSCH based on the CBG feeds back a HARQ-ACK/NACK of $N_{max\_cbg}=2$ bits, and each PDSCH based on the TB feeds back a 1 bit of HARQ-ACK/NACK. Here, the PDCCH of the carrier 1 schedules PDSCH 1, which belongs to PDSCH group 1. C-DAI=1 represents that this PDSCH is the first PDCCH in this PDCCH monitoring occasion. T-DAI=3 represents that the number of all the PDCCHs in this PDCCH monitoring occasion is 3. The PDCCH of the carrier 2 schedules PDSCHs 2-5, which indicates that the PDSCH 2, the PDSCH 3 and the PDSCH 5 are the TB based transmissions, and the PDSCH 4 is the CBG based transmission, and thus, the PDSCH 2, the PDSCH 3 and the PDSCH 5 belong to the PDSCH group 1, and the PDSCH 4 belongs to PDSCH group 2. In the group 1, C-DAI=2 and T-DAI=3, and in the group 2, C-DAI=1 and T-DAI=2. The PDCCH of the carrier 3 schedules PDSCHs 6-9, which indicates that the PDSCH 6 and the PDSCH 7 are the CBG based transmissions, and the PDSCH 8 and the PDSCH 9 are the TB based transmissions, and thus, the PDSCH 8 and the PDSCH 9 belong to the PDSCH group 1, and the PDSCH 6 and the PDSCH 7 belong to the PDSCH group 2. In the group 1, C-DAI=3 and T-DAI=3, and in the group 2, C-DAI=2 and T-DAI=2. Then, in the next PDCCH monitoring occasion, the UE monitors a PDCCH on two carriers (the carrier 1 and the carrier 3). The PDCCH of the carrier 1 schedules PDSCHs 10-11. The PDSCHs 10-11 belong to the PDSCH group 1 in which C-DAI=4 and T-DAI=5. The PDCCH of the carrier 3 schedules PDSCHs 12-15, which indicates that the PDSCHs 12-14 are the TB based transmissions, and the PDSCH 15 is the CBG based transmission, and thus, the PDSCHs 12-14 belong to the PDSCH group 1, and the PDSCH 15 belongs to the PDSCH group 2. In the group 1, C-DAI=5 and T-DAI=5, and in the group 2, C-DAI=3 and T-DAI=3. Then, in the next PDCCH monitoring occasion, the UE monitors a PDCCH on one carrier (the carrier 2). Here, the PDCCH of the carrier 2 schedules PDSCH 16. This PDCCH supports the scheduling on at most one PDSCH, and includes only one DAI bit field, which indicates the DAI of the PDSCH group to which the PDSCH belongs. The base station indicates that the PDSCH 16 is the CBG-based transmission, and thus, the PDSCH 16 belongs to the PDSCH group 2. C-DAI=4 and T-DAI=4. When generateing the codebook, the UE generates two HARQ-ACK/NACK codebooks. Codebook 1 includes HARQ-ACK/NACKs of 11 PDSCHs scheduled by 5 PDCCHs, and each PDCCH corresponds to 4 bits, and thus, the codebook 1 includes 20 bits in total. Codebook 2 includes HARQ-ACK/NACKs of 4 PDSCHs scheduled by 4 PDCCHs, and each PDCCH corresponds to 2×2=4 bits, and thus, the codebook 2 includes 16 bits in total. The total lenth of the codebooks is 36 bits. Example 7 saves the cost of the DAI more than Example 6, however, the cost of the UCI increases. The reason is that, the each PDCCH generates the HARQ-ACK/NACK according to the maximum number of schedulable PDSCHs belonging to this PDSCH group.

When the HARQ-ACK/NACKs of PDSCHs of a plurality of carriers or the HARQ-ACK/NACKs of PDSCHs of a plurality of downlink time units are fed back in one uplink time unit, and the numbers of the scheduled PDSCHs indicated by the DCI or the DCI formats for scheduling these PDSCHs may be different, the following problem may be avoided by using the schemes according to the above embodiments. When the UE misses one or more PDSCHs (PDCCHs) thereof, the problem that the size or the sequence of the HARQ-ACK/NACK codebook cannot be determined is caused because the number of the missed PDSCHs is not determined.

According to an embodiment, the step of receiving, by the terminal 10, the PDSCHs from the base station 20 according to the received PDCCH further includes: receiving a demodulation reference signal (DMRS) of the PDSCHs.

In this embodiment, the base station predefines a set of patterns of one or more groups of DMRSs. For example, the base station configures a DMRS pattern adopted by one PDSCH or one type of PDSCH through a high-level signaling, and indicates the DMRS pattern through physical layer information, or indicates the DMRS pattern through system information.

For example, the base station may represent the DMRS pattern by configuring a time-frequency resource where the DMRS is present within a time window. The length of this time window and the starting point of the time window are configurable or predefined.

Optionally, the starting point of this time window uses a predefined time point as a reference, for example, uses a starting point based on the starting point of a certain frame/subframe/time slot or a group of system frames/subframes/time slots as a reference.

For example, a DMRS pattern configured by the base station includes period information, time offset information and a duration for determining the time slot in which the DRMS is present. The base station also configures which symbols in these time slots contain the DMRS.

In a specific implementation, it may happen that the time-frequency resource of the scheduled PDSCH do not include the DMRS, and the scheduled PDSCH depends on a DMRS outside the time-frequency resource of the PDSCH for channel estimation. For example, the base station schedules PDSCHs 1-4 through PDCCH 1, and occupies first to seventh symbols and eighth to fourteenth symbols of time slot n and first to seventh symbols and eighth to fourteenth symbols of time slot n+1. The base station schedules PDSCHs 5-8 through PDCCH 2, and occupies first to seventh symbols and eighth to fourteenth symbols of time slot n+2 and first to seventh symbols and eighth to fourteenth symbols of time slot n+3. The DMRS pattern indicated by the base station is the third to fourth symbols of the time slots n, n+2, n+4 . . . . Then, the time-frequency resources of PDSCHs 1 and 3 include the DMRS, and the time-frequency resources of PDSCHs 2 and 4 do not include the DMRS. Optionally, the DMRS pattern indicated by the base station is the third to fourth symbols of the time slots n, n+4, n+8, . . . . Then, the time-frequency resource of PDSCH 1 includes the DMRS, and the time-frequency resources of PDSCHs 2-4 do not include the DMRS.

Optionally, the starting point of this time window uses a specific time point of the scheduled PDSCH as a reference. For example, the starting point of this time window is the time starting point of the first PDSCH, or the starting point of this time window is the starting point of the downlink time unit where the time starting point of the first PDSCH is located, for example, the starting point of the downlink time slot where the time starting point of the first PDSCH is located. As another example, the starting point of this time window uses the time starting point of each scheduled PDSCH as a reference.

Optionally, the base station configures an offset between the starting point of this time window and the time starting point as the reference.

For example, a DMRS pattern configured by the base station includes a symbol index, which is used to determine which symbols include the DMRS from the first PDSCH. It is assumed that the DMRS pattern is the third symbol of the first time slot and the third symbol of the third time slot. The base station schedules four PDSCHs through one DCI, and each PDSCH occupies one time slot. Thus, the first time slot of the DMRS pattern is the time slot where the starting point of the PDSCH 1 is located. Therefore, the third symbols in the PDSCHs 1 and 3 includes the DMRS, and the PDSCHs 2 and 4 do not include the DMRS.

For example, a DMRS pattern configured by the base station includes a symbol index, which is used to determine which symbols starting from each PDSCH include the DMRS. It is assumed that the DMRS pattern is the first symbol and the sixth symbol of a PDSCH. The base station schedules four PDSCHs through one DCI, and each PDSCH occupies one time slot. For the each PDSCH, the first symbol and the sixth symbol of the each PDSCH respectively include the the DMRS.

As another example, one of the DMRS patterns configured by the base station may include a symbol index and a time offset to determine which symbols starting from a certain symbole relative to the starting point of the PDSCH include the DMRS or to determine which of the subsequent symbols include the DMRS.

Optionally, the base station configures whether there is an additional DMRS. If there is the additional DMRS, the position of the additional DMRS is determined separately according to the time domain information on each scheduled PDSCH; or, the position of the additional DMRS is determined according to the time domain information on all the PDSCHs scheduled by the DCI of one PDCCH.

For example, when a length of the PDSCH is less than or equal to a threshold Th_p, there is only a first group of DMRSs. When the length is greater than the threshold Th_p, there is a second group of DMRS, and the second group of DMRS is offset backward by X_p symbols from the symbol position of the first group of DMRS. It is assumed that Th_p=10 symbols. The base station schedules 4 PDSCHs through one DCI, and the length of each PDSCH is 7 symbols, and X_p=8 symbols. Accordingly, if the position of the additional DMRS is determined separately according to the time domain information on each scheduled PDSCH, since the length (7 symbols) of the each PDSCH is less than Th_p, there is only the first group of DMRSs in the each PDSCH. If the position of the additional DMRS is determined according to the time domain information on all the PDSCHs scheduled by the DCI of the one PDCCH, since the total length of the four PDSCHs is 28 symbols and is greater than Th_p, in the 28 symbols of the four PDSCHs, the first symbol includes the first group of DMRS and the ninth symbol includes the second group of DMRS. That is, PDSCH 1 and PDSCH 2 include the DMRS, and PDSCH 3 and PDSCH 4 do not include the DMRS.

Optionally, the duration of the time window is Y milliseconds, or Y time slots. Optionally, a part of the DMRS pattern may be predefined.

Optionally, the corresponding relationship between a PDSCH type and the DMRS pattern is predefined or is configured by the base station. For example, the DMRS pattern corresponding to a plurality of PDSCHs scheduled by the DCI of the one PDCCH is predefined, or is configured by the base station when configuring a plurality of PDSCH schedulings.

Optionally, the base station indicates a DMRS pattern in the set of DMRS patterns through the DCI.

Optionally, the base station indicates Quasi-located information (QCL) or precoding information on the DMRS and PDSCH. For example, if the DMRS pattern indicated by the base station is periodic, the base station may indicate that the DMRS in a time slot that is N time slots apart from the PDSCH and the PDSCH adopt the same precoding matrix.

Figure 7:
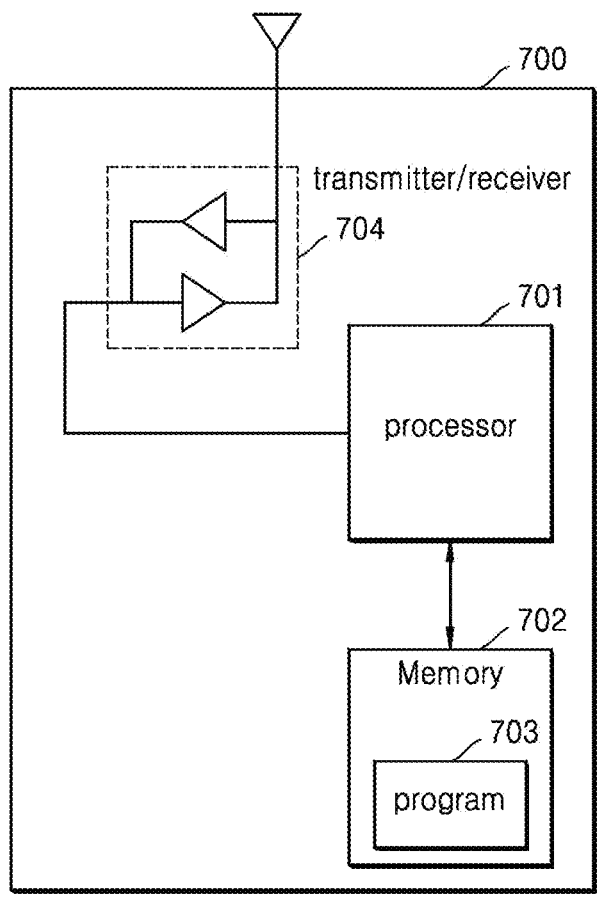
FIG. 7 is a schematic block diagram of an entity of a device that may be configured to practice according to embodiments of the present disclosure.

FIG. 7 is a simplified block diagram of an entity 700 applicable to practice various exemplary embodiments of the present disclosure. The entity 700 may be configured to be a network-side device such as a base station. The entity 700 may also be configured to be a user-side device such as a user equipment.

As shown in FIG. 7, the entity 700 includes a processor 701, a memory 702 coupled to the processor 701, and a suitable radio frequency (RF) transmitter and receiver 704 coupled to the processor 701. The memory 702 stores a program 703. The transmitter/receiver 704 is suitable for a two-way wireless communication. It should be noted that the transmitter/receiver 704 has at least one antenna for assisting communication, and in practice, the base station or the UE may have a plurality of antennas. The entity 700 may be coupled to one or more external networks or systems such as the Internet, via a data path.

The program 703 may include program instructions. The program instructions, when executed by the associated processor 701, cause the entity 700 to operate according to the respective exemplary embodiments of the present disclosure.

The embodiments of the present disclosure may be implemented by computer software which may be executed by the processor 701 of the entity 700, or by hardware, or by a combination of software and hardware.

The memory 702 may be any appropriate type of memory suitable for a local technical environment, and may be achieved by any appropriate data-storage technology, for example, a storage device and system based on a semiconductor, a magnetic storage device and system, an optical storage device and system, a fixed memory and a removable memory, which are only non-restrictive examples. Although only one memory is illustrated in the entity 700, a plurality of physically independent storage units may be present in the entity 700. The processor 701 may be any appropriate type of processor suitable for the local technical environment, and may include one or more of: a general-purpose computer, a special-purpose computer, a microprocessor, a digital signal processor (DSP) and a processor based on multi-core architecture, which are only non-restrictive examples.

When the entity 700 is configured to be the network-side device, that is, the entity 700 may be a user device. In some embodiments, the receiver in the transmitter/receiver 704 is configured to receive, under the control of the processor 701, a PDCCH including DCI from the base station.

The receiver in the transmitter/receiver 704 is further configured to receive, under the control of the processor 701, a PDSCH scheduled by the PDCCH from the base station according to the DCI of the received PDCCH.

The transmitter in the transmitter/receiver 704 is configured to send, under the control of the processor 701, a HARQ-ACK/NACK codebook for the PDSCH to the base station.

When the entity 700 is configured to be the network-side device, i.e., the user device. In some embodiments, the transmitter in the transmitter/receiver 704 is configured to send, under the control of the processor 701, the PDCCH including the DCI to a terminal.

The transmitter in the transmitter/receiver 704 is further configured to send the PDSCH scheduled by the PDCCH to the terminal.

The receiver in the transmitter/receiver 704 is configured to receive, under the control of the processor 701, the HARQ-ACK/NACK codebook for the PDSCH from the terminal.

It should be appreciated that, each unit included in the entity 700 is configured to pratice the exemplary embodiments disclosed herein. Therefore, the above operations and feathers described in combination with FIGS. 1-6 are also applicable to the entity 700 and the units therein, and a detailed description thereof will be omitted herein.

In another aspect, the present disclosure further provides a computer readable storage medium. The computer readable storage medium may be the computer readable storage medium included in the base station or the communication device described in the above embodiments, or a stand-alone computer readable storage medium not assembled into the device. The computer readable storage medium stores one or more programs. The one or more programs, when executed by one or more processors, perform the communication method described in the present disclosure.

The disclosure described below is to solve the issues on related issues on BW size indication, frequency resource determination, RBG determination by assuming the subband devision is possible, which is aligned with identifying issues by considering practical RF impairments. Also, this disclosure is to enhance on power control. In an exemplary embodiment, a method to receive DCI and data may be disclosed as below. For example, Frequency resource configuration in one or multiple subbands (including bandwidth indication for subbands design, RBG determination) may be disclosed in this disclosure. For example, the bandwidth determination for CQI/PMI calculation may be disclosed in this disclosure. For example, separate power limits configuration based different services may be disclosed in this disclosure. More details will be described below using the following drawings.

Embodiment 1

Figure 8:
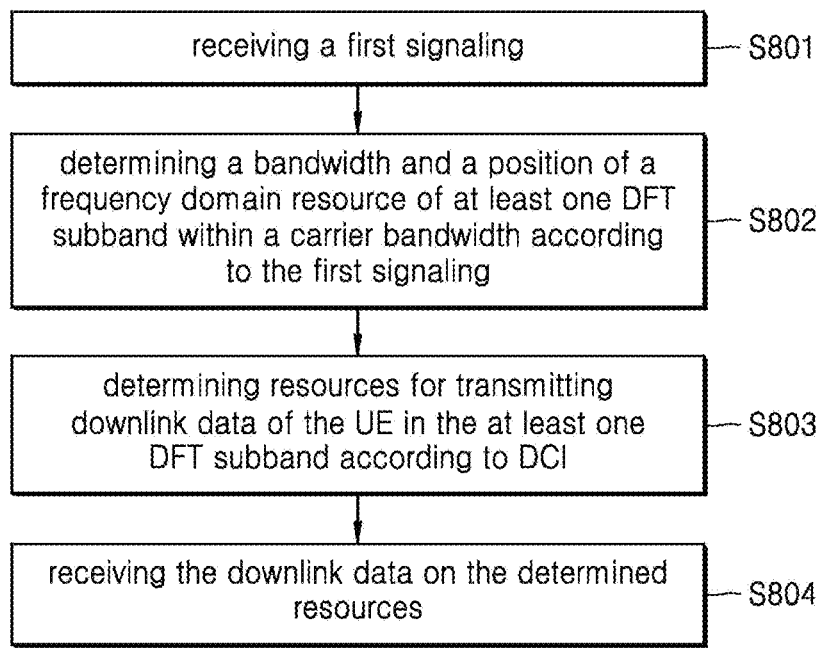
FIG. 8 is a schematic flowchart of a method for receiving data according to embodiments of the present disclosure.

FIG. 8 is a schematic flowchart of a method for receiving data provided by an embodiment of the present disclosure. An embodiment of the present disclosure provides a method for receiving data, applied to UE. A schematic flowchart of the method is shown in FIG. 8. The method includes:

Step S801: receiving a first signaling.

Step S802: determining a bandwidth and a position of a frequency domain resource of at least one Discrete Fourier Transform DFT subband within a carrier bandwidth according to the first signaling.

Step S803: determining resources for transmitting (receiving) downlink data of the UE in the at least one DFT subband according to downlink control information DCI.

Step S804: receiving the downlink data on the determined resources.

In the embodiment of the present disclosure, receiving a first signaling; determining a bandwidth and a position of a frequency domain resource of at least one Discrete Fourier Transform DFT subband within a carrier bandwidth according to the first signaling; determining resources for transmitting downlink data of the UE in the at least one DFT subband according to downlink control information DCI; receiving the downlink data on the determined resources and thus, receiving data at high frequency is achieved.

Optionally, the determining a bandwidth and a position of a frequency domain resource of at least one DFT subband comprises at least one of the following:
receiving the bandwidth and the position of the frequency domain resources of the at least one DFT subband according to the first signaling, the first signaling including at least one of high-level signaling, system information, protocol presets, and physical layer signaling;
wherein, a basic unit of the bandwidth of the frequency domain resources of the DFT subband is a physical resource block PRB.

Optionally, the DCI includes indication information of a resource block group RBG, and the determining resources for transmitting downlink data of the UE in the at least one DFT subband according to DCI comprises at least one of the following:
determining, according to the indication information of the RBG, a PRB corresponding to the RBG in the at least one DFT subband as a resource for transmitting the downlink data of the UE;
wherein, the RBG is determined in a unit of the DFT subband, and there is a situation that PRBs belonging to one RBG are not located in two DFT subbands, respectively; or, the RBG is determined in a unit of a Carrier or Wideband Part BWP, there is a situation that the PRBs belonging to one RBG are located in two DFT subbands.

Optionally, the determining resources for transmitting downlink data of the UE in the at least one DFT subband according to downlink control information DCI comprises at least one of the following:
determining a resource for transmitting the downlink data of the UE in a DFT subband where the DCI is located according to the DCI;
determining a resource for transmitting the downlink data of the UE in the at least one DFT subband according to one DCI;
receiving a first instruction sent by a base station through explicit signaling or implicit signaling, and determining to use one of the following ways according to the first instruction: determining a resource for transmitting the downlink data of the UE in a DFT subband where the DCI is located according to the DCI; determining a resource for transmitting the downlink data of the UE in the at least one DFT subband according to one DCI.

Optionally, the determining a resource for transmitting the downlink data of the UE in the at least one DFT subband according to one DCI comprises at least one of the following:
determining, according to the one DCI, resources at the same position in at least two DFT subbands from among the at least one DFT subband as resources for transmitting the downlink data of the UE;
determining, according to the one DCI, the corresponding resources in at least two DFT subbands from among the at least one DFT subbands as resources for transmitting the downlink data of the UE.

Optionally, a DFT subband includes: a synchronization signal, a physical broadcast channel block, and remaining minimum system information.

Optionally, when at least one DFT subband is the initial BWP, the bandwidth and position of the DFT subband where the initial BWP is located are determined according to the subcarrier width configuration of the DFT subband.

Optionally, the receiving the downlink data on the determined resources includes:

In the DFT subband, the downlink data is received on the determined resources in the order of the frequency domain first and then the time domain.

FIGS. 9 to 12 are schematic diagrams of a DFT subband structure provided by an embodiment of the present disclosure.

Figure 9:
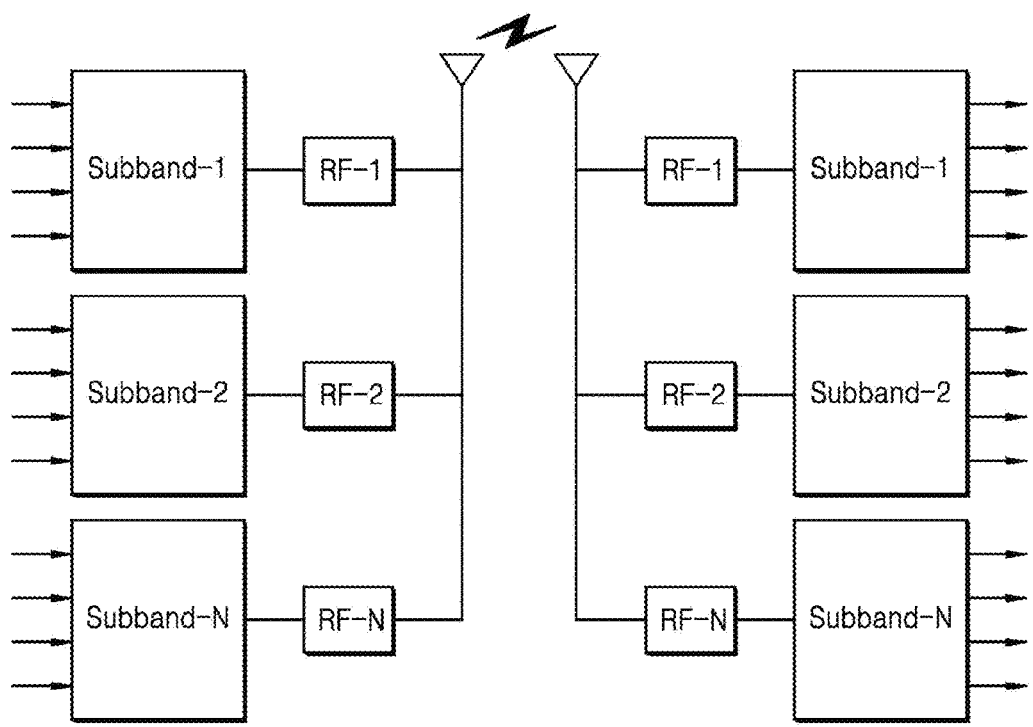
FIG. 9 is a schematic diagram of a DFT subband structure according to embodiments of the present disclosure.
Figure 10:
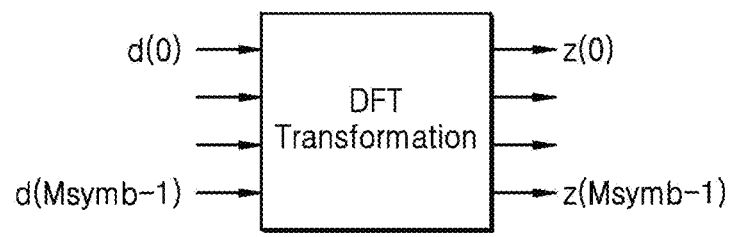
FIG. 10 is a schematic diagram of a DFT subband structure according to embodiments of the present disclosure.
Figure 11:
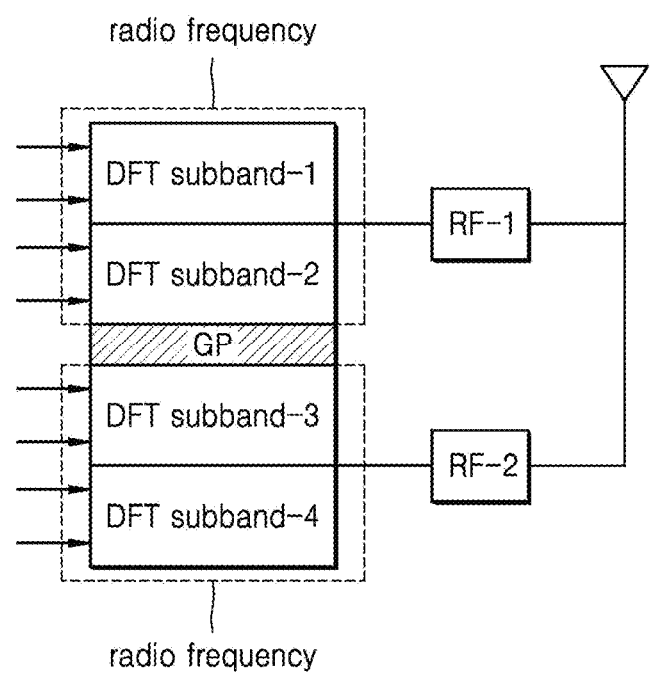
FIG. 11 is a schematic diagram of a DFT subband structure according to embodiments of the present disclosure.

Optionally, the resource allocation method in the case where a subband in a BWP is sent by multiple radio frequency units is described. Due to the large bandwidth, multiple radio frequency units are used, and each radio frequency unit contains a sub-frequency band, as shown in FIG. 9, each subband is transmitted and received by an independent radio frequency. This subband is called radio frequency subband. In addition, in order to reduce the PARP of the signal, DFT transformation is performed on the downlink transmission. The frequency band in which DFT transformation is performed is referred to as DFT subband, and DFT transformation is performed in the DFT subband, as shown in FIG. 10. A radio frequency subband may include one DFT subband, or may include multiple DFT subbands. When a DWP contains multiple DFT subbands, the multiple DFT subbands may belong to one radio frequency subband, or may belong to multiple radio frequency subbands. Within a BWP, multiple DFT subbands that belong to the same radio frequency subband can be continuous, and no Guard Band (GP) is required, while DFT subbands that belong to different radio frequency subbands need GP, as shown in FIG. 11, four DFT subbands are configured in a GWP, which are DFT subband-1, DFT subband-2, DFT subband-3, DFT subband-4. The DFT subband-1 and the DFT subband-2 belong to radio frequency subband-1, the DFT subband-3 and the DFT subband-4 belong to radio frequency subband-2, no GP is required between the DFT subband-1 and the DFT subband-2, and no GP is required between the DFT subband-3 and the DFT subband-4. The DFT subband-2 and the DFT subband-3 belong to RF subband-1 and RF subband-2, respectively, so GP is required between the DFT subband-2 and the DFT subband-3. The UE may determine whether there is a GP between DFT subbands and the width of the GP by receiving a high-level signaling configuration.

The base station transmits the frequency domain resource information of the at least one DFT subband to the UE.

Optionally, the information may include a bandwidth and a position of a frequency domain resource of a DFT subband determined in the following manner, which will be described below.

Figure 12:
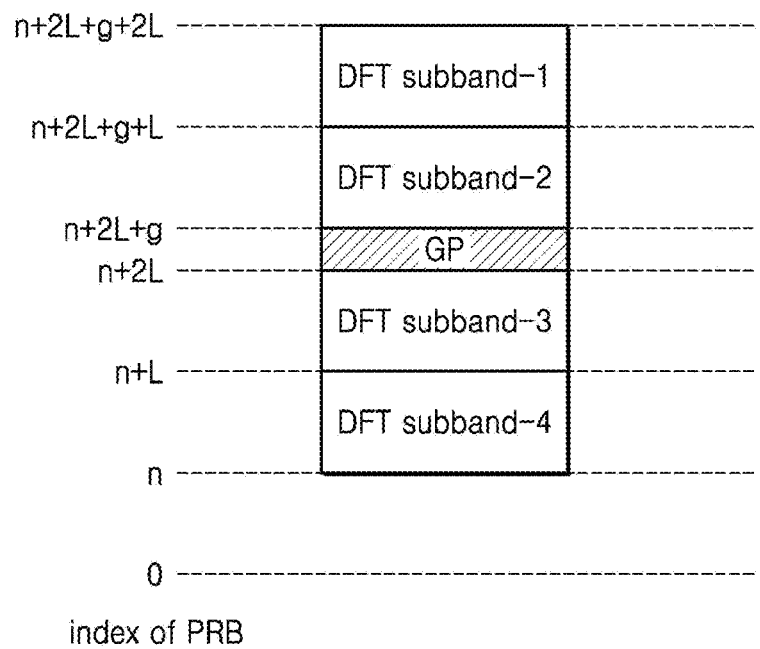
FIG. 12 is a schematic diagram of a DFT subband structure according to embodiments of the present disclosure.

Optionally, the base station may transmit the bandwidth and position of frequency domain resources of at least one DFT subband to the UE through signaling including the following: high-level signaling configuration (UE-specific high-level signaling configuration or cell common high-level signaling configuration), system information, or protocol presets, or physical layer signaling. Herein, the physical layer signaling refers to the information in the Downlink Control Information (DCI). As shown in FIG. 12, the width of each DFT subband is L PRBs, the starting point of DFT subband-4 is n, and the GP between the DFT subband-3 and the DFT subband is g PRBs.

Optionally, the base station determines that the bandwidth of the DFT subband is in units of N (N is a positive integer) PRBs, that is, the bandwidth of the DFT subband is a multiple of N PRBs. The advantage of this is that each PRB belongs to only one DFT subband, and it does not appear that one PRB belongs to two adjacent DFT subbands.

The base station transmits, to the UE, information on frequency domain resources for transmitting DCI and data in a DFT subband.

Optionally, there may be two ways of determining a resource block group (RBG), which are described below respectively.

Method 1:

The RBG is determined in units of DFT subbands, there is no situation that the PRBs in an RBG are in two DFT subbands. Assuming a carrier bandwidth of 40 MHz and a subcarrier interval of 15 kHz, this carrier includes 2 DFT subbands, each DFT subband has a bandwidth of 20 MHz. The carrier includes 220 PRBs. Each DFT subband includes 110 PRBs. The index of the PRBs of the first DFT subband is PRB0~PRB109. The assignable resources are 110 PRBs at 19.8 MHz, the remaining 0.2 MHz is the guard band which is beyond the PRB0. The index of the PRBs of the second DFT subband is PRB110~PRB219. The size of each RBG is 8 PRBs. The first DFT subband includes rounding up (110/8)=14 RBGs, 13 RBGs of which include 8 PRBs and one RBG of which includes 6 PRBs, and the second DFT subband also includes rounding up (110/8)=14 RBGs, 13 RBGs of which include 8 PRB and one RBG of which includes 6 PRBs. This method can make distribution easier.

Method 2:

The RBG is determined in units of the carrier or BWP. It is possible that PRBs of one RBG is in two DFT subbands. Assuming a BWP bandwidth of 40 MHz and a subcarrier interval of 15 kHz, this BWP includes 2 DFT subbands, each DFT subband has a bandwidth of 20 MHz, BWP includes 220 PRBs. Each DFT subband includes 110 PRBs. The index of the PRBs of the first DFT subband is PRB0~PRB109, and the assignable resources are 110 PRBs at 19.8 MHz, and the remaining 0.2 MHz is the guard band which is beyond the PRB0. The index of the PRBs of the second DFT subband is PRB110~PRB219. The size of Each RBG is 8 PRBs. The two DFT subbands include rounding up (220/8)=28 RBGs, wherein 27 RBGs include 8 PRBs and one RBG includes 4 PRBs. The first DFT subband includes 13 RBGs, each RBG includes 8 PRBs, and there is one RBG at the middle of the first DFT subband and the second DFT subband, the one RBG includes 8 PRBs, 6 PRBs of which are in the first DFT subband and 2 PRBs of which are in the second DFT subband. The second DFT subband includes 14 RBGs, 13 RBGs of which include 8 PRBs, and one RBG of which includes 4 PRBs.

Optionally, in the same time slot, for the resource allocation in different DFT subbands, there may be the following resource allocation modes.

Figure 13:
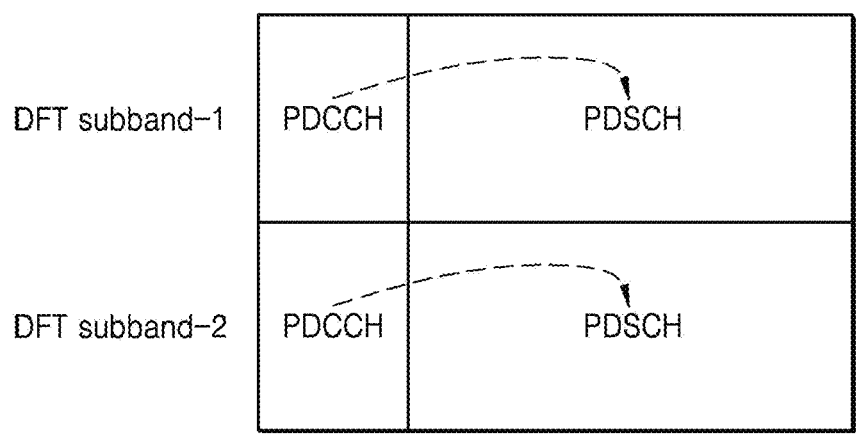
FIG. 13 is a schematic diagram of resource scheduling according to embodiments of the present disclosure.

FIG. 13 is a schematic diagram of resource scheduling provided by an embodiment of the present disclosure.

Method 1:

Individually allocate resources for each DFT subband within a carrier or BWP, that is, a control resource set is configured in each DFT subband, and a control resource set in each DFT subband allocate time-frequency resources in the DFT subband to transmit data. For example, there are two DFT subbands. The base station configures individually each DFT subband with a control resource set. The UE blindly detects the PDCCH in the control resource set of each DFT subband. The PDCCH in each control resource set can allocate the PDSCH in the DFT subband where the PDCCH is located, as shown in FIG. 13. The advantage of this is that because the number of available OFDM symbols in each DFT subband is the same, the allocation is relatively simple, but when there are more DFT subbands in a carrier, each DFT subband is allocated separately to increase resources occupied by control channel.

Figure 14:
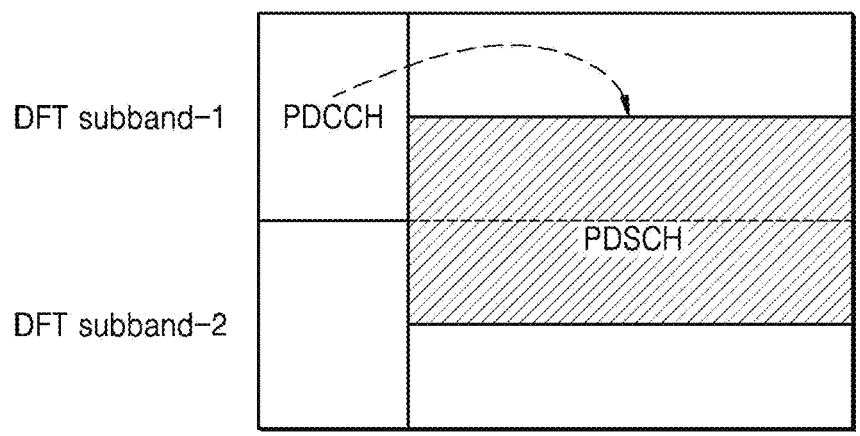
FIG. 14 is a schematic diagram of resource scheduling according to embodiments of the present disclosure.

FIG. 14 is a schematic diagram of resource scheduling provided by an embodiment of the present disclosure.

Method 2:

Where resources of multiple DFT subbands in a carrier or BWP are jointly allocated, the control resource set in each DFT subband can allocate the time-frequency resources in the DFT subband, or the time-frequency resources in the other DFT subband of the carrier or the BWP where the DFT subband is located, that is, the PDCCH in one DFT subband can allocate PDSCH in multiple DFT subbands, and resources in multiple DFT subbands are used to transmit one PDSCH, or the resources in each DFT subband are used to transmit one PDSCH. For example, there are two DFT subbands. The PDCCH of the control resource set in one DFT subband can allocate resources to the PDSCH in the two DFT subbands. The PDCCH of DFT subband-1 allocates time-frequency resources to the PDSCH transmitted on DFT subband-1 and DFT subband-2, as shown in FIG. 14. The advantage of this is that when there are more DFT subbands in one carrier, the resources occupied by the control channel are saved, because the resources of multiple DFT subbands can be allocated by one PDCCH.

Method 3:

The base station may indicate to the UE whether the resources of multiple DFT subbands within the carrier or within the BWP are allocated separately or jointly through a high-level signaling configuration. For example, the high-level signaling configuration transmitted by the base station indicates that DFT subband-1 and DFT subband-2 in the BWP are jointly allocated (herein, joint allocation means that a PDCCH in a DFT subband can allocate resource of a DFT subband where PDCCH is not allocated to transmit data, and allocate resource of multiple DFT subbands to transmit data), or the high-level signaling configuration transmitted by the base station indicates that DFT subband-1 and DFT subband-2 within the BWP are allocated separately (that is, a PDCCH can only allocate time-frequency resources in the DFT subband where the PDCCH is located to transmit data).

Method 4:

The base station can indicate whether the resources of each DFT subband are allocated separately or jointly through different search spaces. For example, the common search space is allocated separately; the UE-specific search space is jointly allocated. Or, for the UE-specific search space, the base station may indicate whether the resources of each DFT subband are allocated separately or jointly through different DCI formats, that is, whether the allocation is separately or joint depends on the DCI formats with which the PDSCH is allocated. The number of bits of some DCI formats is determined based on separately allocation. The UE blindly detects DCI based on the number of bits determined by the separate allocation method when blindly detecting PDCCH. The number of bits of some DCI formats is determined based on joint allocation. The UE blindly detects DCI based on the number of bits determined by the joint allocation method when blindly detecting PDCCH, and the number of bits of the separately allocated DCI format and that of the joint allocated DCI format are different. For example, DCI in fallback format (e.g., DCI format 1-0) is allocated separately, that is, DCI format 1-0 can only allocate resources in the DCT subband where DCI format1-0 is located to transmit PDSCH; DCI in non-fallback format (e.g., DCI format 1-1) is allocated jointly, that is, DCI format 1-1 in one DCT subband can allocate resources in multiple DFT subbands to transmit PDSCH. The advantage of this is that the allocation is flexible. If you want to save the number of PDCCH bits and the amount of data allocated is relatively small, the DCI in fallback format can be applied for allocation. For the DCI allocation using the non-fallback format, a large amount of data needs to be transmitted, and there are also more resources. More DFT subband resources can be allocated through one PDCCH.

Optionally, for joint allocation, there are the following ways.

Method 1:

The relative positions of the resources allocated in each DFT subband performing carrier monitoring in the carrier or BWP are the same, that is, one DCI allocates resources in multiple DFT subbands, and the resources allocated in each DFT subband are same, that is, the frequency-domain PRB number of resources allocated in each DFT subband is the same as the relative position in the DFT subband, and the DFT subband instruction information is added to the DCI to indicate which DFT subbands are allocated. For example, applying the bit mapping method, the BWP includes 2 DFT subbands, and then uses the 2-bit DFT subband indication information to indicate respectively the allocation of the 2 DFT subbands, that is, each bit indicates the allocation of 1 DFT subband. When the bit value is "1", the resources corresponding to the DFT subband are allocated. When the bit value is "0", the resources corresponding to the DFT subband are not allocated.

Method 2:

The resources of each DFT subband that perform carrier monitoring in the carrier or BWP are uniformly allocated. The PDCCH in each DFT subband can allocate resources in all DFT subbands in the BWP, and the resources allocated in each DFT subband may be different. The frequency domain resources in each DFT subband may be different, and the time domain resources in each DFT subband may be different. The resource allocation field in DCI includes a time domain resource allocation field and a frequency domain resource allocation field.

The frequency domain resources indicated in the frequency domain resource allocation field may be frequency domain resources in more than one DFT subband. The PRBs of multiple DFT subbands are uniformly numbered. One RBG will be located in two adjacent DFT subbands. For example, if a carrier has a bandwidth of 40 MHz, the subcarriers interval is 15 kHz, including 222 PRBs, and the size of RBG is 8 PRBs, there will be a total of 28 RBGs, wherein, for the 27 RBGs, each RBG includes 8 PRBs, and the other one RBG includes six PRBs. Among them, the bandwidth of the first DFT subband includes 13 RBGs, each RBG includes 8 PRBs, a total of 13*8=104 PRBs, and the RBGs are numbered 0-12. The bandwidth of the second DFT subband includes 13 RBGs with 8 PRBs, a total of 13*8=104 PRBs, the RBGs are numbered 14-26, and RBG with the number 13 (the RBG with the number 13 is located in two adjacent DFT subbands) includes 8 RBGs, wherein, 7 PRBs belong to the first DFT subband, 1 PRB belongs to the second DFT subband, and the bandwidth of the second DFT subband includes 1 RBG with 6 PRBs, with number 27. The frequency domain resource allocation field may include 28 bits. Each bit indicates whether resources in each RBG are allocated or not. When the value of the bit is "1", the resources of the PRB in the RBG are allocated. When the value of the bit is ""0", the resources of the PRB in the RBG are not allocated.

The frequency domain resources indicated in the frequency domain resource allocation field may be frequency domain resources in more than one DFT subband. The PRBs of each DFT subband are independently numbered, and one RBG will not be located in two adjacent DFT subbands. For example, if a carrier has a bandwidth of 40 MHz, the subcarriers interval is 15 kHz, including 222 PRBs, and the size of RBG is 8 PRBs, there will be a total of 28 RBGs, wherein, for 26 RBGs, each RBG includes 8 PRBs, and the other 2 RBGs include 7 PRBs. Among them, the bandwidth of the first DFT subband includes 14 RBGs. Wherein, for 13 RBGs, each RBG include 8 PRBs, there are a total of 13*8=104 PRBs, and the number of RBGs is 0-12. For the other one RBG, it includes 7 PRBs, the number of the RBG is 13. There are 111 PRBs included in the bandwidth of the first DFT subband. There are 14 RBGs included in the bandwidth of the second DFT subband, wherein, for 13 RBGs, each RBG includes 8 PRBs, so there are a total of 13*8=104 PRBs, and the number of RBGs is 14-26. Wherein, for the other one RBG, it includes 7 PRBs, the numer of the RBG is 27. There are 111 RBGs included in the bandwidth of the second DFT subband. The frequency domain resource allocation field may include 28 bits. Each bit indicates whether the resources in each RBG are allocated or not. When the value of this bit is "1", the resources of the PRB in the RBG are allocated. When the value of this bit is "0", the resources of the PRB in the RBG are not allocated.

The time domain resource allocation field can share a field, that is, the numbers of OFDM symbols included in the time domain allocated on all the resources in the DFT subband are the same. At this time, only one time domain allocation field is required, which saves the number of bits for the time domain resource allocation field.

Or, the time-domain resources in each DFT subband are allocated separately. Because the carrier monitoring of each DFT subband is performed separately, the idle time of each DFT subband may also be different. This will use resources more efficiently and may indicate that more bits are needed. For example, the bandwidth of a carrier includes two DFT subbands. The DCI includes two time domain resource allocation fields, which are a first time domain resource allocation field and a second time domain resource allocation field. Each time domain resource allocation field indicates the time domain resources in each DFT subband, for example, the first time domain resource allocation field is allocated with OFDM symbols 1-10, and the second time domain resource allocation field is allocated with OFDM symbols 0-12.

Optionally, the Synchronization Signal and the Physical Broadcast Channel Block (SS/PBCH Block) are in a DFT subband, and the Remaining Minimum System Information (RMSI) is in a DFT subband. The initial BWP is a DFT subband. The bandwidth of the DFT subband where the initial BWP is located is preset. The bandwidth of the DFT subband where the initial BWP is located can be determined according to the sub-carrier width configuration of the DFT subband.

Optionally, in a DFT subband, the coded and modulated data symbols are mapped to the allocated physical resources in the order of frequency domain first and time domain first, and then mapped to the allocated physical resources in the next DFT subband in order of frequency domain first and time domain sequentially. Optionally, the allocated physical resources include N DFT subbands, each DFT subband includes P PRBs, M OFDM symbols, each PRB includes 12 subcarriers, and each OFDM symbol in each DFT subband includes P*12 subcarriers, where the serial numbers of the subcarriers are recorded as {0, 1, ..., n, ..., P*12−1}, and the serial numbers of the M OFDM symbols are {0, 1, ..., M−1}, each physical resource is recorded as rp, m, where p represents the serial number of the subcarrier, m represents the serial number of the OFDM symbol, and the data symbol is represented as {a0, a1, ..., aP*12*M−1}, and the mapping of the data symbol starts from the lowest subcarrier of OFDM symbol 0 in DFT subband 0, to subcarrier P*12-1 of OFDM symbol 0 in sequence, and then to all subcarriers of OFDM symbol 1, and so on, to subcarrier P*12-1 of OFDM symbol M1, and then to DFT subband-1 according to the DFT subband method until to DFT subband N−1.

In this way, if part of the DFT subband is severely interfered, part of the CB is wrong, and part of the CB is correct. In combination with the method for feeding back HARQ-ACK in units of Coding Block Group (CBG), a part of data retransmission can be reduced. After receiving signaling information (including high-level signaling, physical layer signaling, and media access layer signaling), the UE determines to map to the allocated physical resources in the order of frequency domain and time domain in the DFT subband, and then map to the next DFT subband, and the CBG packet is determined in units of the DFT subband, that is, the time-frequency resource to which a CBG is mapped belongs to a DFT subband.

Embodiment 2

Figure 15:
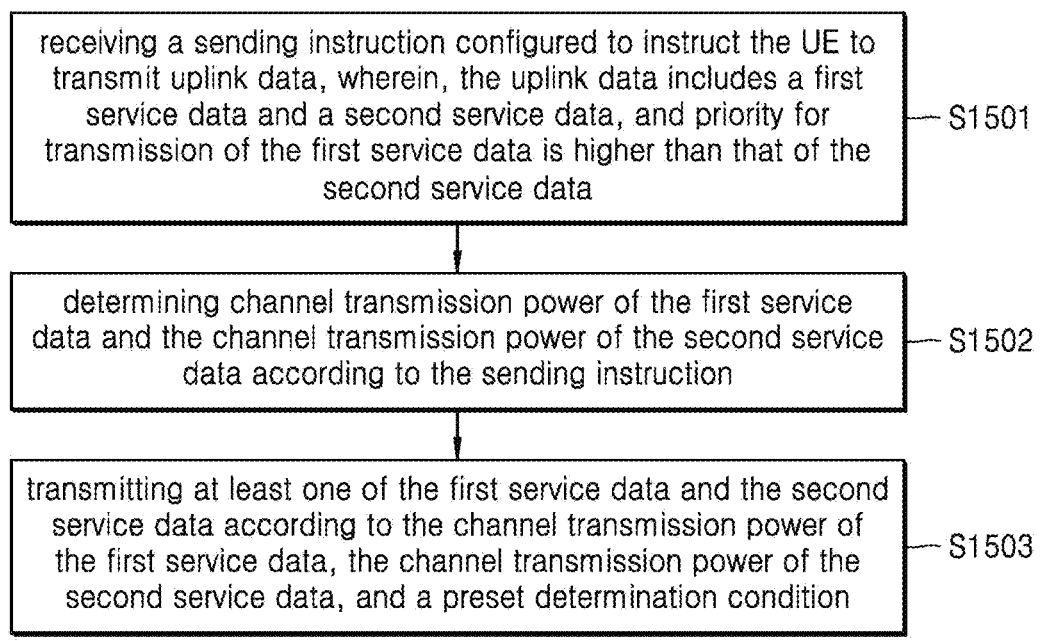
FIG. 15 is a schematic flowchart of a method for transmitting data according to embodiments of the present disclosure.

An embodiment of the present disclosure provides a method for transmitting data, applied to a UE. A schematic flowchart of the method is shown in FIG. 15, and the method includes:

Step S1501: receiving a sending instruction configured to instruct the UE to transmit uplink data, wherein, the uplink data includes first service data and second service data, and priority for transmission of the first service data is higher than that of the second service data.

Step S1502: determining channel transmission power of the first service data and the channel transmission power of the second service data according to the sending instruction.

Step S1503: transmitting at least one of the first service data and the second service data according to the channel transmission power of the first service data, the channel transmission power of the second service data, and a preset determination condition.

In the embodiment of the present disclosure, receiving a sending instruction configured to instruct the UE to transmit uplink data, wherein, the uplink data includes first service data and second service data, and priority for transmission of the first service data is higher than that of the second service data; determining channel transmission power of the first service data and the channel transmission power of the second service data according to the sending instruction; transmitting at least one of the first service data and the second service data according to the channel transmission power of the first service data, the channel transmission power of the second service data, and a preset determination condition; and thus, transmitting data at high frequency situation is achieved.

Optionally, the preset determination condition includes at least one of the following:

when sum of the channel transmission power of the first service data and the channel transmission power of the second service data is greater than a maximum transmission power allowed by the UE, transmitting the first service data and not transmitting the second service data;

when the sum of the channel transmission power of the first service data and the channel transmission power of the second service data is greater than the maximum transmission power allowed by the UE, reducing the channel transmission power of the second service data until the sum of the channel transmission power of the first service data and the channel transmission power of the second service data not greater than the maximum transmission power allowed by the UE, then transmitting the first service data and the second service data; when the sum of the channel transmission power of the first service data and the channel transmission power of the second service data is not greater than the maximum transmission power allowed by the UE, transmitting the first service data and the second service data.

Optionally, the user equipment (UE) can simultaneously transmit uplink data of different priorities in a serving cell, or the UE can simultaneously transmit uplink data of different priorities in different serving cells. For example, the Enhanced Mobile Wideband (eMBB) data and Ultra Reliability Low Latency Communication (URLLC) data are transmitted simultaneously, and the priority of URLLC data transmission is higher than the priority of eMBB data transmission. Therefore, the priority of the transmission power of the URLLC channel (for example, PUSCH, PUCCH, etc.) is higher than the priority of the channel transmission power of eMBB, that is, when the sum of the channel transmission power p1 of URLLC and the channel transmission power p2 of eMBB is greater than the maximum transmission power allowed by the UE, the URLLC channel is transmitted according to the power p1, the channel transmission power of the eMBB is reduced until the sum of the URLLC channel transmission power p1 and the reduced eMBB channel transmission power p3 is less than or equal to the maximum transmission power allowed by the UE. Or the eMBB channel is not transmitted. The following description uses URLLC for high priority services and eMBB for low-priority services.

Optionally, in dual-connectivity or carrier aggregation, there are two Cell Groups (CG), which are referred to as a master CG (MCG) and a second CG (SCG). When both URLLC service channels and eMBB service channels can be transmitted in a CG, the maximum power allowed by this CG can be determined independently according to the different services transmitted. For example, the UE is configured with 2 CGs, MCG and SCG, where MCG can transmit both URLLC service channels and eMBB service channels, while SCG can only transmit eMBB service channels. When MCG transmits eMBB service channels, the maximum allowable power of MCG is $P_{MCG}-1$. When MCG transmits URLLC service channels, the maximum allowable power of MCG is $P_{MCG}-2$, $P_{MCG}-1$ is less than $P_{MCG}-2$, for example, $P_{MCG}-2$ is the maximum transmission power allowed by the UE, and the maximum allowed power of the SCG is $P_{SCG}$. In this way, the performance of high-priority URLLC service transmission can be fully guaranteed, and when services with the same priority are transmitted, the performance of high-priority channels can be guaranteed, such as the power requirements of the channel transmitting uplink control information. Alternatively, when uplink data of different priorities are transmitted in a serving cell at the same time, the maximum power allowed when transmitting different services can be determined independently according to the transmitted service. When the serving cell transmits eMBB service channels, the allowed maximum power of the serving cell is P-1. When the serving cell transmits the URLLC service channels, the allowed maximum power of the serving cell is P-2.

Embodiment 3

Figure 16:
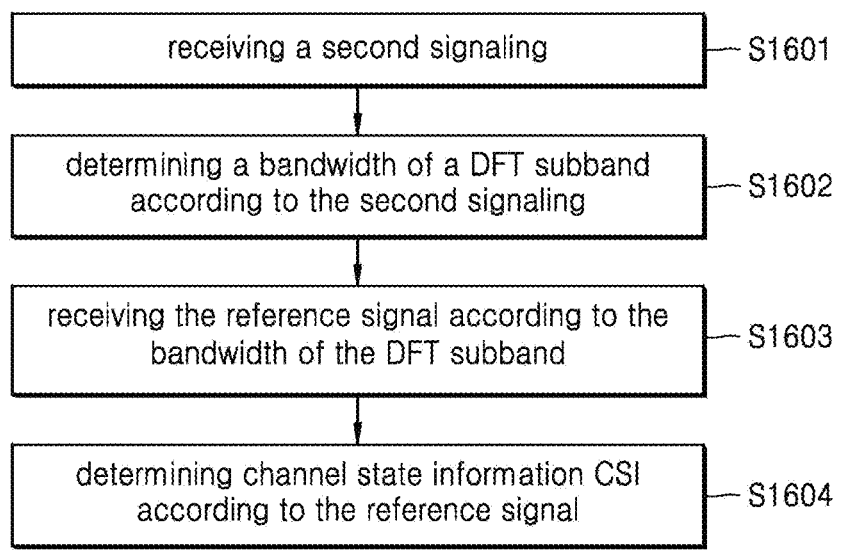
FIG. 16 is a schematic flowchart of a method for receiving a reference signal according to embodiments of the present disclosure.

An embodiment of the present disclosure provides a method for receiving a reference signal, which is applied to a UE. A schematic flowchart of the method is shown in FIG. 16 The method includes:

Step S1601: receiving a second signaling including at least one of high-level signaling, system information, protocol presets, and physical layer signaling.

Step S1602: determining a bandwidth of a DFT subband according to the second signaling.

Step S1603: receiving the reference signal according to the bandwidth of the DFT subband.

Step S1604: determining channel state information CSI according to the reference signal.

In the embodiment of the present disclosure, receiving a second signaling including at least one of high-level signaling, system information, protocol presets, and physical layer signaling; determining a bandwidth of a DFT subband according to the second signaling; receiving the reference signal according to the bandwidth of the DFT subband; determining channel state information CSI according to the reference signal. In this way, receiving the reference signal in high-frequency is achieved.

Optionally, the CSI includes a Precoding Matrix Indication PMI and/or a Channel Quality Indication CQI, a method of receiving a reference signal according to a bandwidth of the DFT subband, and determining a Channel State Information CSI according to the reference signal, including at least one of the following:

When it is assumed that the bandwidth of the PMI is a subset of the bandwidth of the DFT subband, a reference signal is received on the subset of the bandwidth of the DFT subband, and the subband PMI is determined according to the reference signal;

When it is assumed that the bandwidth of the PMI is the bandwidth of one or more DFT subbands, a reference signal is received on the bandwidth of the DFT subbands, and a PMI including a wideband PMI and/or a subband PMI is determined according to the reference signals;

When it is assumed that the bandwidth of the CQI is the bandwidth of one or more DFT subbands, a reference signal is received on the bandwidth of the DFT subband, and a CQI including a wideband CQI and/or a subband CQI is determined according to the reference signal.

Optionally, the determining channel state information CSI according to the reference signal includes:

performing DFT transform on the reference signal, and determining the CSI according to the transformed reference signal.

Optionally, a second signaling including at least one of high-level signaling, system information, protocol presets, and physical layer signaling, determining a bandwidth of a DFT subband according to the second signaling, including at least one of the following:

When there is high-level signaling or the physical layer signaling indicates the bandwidth of the DFT subband, determining the bandwidth of the DFT subband according to the high-level signaling or the physical layer signaling;

When no high-level signaling or physical layer signaling indicates the bandwidth of the DFT subband, the bandwidth of the DFT subband is determined according to system information or protocol presets.

Optionally, in a communication system, the UE needs to feed back CSI, and the base station apply a suitable modulation and coding method to transmit data according to the fed back state information, and the calculation of the CSI is performed based on some assumptions. CSI includes PMI, CQI, etc. PMI and CQI include wideband PMI and CQI and subband PMI and CQI. The method of determining the bandwidth of the wideband PMI and CQI and the subband PMI and CQI is described below.

Optionally, a PMI calculation assumes that the subband bandwidth is a subset of the DFT subband bandwidth. For example, the bandwidth of the DFT subband is 40 PRBs, and the subband bandwidth of PMI calculation is 4 PRBs, that is, it is assumed that different PMIs are calculated in units of the subband bandwidth of the PMI. The bandwidth of a DFT subband is 40 PRBs, so 10 PMIs are calculated, and the subband PMI is calculated in this way.

Optionally, another PMI calculation assumes that the subband bandwidth is one or more DFT subband bandwidths. For example, the bandwidth of the DFT subband is 40 PRBs, and the subband bandwidth of PMI calculation is 40 PRBs. The bandwidth of a DFT subband is 40 PRBs, a PMI is calculated, the subband PMI or wideband PMI are calculated in this way.

Optionally, the subband Channel Quality Indicator (CQI) calculation assumes that the subband bandwidth is one or more DFT subband bandwidths. For example, the bandwidth of the DFT subband is 40 PRBs, and one BWP contains 2 DFT subbands. The subband bandwidth of the subband CQI calculation is 40 PRBs, the bandwidth of a DFT subband is 40 PRBs, if one subband CQI is calculated in a DFT subband, the wideband CQI can be calculated based on the information of the two DFT subbands in the BWP, and the wideband CQI can also be calculated based on the information of one DFT subband in the BWP. This can be determined through high-level signaling configuration or protocol presets.

Optionally, since the coded and modulated data symbols need to be performed DFT transformation and then transmitted, it is assumed that when the CSI is calculated, the CSI is obtained after the DFT transformation, which is closer to the actual transmission situation. Therefore, it is determined that the CSI obtained through applying DFT transformation is more accurate when the CSI is calculated, and the assumed DFT transformation bandwidth needs to be determined due to assuming the DFT transformation.

Optionally, when calculating the CSI, it should make assumptions about the bandwidth of the DFT subband. When calculating the CSI, UE can obtain the assumed bandwidth of the DFT subband through the base station by receiving the following signaling notification: high-level signaling configuration (UE-specific high-level signaling configuration or cell common high-level signaling configuration), system information, or protocol presets, or physical layer signaling. Herein, physical layer signaling refers to the information in the Downlink Control Information (DCI). Alternatively, before the UE receives the assumed bandwidth of the DFT subband indicated by the high-level signaling configuration or physical layer signaling, the CSI is calculated from the bandwidth of the DFT subband obtained by the system information or protocol presets. After the UE receives the assumed bandwidth of the DFT subband indicated by the high-level signaling configuration or physical layer signaling, the UE uses the assumed bandwidth of the DFT subband indicated by the high-level signaling configuration or physical layer signaling to calculate the CSI.

Figure 17:
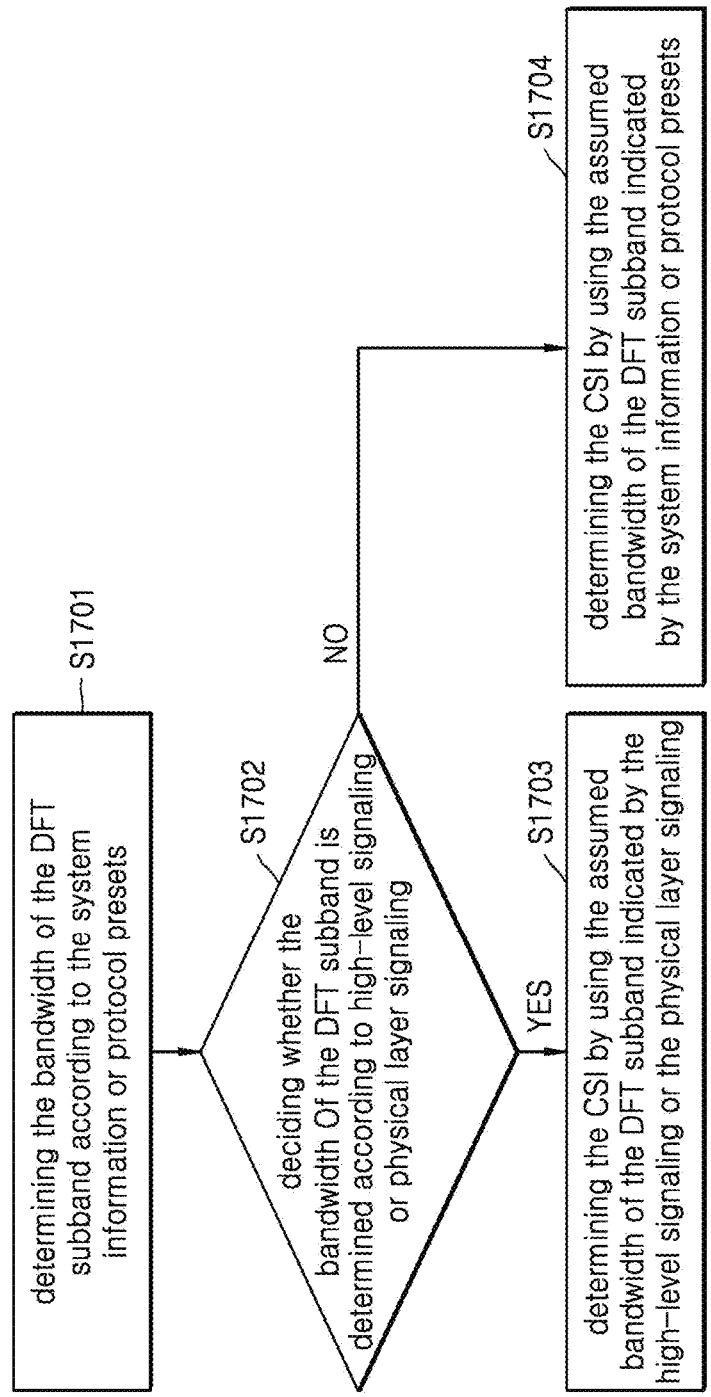
FIG. 17 is a schematic flowchart of a CSI calculation method according to embodiments of the present disclosure.

FIG. 17 is a schematic flowchart of a CSI calculation method provided by an embodiment of the present disclosure. The specific process is shown in FIG. 17. The method includes:

Step S1701: determining the bandwidth of the DFT subband according to the system information or protocol presets.

Step S1702: deciding whether the bandwidth of the DFT subband is determined according to high-level signaling or physical layer signaling; when the decision is yes, the process proceeds to step S303; when the decision is no, the process proceeds to step S304.

Step S1703: when the bandwidth of the DFT subband is determined according to the high-level signaling or the physical layer signaling, determining the CSI by using the assumed bandwidth of the DFT subband indicated by the high-level signaling or the physical layer signaling.

Step S1704: when the bandwidth of the DFT subband is not determined according to the high-level signaling or the physical layer signaling, determining the CSI by using the assumed bandwidth of the DFT subband indicated by the system information or protocol presets.

Figure 18:
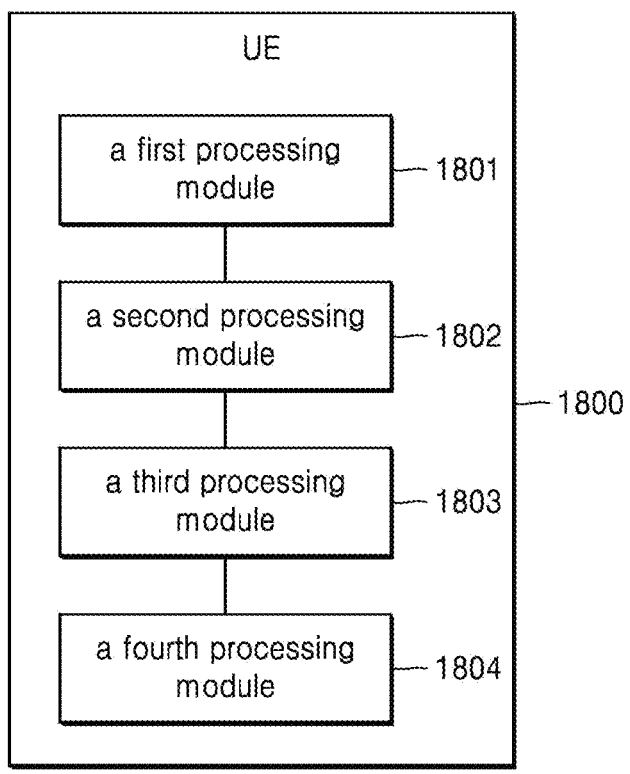
FIG. 18 is a schematic diagram of structure of a UE according to embodiments of the present disclosure.

FIG. 18 is a schematic diagram of structure of a UE provided by an embodiment of the present disclosure.

Embodiment 4

Based on the same inventive concept of the above embodiment 1, an embodiment of the present disclosure further provides a UE. A schematic structural diagram of the UE is shown in FIG. 18. The UE 1800 includes a first processing module 1801, a second processing module 1802, and a third processing module 1803 and fourth processing module 1804.

A first processing module 1801, configured to receive a first signaling;

A second processing module 1802, configured to determine a bandwidth and a position of a frequency domain resource of at least one DFT subband within a carrier bandwidth according to the first signaling;

A third processing module 1803, configured to determine resources for transmitting downlink data of the UE in the at least one DFT subband according to DCI;

A fourth processing module 1804, configured to receive the downlink data on the determined resources.

Optionally, the determining a bandwidth and a position of a frequency domain resource of at least one DFT subband comprises at least one of the following:

receiving the bandwidth and the position of the frequency domain resources of the at least one DFT subband according to the first signaling, the first signaling including at least one of high-level signaling, system information, protocol presets, and physical layer signaling;

wherein, basic unit of the bandwidth of the frequency domain resources of the DFT subband is physical resource block PRB.

Optionally, the DCI includes indication information of a resource block group RBG, and the determining resources for transmitting downlink data of the UE in the at least one DFT subband according to DCI comprises at least one of the following:

determining, according to the indication information of the RBG, a PRB corresponding to the RBG in the at least one DFT subband as a resource for transmitting the downlink data of the UE;

wherein, the RBG is determined in a unit of the DFT subband, and there is a situation that PRBs belonging to one RBG are not located in two DFT subbands, respectively; or, the RBG is determined in a unit of a Carrier or Wideband Part BWP, there is a situation that the PRBs belonging to one RBG are located in two DFT subbands.

Optionally, the determining resources for transmitting downlink data of the UE in the at least one DFT subband according to downlink control information DCI comprises at least one of the following:

determining a resource for transmitting the downlink data of the UE in a DFT subband where the DCI is located according to the DCI;

determining a resource for transmitting the downlink data of the UE in the at least one DFT subband according to one DCI;

receiving a first instruction sent by a base station through explicit signaling or implicit signaling, and determining to use one of the following ways according to the first instruction: determining a resource for transmitting the downlink data of the UE in a DFT subband where the DCI is located according to the DCI; determining a resource for transmitting the downlink data of the UE in the at least one DFT subband according to one DCI.

Optionally, the determining a resource for transmitting the downlink data of the UE in the at least one DFT subband according to one DCI comprises at least one of the following:

determining, according to the one DCI, resources at the same position in at least two DFT subbands from among the at least one DFT subband as resources for transmitting the downlink data of the UE;

determining, according to the one DCI, the corresponding resources in at least two DFT subbands from among the at least one DFT subbands as resources for transmitting the downlink data of the UE.

Optionally, a DFT subband includes: a synchronization signal, a physical broadcast channel block, and remaining minimum system information.

Optionally, when at least one DFT subband is the initial BWP, the bandwidth and position of the DFT subband where the initial BWP is located are determined according to the subcarrier width configuration of the DFT subband.

Optionally, the fourth processing module 1804 is specifically configured that in the DFT subband, the downlink data is received on the determined resources in the order of the frequency domain first and then the time domain.

The technical solutions provided in the embodiments of the present disclosure have at least the following beneficial effects:

Receiving a first signaling; determining a bandwidth and a position of a frequency domain resource of at least one Discrete Fourier Transform DFT subband within a carrier bandwidth according to the first signaling; determining resources for transmitting downlink data of the UE in the at least one DFT subband according to downlink control information DCI; receiving the downlink data on the determined resources. Thus, the implementation of receiving data at high frequency is achieved.

For the content not described in detail in the UE provided in the embodiment of the present disclosure, reference may be made to the foregoing method for receiving data. The beneficial effects that the UE provided in the embodiment of the present disclosure is the same as the method for receiving data described above, and details are not described herein.

Figure 19:
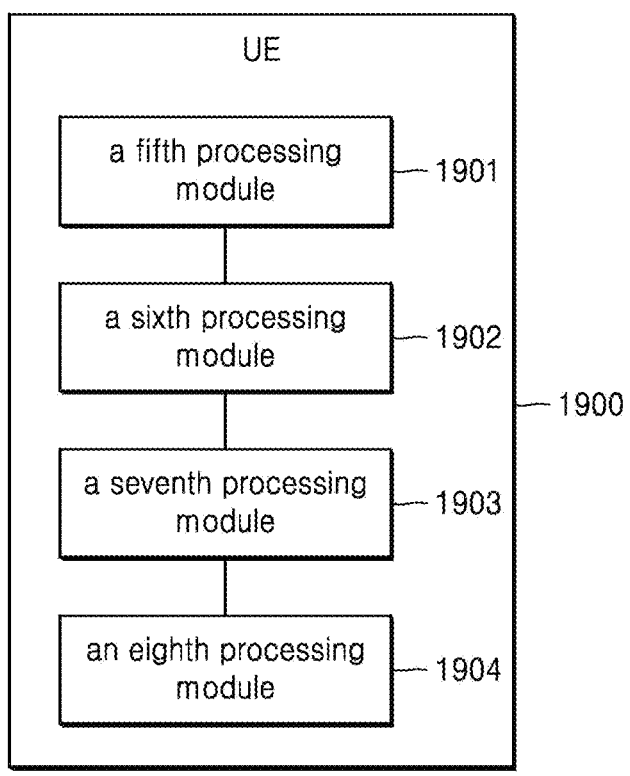
FIG. 19 is a schematic diagram of another structure of a UE according to embodiments of the present disclosure.

FIG. 19 is a schematic diagram of another structure of a UE provided by an embodiment of the present disclosure.

Embodiment 5

Based on the same inventive concept of the above embodiment 3, an embodiment of the present disclosure further provides a UE. A schematic structural diagram of the UE is shown in FIG. 19, and the UE 1900 includes a fifth processing module 1901, a sixth processing module 1902, and a seventh processing module 1903 and an eighth processing module 1904.

A fifth processing module 1901, configured to receive a second signaling;

A sixth processing module 1902, configured to determine a bandwidth of a DFT subband according to the second signaling;

A seventh processing module 1903, configured to receive the reference signal according to the bandwidth of the DFT subband;

An eighth processing module 1904, configured to determine CSI according to a reference signal.

Optionally, the CSI includes a Precoding Matrix Indication PMI and/or a Channel Quality Indication CQI, a method of receiving a reference signal according to a bandwidth of the DFT subband, and determining a Channel State Information CSI according to the reference signal, including at least one of the following:

When it is assumed that the bandwidth of the PMI is a subset of the bandwidth of the DFT subband, a reference signal is received on the subset of the bandwidth of the DFT subband, and the subband PMI is determined according to the reference signal;

When it is assumed that the bandwidth of the PMI is the bandwidth of one or more DFT subbands, a reference signal is received on the bandwidth of the DFT subbands, and a PMI including a wideband PMI and/or a subband PMI is determined according to the reference signals;

When it is assumed that the bandwidth of the CQI is the bandwidth of one or more DFT subbands, a reference signal is received on the bandwidth of the DFT subband, and a CQI including a wideband CQI and/or a subband CQI is determined according to the reference signal.

Optionally, the eighth processing module 1904 is specifically configured to perform DFT transformation on the reference signal, and determine the CSI according to the transformed reference signal.

Optionally, a second signaling including at least one of high-level signaling, system information, protocol presets, and physical layer signaling, determining a bandwidth of a DFT subband according to the second signaling, including at least one of the following:

When there is high-level signaling or the physical layer signaling indicates the bandwidth of the DFT subband, determining the bandwidth of the DFT subband according to the high-level signaling or the physical layer signaling;

When no high-level signaling or physical layer signaling indicates the bandwidth of the DFT subband, the bandwidth of the DFT subband is determined according to system information or protocol presets.

The technical solutions provided in the embodiments of the present disclosure have at least the following beneficial effects:

In the embodiment of the present disclosure, receiving a second signaling including at least one of high-level signaling, system information, protocol presets, and physical layer signaling; determining a bandwidth of a DFT subband according to the second signaling; receiving the reference signal according to the bandwidth of the DFT subband; determining channel state information CSI according to the reference signal. In this way, receiving the reference signal in high-frequency is achieved.

For the content not described in detail in the UE provided in the embodiment of the present disclosure, reference may be made to the foregoing method for receiving a reference signal. The beneficial effects provided by the UE provided in the embodiment of the present disclosure are the same as the foregoing method for receiving a reference signal, and are not described herein again.

Figure 20:
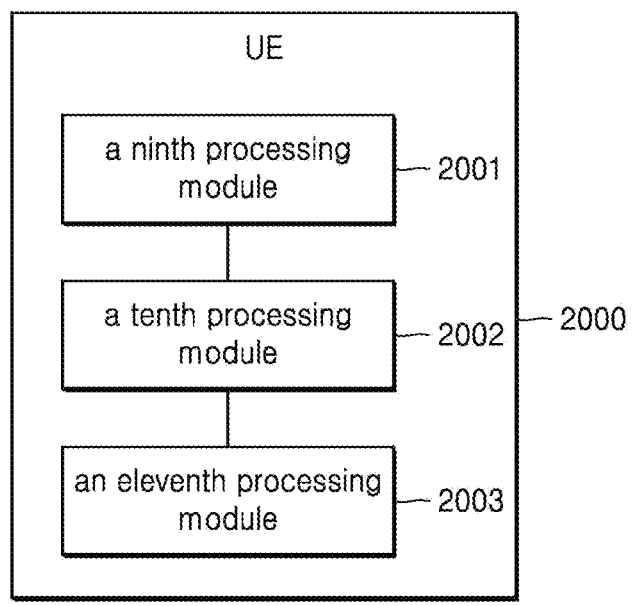
FIG. 20 is a schematic diagram of still another structure of a UE according to embodiments of the present disclosure.

FIG. 20 is a schematic diagram of still another structure of a UE provided by an embodiment of the present disclosure.

Embodiment 6

Based on the same inventive concept of the above embodiment 2, an embodiment of the present disclosure further provides another UE. A schematic structural diagram of the UE is shown in FIG. 20. The UE 2000 includes a ninth processing module 2001, a tenth processing module 2002, and an eleventh processing module 2003.

a ninth processing module 2001, configured to receive a sending instruction configured to instruct the UE to transmit uplink data, wherein, the uplink data includes first service data and second service data, and priority for transmission of the first service data is higher than the priority for transmission of the second service data;
 a tenth processing module 2002, configured to determine channel transmission power of the first service data and the channel transmission power of the second service data according to the sending instruction;
 an eleventh processing module 2003, configured to send at least one of the first service data and the second service data according to the channel transmission power of the first service data, the channel transmission power of the second service data, and a preset determination condition.

Optionally, the preset determination condition includes at least one of the following:

when sum of the channel transmission power of the first service data and the channel transmission power of the second service data is greater than a maximum transmission power allowed by the UE, transmitting the first service data and not transmitting the second service data;
 when the sum of the channel transmission power of the first service data and the channel transmission power of the second service data is greater than the maximum transmission power allowed by the UE, reducing the channel transmission power of the second service data until the sum of the channel transmission power of the first service data and the channel transmission power of the second service data not greater than the maximum transmission power allowed by the UE, then transmitting the first service data and the second service data;
 when the sum of the channel transmission power of the first service data and the channel transmission power of the second service data is not greater than the maximum transmission power allowed by the UE, transmitting the first service data and the second service data.

The technical solutions provided in the embodiments of the present disclosure have at least the following beneficial effects:

In the embodiment of the present disclosure, receiving a sending instruction configured to instruct the UE to transmit uplink data, wherein, the uplink data includes first service data and second service data, and priority for transmission of the first service data is higher than that of the second service data; determining channel transmission power of the first service data and the channel transmission power of the second service data according to the sending instruction; transmitting at least one of the first service data and the second service data according to the channel transmission power of the first service data, the channel transmission power of the second service data, and a preset determination condition; and thus, transmitting data at high frequency situation is achieved.

For the content not described in detail in the UE provided in the embodiment of the present disclosure, reference may be made to the foregoing method for transmitting data. The beneficial effects that the UE provided in the embodiment of the present disclosure is the same as the method for transmitting data described above, and details are not described herein again.

Figure 21:
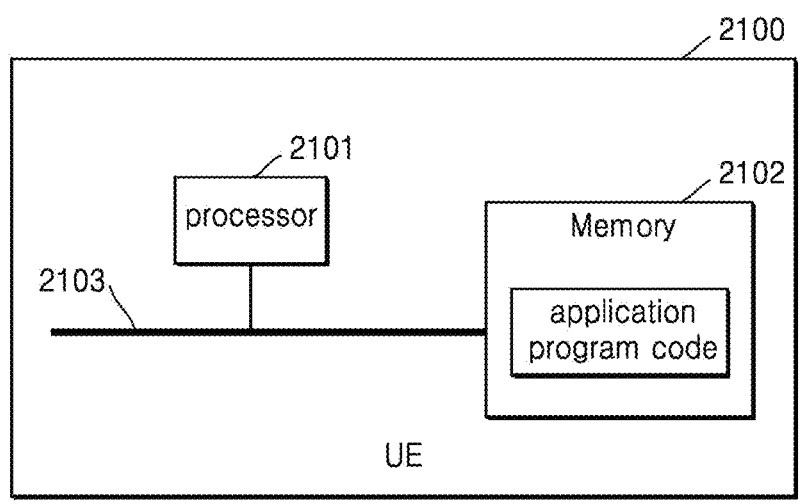
FIG. 21 is a schematic diagram of still another structure of a UE according to embodiments of the present disclosure.

FIG. 21 is a schematic diagram of still another structure of a UE provided by an embodiment of the present disclosure.

Embodiment 7

Based on the same inventive concept of the above embodiment 1, an embodiment of the present disclosure further provides a UE. A schematic structural diagram of the UE is shown in FIG. 21. The UE 2100 includes at least one processor 2101, a memory 2102, and a bus 2103. At least one processor 2101 are all electrically connected to the memory 2102; the memory 2102 is configured to store at least one computer-executable instruction, and the processor 2101 is configured to execute the at least one computer-executable instruction. Therefore, the steps of any method for receiving data as provided in any one of the embodiments 1 or any optional implementation manner of the present disclosure are performed.

Further, the processor 2101 may be a Field-Programmable Gate Array (FPGA) or other devices having logic processing capabilities, such as a Microcontroller Unit (MCU), and a Central Processing Unit (CPU).

The embodiments of the present disclosure have at least the following beneficial effects:

receiving data at high frequency.

Figure 23:
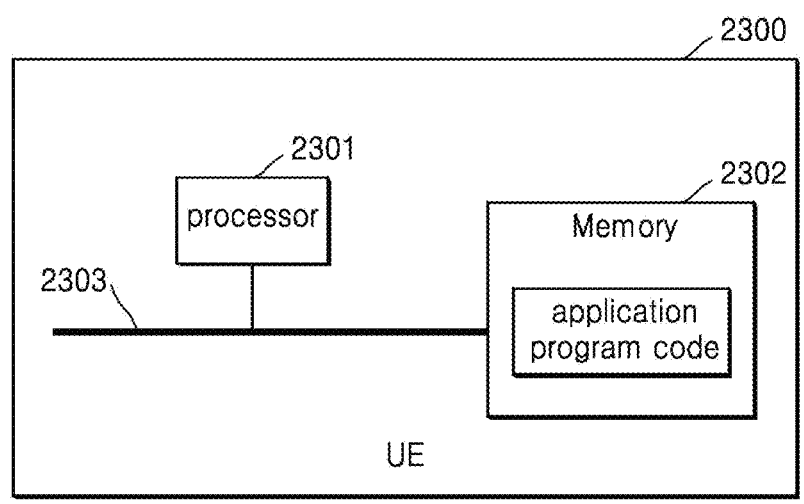
FIG. 23 is a schematic diagram of still another structure of a UE according to embodiments of the present disclosure.

FIG. 23 is a schematic diagram of still another structure of a UE provided by an embodiment of the present disclosure.

Embodiment 8

Figure 22:
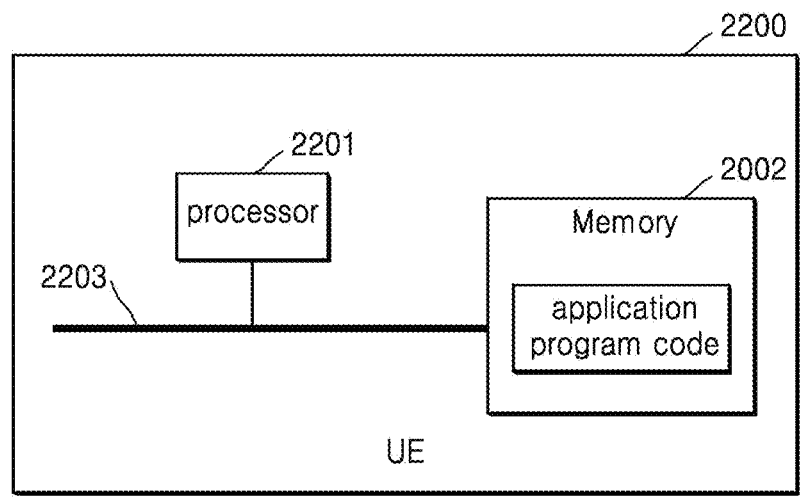
FIG. 22 is a schematic diagram of still another structure of a UE according to embodiments of the present disclosure.

Based on the same inventive concept of the above embodiment 3, an embodiment of the present disclosure further provides a UE. A schematic structural diagram of the UE is shown in FIG. 22. The UE 2200 includes at least one processor 2201, a memory 2202, and a bus 2203. At least one processor 2201 are all electrically connected to the memory 2202; the memory 2202 is configured to store at least one computer-executable instruction, and the processor 2201 is configured to execute the at least one computer-executable instruction. Therefore, the steps of any method for receiving data as provided in any one of the embodiments 3 or any optional implementation manner of the present disclosure are performed.

Further, the processor 2201 may be a Field-Programmable Gate Array (FPGA) or other devices having logic processing capabilities, such as a Microcontroller Unit (MCU), and a Central Processing Unit (CPU).

The embodiments of the present disclosure have at least the following beneficial effects:

receiving a reference signal at high frequency.

Embodiment 9

Based on the same inventive concept of the above embodiment 2, an embodiment of the present disclosure further provides a UE. A schematic structural diagram of the UE is shown in FIG. 23. The UE 2300 includes at least one processor 2301, a memory 2302, and a bus 2303. At least one processor 2301 are all electrically connected to the memory 2302; the memory 2302 is configured to store at least one computer-executable instruction. Therefore, the steps of any method for receiving data as provided in any one of the embodiments 3 or any optional implementation manner of the present disclosure are performed.

Further, the processor 2301 may be a Field-Programmable Gate Array (FPGA) or other devices having logic processing capabilities, such as a Microcontroller Unit (MCU), and a Central Processing Unit (CPU).

The embodiments of the present disclosure have at least the following beneficial effects:

transmitting data at high frequency.

The disclosure described below is to solve the issues on PDSCH resource indication by assuming multiple-DFT-S-OFDM system. In an exemplary embodiment, A DL resource allocation method for M-DFT-S-OFDM system (STD) may be disclosed as below. For example, virtual resource indication for PDSCH resource configuration (including design on signaling, interleaving pattern, zero-input pattern, resource assignment granularity etc) may be disclosed in this disclosure. For example, frequency resource indication for PDSCH may be disclosed in this disclosure. More details will be described below using the following drawings.

In order to better understand the present disclosure, a downlink multiple access technology based on M-DFT-S-OFDM is described first.

In the M-DFT-S-OFDM-based downlink multiple access technology, downlink transmission signals of different UEs or different UE groups are respectively mapped to frequency domains after DFT transform, and then OFDM modulation is performed, which compared with the conventional OFDM multiple access technologies, MDFT-S-OFDM can significantly reduce PAPR and improve utilization efficiency of power amplifiers, and is adoptable for a high-frequency communication system that is more sensitive to PAPR performance, such as a communication system with a carrier frequency around 62.5 GHz.

The difference from conventional DFT-S-OFDM multiple access technologies is that DFT-S-OFDM has only one DFT transform before OFDM modulation, while MDFT-S-OFDM has multiple DFT transforms before OFDM modulation. In addition, the existing DFT-S-OFDM is only used for uplink, and M-DFT-S-OFDM can also be used for downlink. Although the PARR performance of M-DFT-S-OFDM is slightly worse than DFT-S-OFDM, it may support orthogonal frequency division multiplexing for multiple UEs or multiple UE groups, reduce the transmission bandwidth of UEs, and thus support UEs with small-bandwidth reception capability, thereby simplifying implementation for UEs and reducing cost of UEs.

Figure 24:
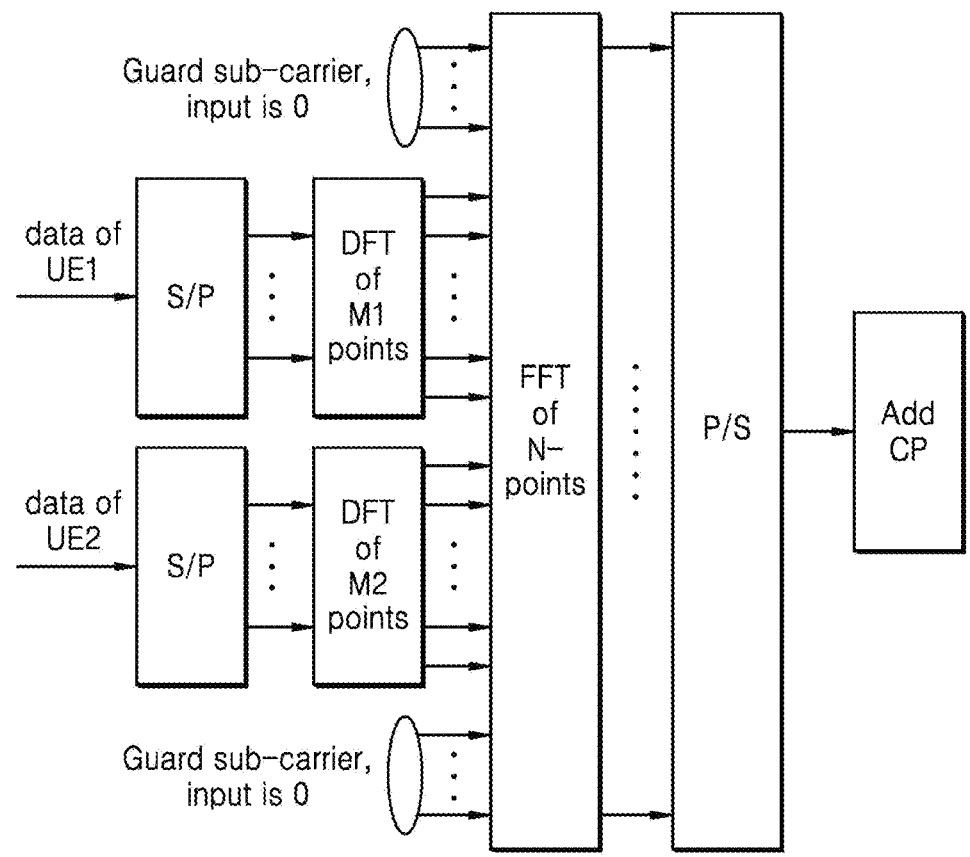
FIGS. 24 to 27 are schematic diagrams of an M-DFT-S-OFDM-based downlink multiple access technology according to embodiments of the present disclosure.

In an implementable scheme, a schematic block diagram of an MDFT-S-OFDM-based downlink multiple access technology is shown in FIG. 24. In FIG. 24, the data of UE1 is mapped to a frequency domain after DFT transform of the M1 points, and the mapping mode is centralized mapping, that is, mapping to a set of successive sub-carriers in the frequency domain. Similarly, the data of UE2 is mapped to the frequency domain in a centralized manner after DFT transform of the M2 points. Herein, the size of DFT is the number of sub-carriers allocated in the frequency domain. In other words, the number of sub-carriers in frequency domain allocated by the system to UE1 is M1, the number of sub-carriers in frequency domain allocated to UE2 is M2. In actual transmission, M1 and M2 may be equal or different.

In addition, similar to the existing CP-OFDM-based downlink multiple access technology, some sub-carriers are required to be reserved for guard bandwidth before OFDM modulation, and these reserved sub-carriers are unavailable for data transmission. As shown in FIG. 24, some sub-carriers are reserved at both ends of an FFT input, that is, input signals on these sub-carriers are 0.

Compared with conventional CP-OFDM in FIG. 24, the transmitting end of the base station is required to perform one DFT transform for each UE's data before mapping resources in frequency domain, and correspondingly, the receiving end of the UE is required to perform one IDFT transform after frequency domain equalization, and then perform demodulation and decoding based on the output of IDFT.

In FIG. 24, the entire system bandwidth is multiplexed by two UEs, and the data of these two UEs are DFT-transformed before being mapped to frequency domain subcarriers, respectively, that is, the number of UEs performing orthogonal frequency division multiplex is the number of DFT transforms and each DFT Size is the number of sub-carriers in frequency domain allocated for the corresponding UE. FIG. 24 is only a simple schematic diagram, which may be easily extended to the transmission of more UE data by using more DFTs.

Theoretically, the more DFTs the system uses, the worse the PAPR performance will be. When the number of DFTs decreases and approaches 1, the PAPR performance will be improved and approach single carrier (DFT-S-OFDM). When the number of DFTs becomes larger and approaches the number of available sub-carriers, the PAPR performance will be deteriorated and approach multi-carrier (CP-OFDM). In order to reduce PAPR effectively, the system limits the maximum number of DFTs, which the maximum number of DFTs may be related to the system bandwidth and/or carrier frequency, for example, the greater the system bandwidth, the greater the maximum number of DFTs, and the smaller the carrier frequency, the greater the maximum number of DFTs. Alternatively, the maximum number of DFTs supported by the system is predefined or is configured semi-statically by cell system information.

In addition, the system limits the minimum size of DFT, due to that a too small minimum size of DFT may have a small effect on reducing PAPR and a too large minimum size of DFT may reduce the flexibility of resource allocation, which the minimum size of DFT is the minimum bandwidth allocable in the frequency domain. The maximum size of the DFT is the maximum reception bandwidth of the UE, which is related to the capabilities of the UE. Alternatively, the minimum size, maximum size, or a set of available sizes of the DFT is predefined, or is semi-statically configured through cell system information, or semi-statically configured through a UE-specific RRC signaling.

Alternatively, in order to simplify the implementation of the transmitting end of the base station, the number of DFTs and the size of each DFT are unchanged for a period of time, which are irrelevant with data scheduling. The number of DFTs and the size of each DFT may be predefined or configured semi-statically through a high-layer signaling.

Alternatively, in order to reduce PAPR as much as possible, the system may change the number of DFTs and the size of each DFT in each slot or even in each symbol, which is related to data scheduling. The number of DFTs and the size of each DFT are dynamically changed and may be dynamically indicated by a Cell-specific DCI or UE-group Specific DCI.

Alternatively, in order to reduce PAPR as much as possible, the sizes of respective DFTs in an OFDM symbol are the same, that is, the frequency domain allocation bandwidth of all UEs is the same. Assuming that the time domain resource scheduling unit of the UE is one slot, the sizes of DFTs in all OFDM symbols in one slot are the same, but each slot may use a different number of DFTs and their corresponding sizes may be used in each slot.

Figure 25:
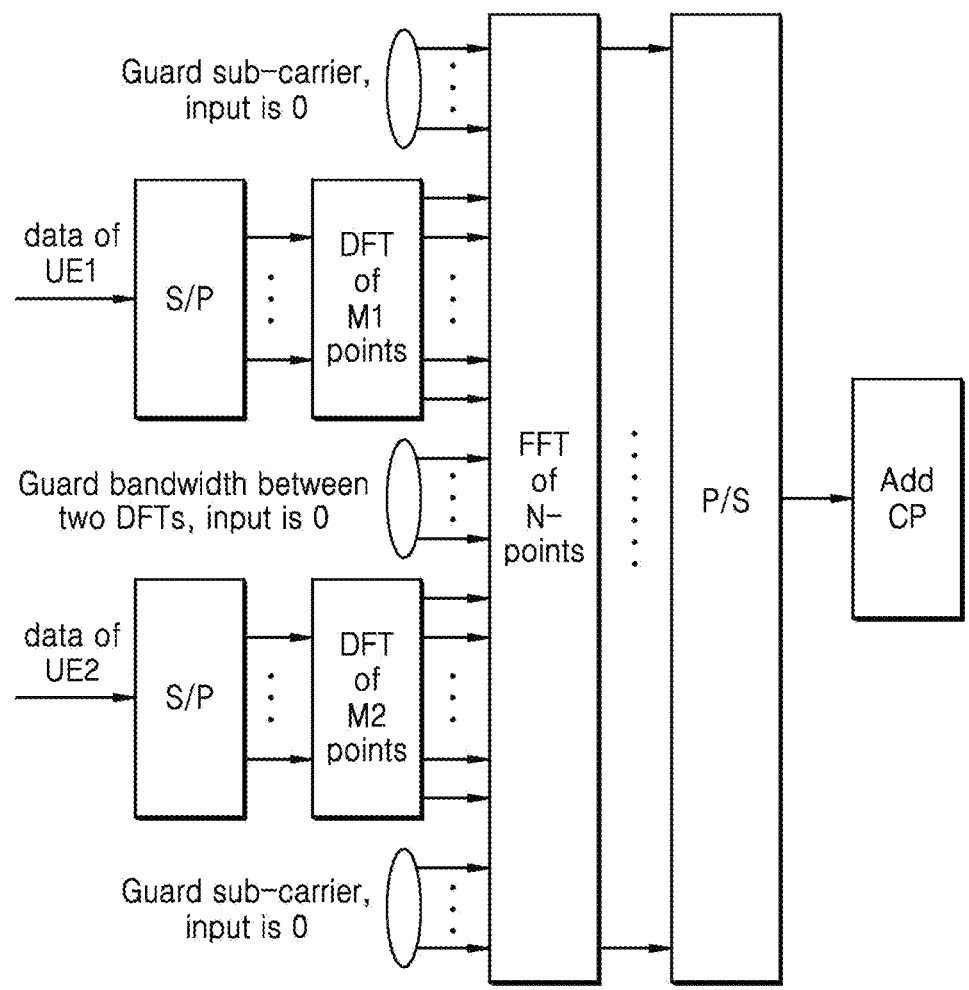

In an implementable scheme, a schematic block diagram of an MDFT-S-OFDM-based downlink multiple access technology is shown in FIG. 25. The above related description in FIG. 24 may be used in FIG. 25. The only difference between FIG. 25 and FIG. 24 is that in FIG. 24, the data in frequency domain of two UEs may be next to each other, but in FIG. 25, an interval should be reserved between the data in frequency domain of the two UEs, such design is to make the time domain waveform closer to the single carrier characteristic, thereby further reducing PAPR.

Alternatively, the guard bandwidth between the data of the two UEs is related to the minimum value of the DFT size used by the two UEs, for example, the greater the minimum value of the DFT size used by the two UEs is, the greater the guard bandwidth required is.

Figure 26:
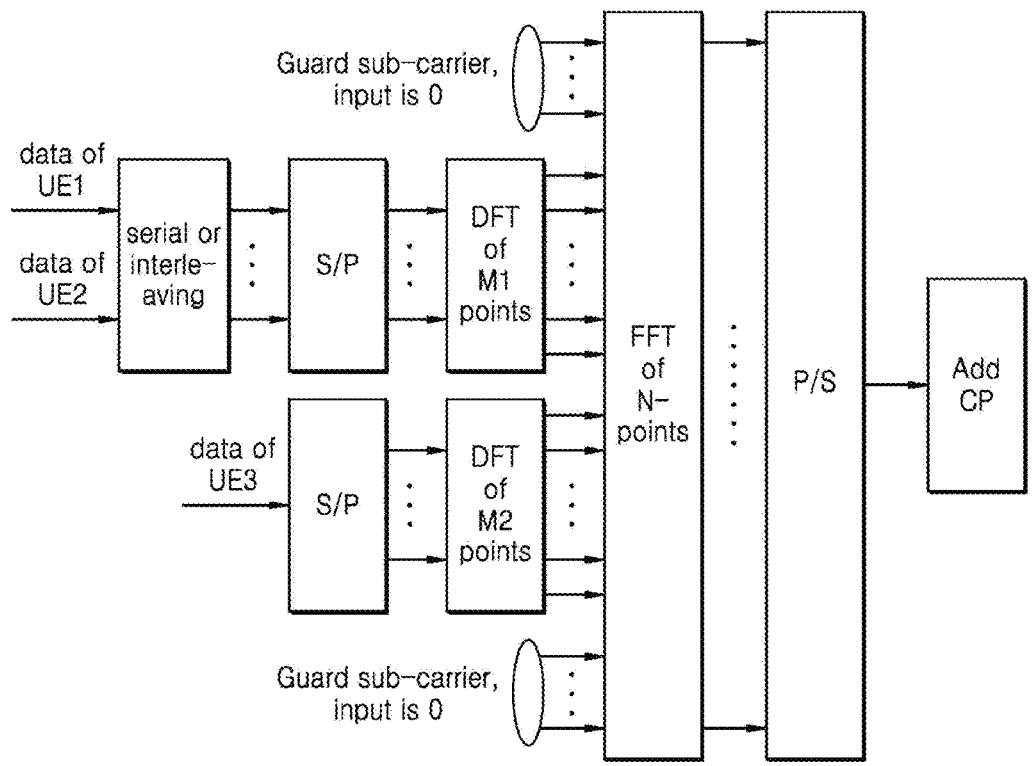

In an implementable scheme, a schematic block diagram of an MDFT-S-OFDM-based downlink multiple access technology is shown in FIG. 26. The above related description in FIG. 24 may be used in FIG. 26, and the difference between FIG. 26 and FIG. 24 is that data of multiple UEs may be multiplexed in one DFT, that is, DFT transform is performed on data of a group of UEs, for example the data of UE1 and UE2 being multiplexed together before DFT transform, and the signal after DFT transform is a mixture of the two data. If the input before DFT is called a virtual resource, that is, UE1 and UE2 use different virtual resources of the same DFT, and is mapped onto sub-carriers in frequency domain after DFT transform, so as to share the same frequency domain resource.

In FIG. 26, before performing the DFT transform of the M1 points, and more specifically, before the serial-parallel (S/P) conversion, the data of UE1 and UE2 may be multiplexed together by "series or interleaving". When multiplexed together in series, that is, the data of UE1 and UE2 are concatenated (i.e., they may be mapped to DFT virtual resources in a centralized mapping manner), the data of the two may be separated by sampling points in the time domain. When multiplexed together by interleaving, that is, the data of UE1 and UE2 are scrambled (i.e., they may be mapped to DFT virtual resources in a distributed mapping manner), the data of the two may be mixed at each sampling point in the time domain.

For FIG. 26, when the PDCCH schedules the PDSCH, in addition to indicating the frequency domain resources occupied by the PDSCH, it may also be necessary to indicate the virtual resources occupied before the DFT transform.

Figure 27:
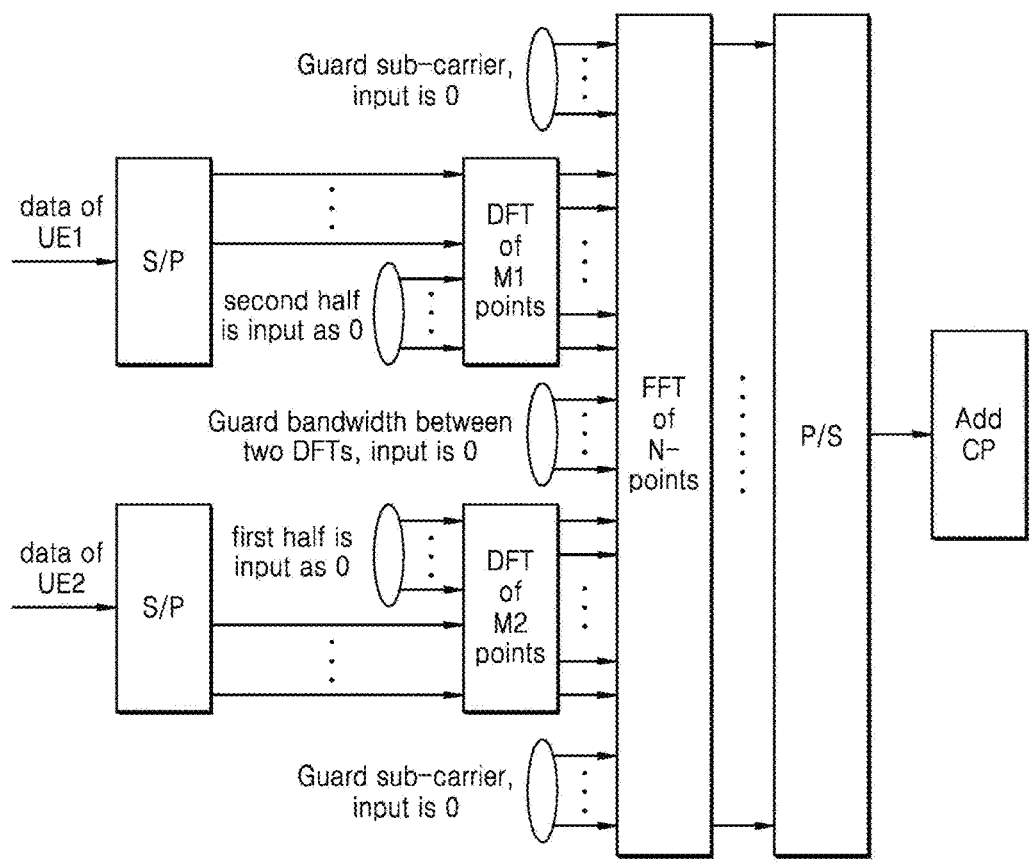

In an implementable scheme, a schematic block diagram of an MDFT-S-OFDM-based downlink multiple access technology is shown in FIG. 27. The above related description in FIG. 25 may be used in FIG. 27. The difference between FIG. 27 and FIG. 25 is that there is a zero-input operation before DFT transform, that is, the input of some virtual resources of the DFT is 0, and the zero-input ratios of the DFTs for the two UEs are correlated, for example, the sum of the zero-input ratios of two UEs should be 1 (i.e., the zero-input ratio of DFT for UE1 is $\alpha \in (0,1)$, and then the zero-input ratio of DFT for UE2 is $\beta=1-\alpha$; in addition, the zero-input positions of the DFTs for the two UEs are also correlated, for example, the zero-input positions of the two UEs should be complementary to each other (that is, UE1 performs zero-input on the first $\alpha$ inputs of the DFT, and UE2 performs zero-input on the second $1-\alpha$ inputs of the DFT). This design may achieve orthogonal separation of the data of UE1 and UE2 within one OFDM symbol in the time domain.

Figure 28:
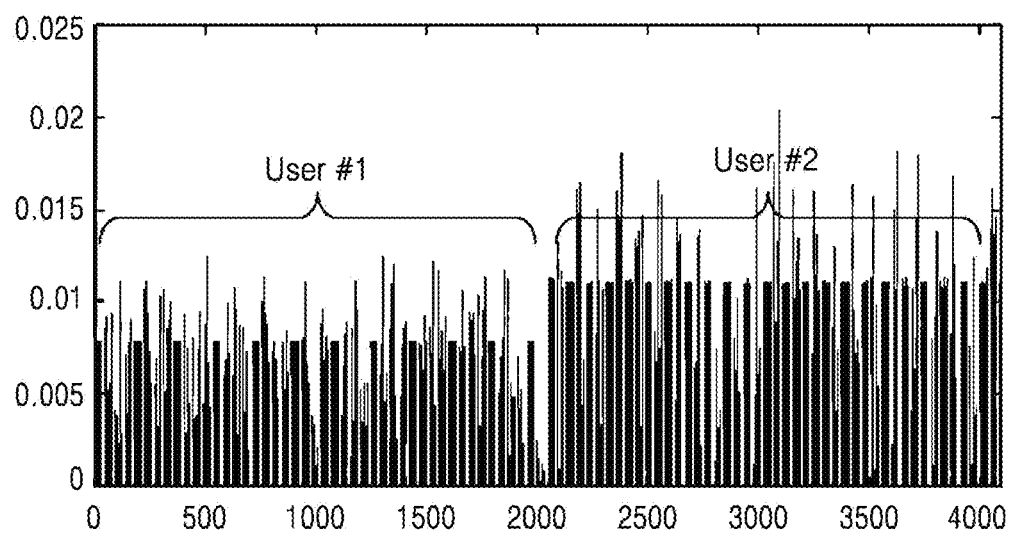
FIG. 28 is a schematic diagram of a time-domain waveform of an M-DFT-S-OFDM symbol according to embodiments of the present disclosure.

As shown in FIG. 27, the input of the second half of the virtual resources of the DFT of the M1 points is 0, that is, the data of UE1 occupies the first half of the virtual resources of the DFT, and the input of the first half of the virtual resources of the DFT of the M2 points is 0, that is, the data of the UE2 occupies the second half of the virtual resources of the DFT; then the orthogonal separation of the two UEs may be achieved in one OFDM symbol in the time domain. As shown in FIG. 28, the first half of signals for the waveform in time domain of an OFDM symbol are the data of UE1, the second half of the signal is the data of UE2, which this orthogonally separated waveform in the time domain is closer to the single carrier characteristic and may effectively reduce PAPR. In a conventional uplink DFT-S-OFDM system, the waveform of an OFDM symbol in time domain is a single-carrier waveform of UE data, and herein, the time-domain waveform of an OFDM symbol is a concatenation of single-carrier waveforms of two UEs' data.

Alternatively, the above zero-input ratio of DFT (also as the time domain ratio in an OFDM symbol) may be determined according to the ratio of the DFT sizes. For example, the time domain ratio of UE1 in an OFDM symbol is M1/(M1+M2), and the time domain ratio of UE2 in an OFDM symbol is M2/(M1+M2), that is, when the DFT size used by the UE is relatively larger, the time domain ratio in an OFDM symbol is larger, and the zero-input ratio of the DFT is also larger. This method of allocation based on DFT Size ratio may reduce PAPR as much as possible.

FIG. 27 is just a simple schematic diagram, which may be easily extended to use multiple DFTs to transmit data for more UEs, that is, multiple UEs perform orthogonally multiplexing in the frequency domain, and meanwhile perform orthogonal time division multiplexing within one OFDM symbol in the time domain.

For FIG. 27, when the PDCCH schedules the PDSCH, in addition to indicating the frequency domain resources occupied by the PDSCH, it may also be necessary to indicate the position and ratio of zero-input before the DFT transform.

Figure 29:
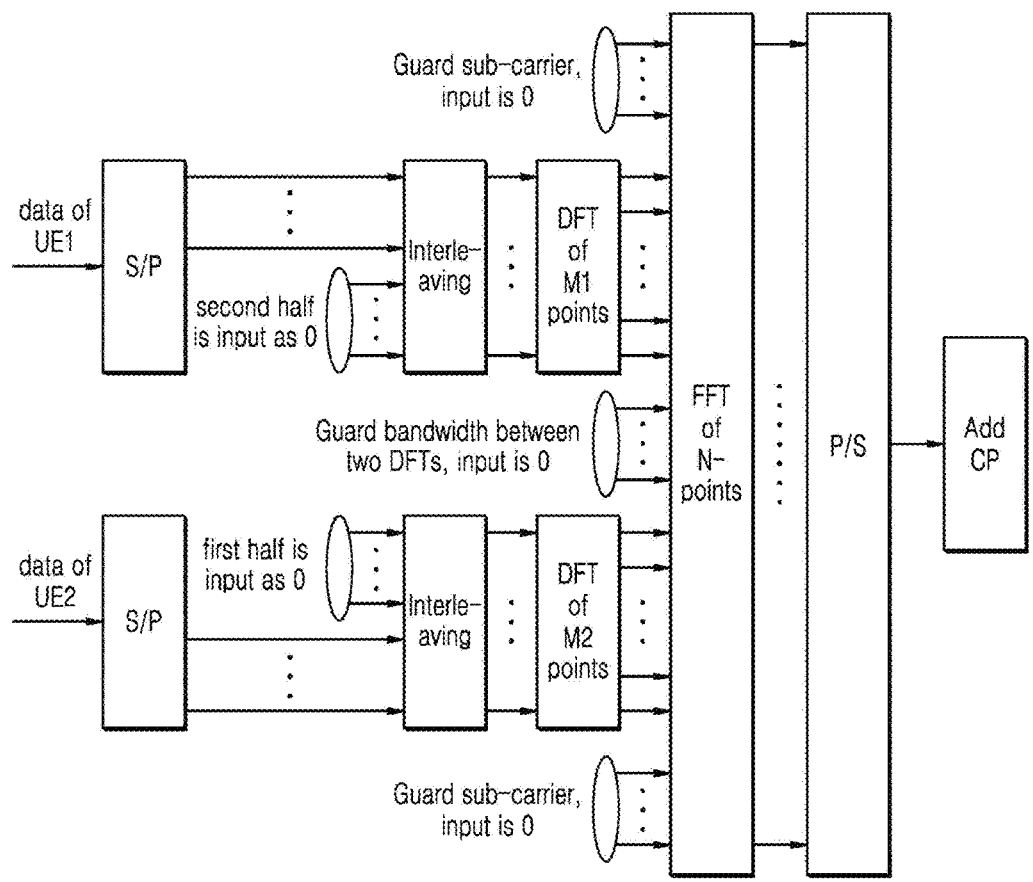
FIG. 29 is a schematic diagram of an M-DFT-S-OFDM-based downlink multiple access technology according to embodiments of the present disclosure.

In an implementable scheme, a schematic block diagram of an MDFT-S-OFDM-based downlink multiple access technology is shown in FIG. 29. The above related descriptions in FIG. 27 may be used in FIG. 29. The difference between FIG. 29 and FIG. 27 is that there is an interleaving process after zero-input and before DFT transform, and the data of two UEs are cross-distributed in time domain after the interleaving process, which has the advantage that it may better resist inter-cell interference, randomize interference, and improve transmission performance.

For FIG. 29, when the PDCCH schedules the PDSCH, in addition to indicating the frequency domain resources occupied by the PDSCH, it may also be necessary to indicate the position and ratio of zero-input before the DFT transform, and indicate whether there is an interleaving on the input of the DFT after the zero-input and before the DFT transform as well as indicate a possible interleaving manner.

Herein, those skilled in the art should appreciate that the above FIGS. 24-27 and FIG. 29 only describe the M-DFT-S-OFDM-based downlink multiple access technologies by way of example, and should not be construed as limitations of the present disclosure, which the present disclosure may be applied to an M-DFT-S-OFDM-based downlink multiple access technology with any structure.

In one example, the system specifies that the UE always occupies all virtual resources of the DFT, so there is no need to indicate the virtual resource allocation information in the DFT through an additional signaling. In another example, the system specifies that data of multiple UEs may be multiplexed in one DFT, and/or that there may zero-input with different ratios in the DFT; then it is necessary to indicate the virtual resource position information of the DFT through an additional signaling, which multiplexing of data of multiple UEs in one DFT means to reduce the number of DFTs on the base station side, thereby reducing PAPR, and the zero-input with different ratios in the DFT is to allow the signals of the UEs to be orthogonally separated in the time domain, such that the time domain waveform appears single carrier characteristic to further reduce PAPR.

Figure 30:
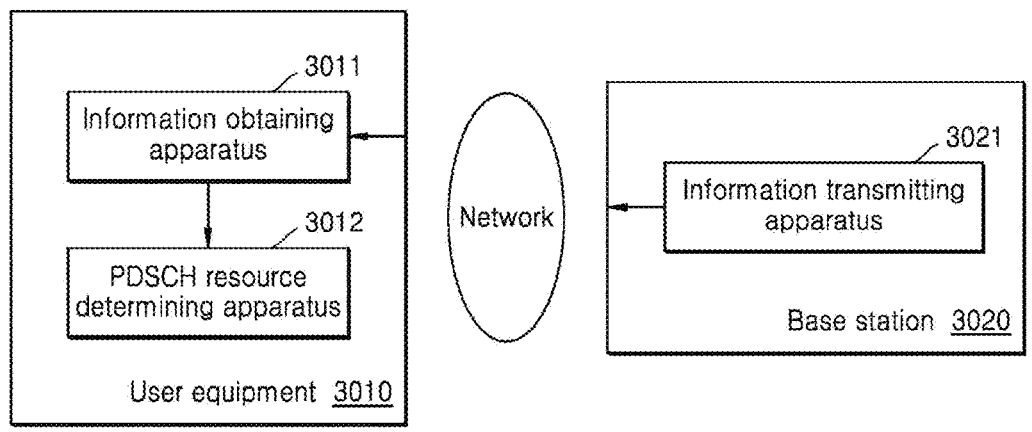
FIG. 30 is a schematic diagram of a user equipment and base station for PDSCH resource allocation in an M-DFT-S-OFDM-based high-frequency communication system according to embodiments of the present disclosure.

FIG. 30 is a device schematic diagram of a user equipment 3010 and a base station 3020 for PDSCH resource allocation in an M-DFT-S-OFDM-based high-frequency communication system according to an embodiment of the present disclosure, wherein the user equipment 3010 includes an information obtaining apparatus 3011 and a PDSCH resource determining apparatus 3012 and the base station 3020 includes an information transmitting apparatus 3021. Specifically, the information transmitting apparatus 3021 of the base station 3020 transmits the frequency domain resource allocation information and the virtual resource allocation information in the DFT to the user equipment 3010, so that the user equipment 3010 determines the PDSCH resource according to the frequency domain resource allocation information and the virtual resource allocation information in the DFT, and accordingly, the information obtaining apparatus 3011 of the user equipment 3010 obtains the frequency domain resource allocation information and virtual resource allocation information in the DFT; the PDSCH resource determining apparatus 3012 determines the PDSCH resource according to the frequency domain resource allocation information and the virtual resource allocation information in the DFT.

In particular, the information transmitting apparatus 3021 of the base station 3020 transmits the frequency domain resource allocation information and the virtual resource allocation information in the DFT to the user equipment 3010, so that the user equipment 3010 determines the PDSCH resource according to the frequency domain resource allocation information and the virtual resource allocation information in the DFT.

In an existing OFDM system, each input in the frequency domain before the FFT is generally referred to as a sub-carrier, and similarly, each input in the transform domain before the DFT may also be referred to as a sub-sample. Herein, the virtual resource allocation information in the DFT refers to the allocation information for the input of the DFT (referred to as a virtual resource), or the allocation information for the sub-sample of the DFT (each input of the DFT may be referred to as a sub-sample), or the virtual resource allocation information occupied before DFT transform, or the DFT transform domain resource allocation information.

Alternatively, the granularity for the virtual resource allocation information in the DFT is configurable. The granularity for the virtual resource allocation information in the DFT may be a sub-sample group including $N_{ss}^{SSG}$ successive sub-samples, and each UE may occupy one or more sub-sample groups for the DFT. The value of $N_{ss}^{SSG}$ may be fixed or configurable. In addition, the value of $N_{ss}^{SSG}$ may be related to DFT Size. For example, the greater the DFT Size is, the value of $N_{ss}^{SSG}$ may be larger, and vice versa; the system may specify a set of the available $N_{ss}^{SSG}$ values or $N_{ss}^{SSG}$ values for different intervals of DFT Sizes.

Figure 31:
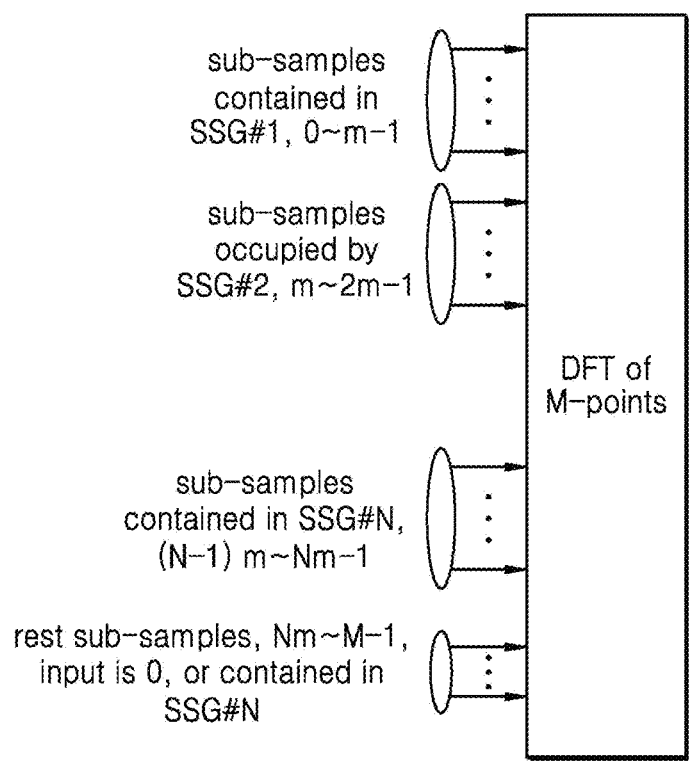
FIG. 31 is a schematic diagram of DFT sub-sample being divided into multiple subsample groups according to embodiments of the present disclosure.

FIG. 31 is a schematic diagram of DFT sub-sample being divided into multiple subsample groups according to embodiments of the present disclosure.

The system divides the entire DFT Size into $\lfloor N_{size}^{DFT}/N_{ss}^{SSG} \rfloor$ sub-sample groups based on $N_{ss}^{SSG}$, wherein, $N_{size}^{DFT}$ is the size of the DFT, and is also the total number of available sub-samples of the DFT; due to that $N_{size}^{DFT}$ may not be exactly divided by $N_{ss}^{SSG}$, then the remaining $N_{size}^{DFT} - \lfloor N_{size}^{DFT}/N_{ss}^{SSG} \rfloor \cdot N_{ss}^{SSG}$ sub-samples in the DFT may be entered as 0 or occupied by adjacent sub-sample groups. As shown in FIG. 31, the DFT of the M points is divided into N sub-sample groups, each sub-sample group occupies m sub-samples, herein m=⌊M/N⌋; the input for the remaining sub-samples is 0, or occupied by the adjacent sub-sample group SSG #N together.

When the value of $N_{ss}^{SSG}$ changes, the number of sub-sample groups included in DFTs with the same size will also change, and the number of bits in the DCI used to indicate the virtual resource allocation in the DFT may also change, that is, the UE determines the number of bits in the DCI field indicating virtual resource allocation in the DFT according to the configured value of $N_{ss}^{SSG}$.

In one example, the value of $N_{ss}^{SSG}$ is configured by the cell system information, for example, to configure a value of one $N_{ss}^{SSG}$ for all DFT Sizes through the cell system information, or to configure values of a group of $N_{ss}^{SSG}$ for different (interval) DFT Sizes respectively.

In another example, the value of $N_{ss}^{SSG}$ is configured by the UE-specific RRC signaling, or configured by the MAC CE, or jointly configured by the UE-specific RRC signaling and the MAC CE, for example, to configure values of a group of $N_{ss}^{SSG}$ by the UE-specific RRC signaling and further indicate one of values of a group of $N_{ss}^{SSG}$ by the MAC CE.

In another example, the value of $N_{ss}^{SSG}$ is configured via the DCI and is indicated in the same DCI as the virtual resource allocation in the DFT; the value of $N_{ss}^{SSG}$ and the virtual resource allocation in the DFT may be separately indicated through two independent DCI fields, or jointly indicated through the same DCI field in a joint coding manner to reduce signaling overhead. Here, the system may configure the value of $N_{ss}^{SSG}$ based on a predefined or pre-configured set.

In another example, the value of $N_{ss}^{SSG}$ may be configured by the DCI, and is indicated in the same DCI as the virtual resource allocation in the DFT, for example, the value of $N_{ss}^{SSG}$ may be specifically indicated by Cell-specific DCI or UE-group specific DCI. Here, the system may configure the value of $N_{ss}^{SSG}$ based on a predefined or pre-configured set.

Alternatively, in order to reduce the signaling overhead of virtual resource allocation within DFT in DCI, the system limits the number of sub-sample groups and/or the position of sub-sample groups allocable for the UE, that is, only a part of $1 \sim \lfloor N_{size}^{DFT}/N_{ss}^{SSG} \rfloor$ sub-sample group being supported to be allocated, and/or only partial possibilities for sub-sample group positions being supported to be allocated. For example, the system specifies that the UE may only occupy all the sub-samples of the DFT or one of the sub-sample groups thereof, and/or the system specifies that the virtual resource allocated by the UE always starts from the first sub-sample group. Although the signaling overhead of virtual resource allocation in the DFT is reduced, the flexibility of virtual resource allocation in the DFT is also reduced. In order to reduce the DCI signaling overhead while maintaining the allocation flexibility, the system may indicate the virtual resources allocation in the DFT through the UE-specific RRC signaling and DCI jointly, pre-configure the set of numbers of allocable sub-sample groups and/or the set of allocable sub-sample group positions through the UE-specific RRC signaling, and indicate a specific virtual resource allocation through DCI based on the above pre-configured set. For example, the number of sub-sample groups is pre-configured through the UE-specific RRC signaling, and then the specific sub-sample group position is indicated through DCI.

In one embodiment, the information transmitting apparatus 3021 transmits the frequency domain resource allocation information and the virtual resource allocation information in the DFT to the user equipment 3010 according to any one of the following:

transmitting a DCI to the user equipment, wherein the DCI includes an indication about the frequency domain resource allocation information and an indication about the virtual resource allocation information in the DFT;

transmitting a high-layer signaling to the user equipment, wherein the high-layer signaling includes an indication about the frequency domain resource allocation information, and transmitting a DCI to the user equipment, wherein the DCI includes an indication about the virtual resource allocation in the DFT;

transmitting a high-layer signaling to the user equipment, wherein the high-layer signaling includes an indication about the virtual resource allocation information in the DFT, and transmitting a DCI to the user equipment, wherein the DCI includes an indication about the frequency domain resource allocation information;

transmitting a high-layer signaling to the user equipment, wherein the high-layer signaling includes an indication about the size of the frequency domain resource allocation, and transmitting a DCI to the user equipment, wherein the DCI includes an indication about the frequency domain resource allocation position and the virtual resource allocation information in the DFT;

transmitting a high-layer signaling to the user equipment, wherein the high-layer signaling includes an indication about the relative size of the virtual resource in the DFT, and transmitting a DCI to the user equipment, wherein the DCI includes an indication about the frequency domain resource allocation information and an indication about the virtual resource allocation position in the DFT;

transmitting a first DCI and a second DCI to the user equipment, wherein the first DCI includes an indication about the frequency domain resource allocation information, and the second DCI includes an indication about the virtual resource allocation information in the DFT, the first DCI and the second DCI are different DCI formats, the first DCI is a UE group DCI, and a group of UEs receiving the UE group DCI transmitted by the base station use the same frequency domain resource and different virtual resources in a same DFT.

Correspondingly, the information obtaining apparatus 3011 of the user equipment 3010 obtains the frequency domain resource allocation information and the virtual resource allocation information in the DFT according to any one of the following:

receiving a DCI transmitted by a base station, wherein the DCI includes an indication about the frequency domain resource allocation information and an indication about the virtual resource allocation information in the DFT;

receiving a high-layer signaling transmitted by a base station, wherein the high-layer signaling includes an indication about the frequency domain resource allocation information, and receiving a DCI transmitted by the base station, wherein the DCI includes an indication about the virtual resource allocation information in the DFT;

receiving a high-layer signaling transmitted by a base station, wherein the high-layer signaling includes an indication about the virtual resource allocation information in the DFT, and receiving a DCI transmitted by the base station, wherein the DCI includes an indication about the frequency domain resource allocation information;

receiving a high-layer signaling transmitted by a base station, wherein the high-layer signaling includes an indication about the size of the frequency domain resource allocation, and receiving a DCI transmitted by the base station, wherein the DCI includes an indication about the frequency domain resource allocation position and the virtual resource allocation position in the DFT;

receiving a high-layer signaling transmitted by a base station, wherein the high-layer signaling includes an indication about the relative size of the virtual resource in the DFT, and receiving a DCI transmitted by the base station, wherein the DCI includes an indication about the frequency domain resource allocation information and an indication about the virtual resource allocation position in the DFT;

receiving a first DCI and a second DCI transmitted by the base station, wherein the first DCI includes an indication about the frequency domain resource allocation information, and the second DCI includes an indication about the virtual resource allocation information in the DFT, the first DCI and the second DCI are different DCI formats, the first DCI is a UE group DCI, and a group of UEs receiving the UE group DCI transmitted by the base station use the same frequency domain resource and different virtual resources in a same DFT.

The PDSCH resource determining apparatus 3012 determines the PDSCH resource according to the frequency domain resource allocation information and the virtual resource allocation information in the DFT. Herein, the physical transmission resources of the PDSCH is determined by the virtual resource allocation information in the frequency domain, and an actual effective occupied resource for the PDSCH is determined by the virtual resource information in the DFT; the UE detects data on a corresponding sub-carrier based on the frequency domain resource allocation information, equalizes the data, then performs IDFT on the equalized data in the frequency domain, and consequently, extracts data on a corresponding sub-sample for the output of the IDFT based on the virtual resource allocation in the DFT, for the subsequent demodulation and decoding.

There may be multiple methods for the base station to indicate to the user equipment the frequency domain resource allocation information of the PDSCH and the virtual resource allocation information in the DFT. For example, when the PDSCH is scheduled, the base station transmits DCI to the user equipment, wherein the DCI includes an indication about the frequency domain resource allocation information and an indication about the virtual resource allocation information in the DFT, that is, the frequency domain resource allocation information and the virtual resource allocation information in the DFT is both indicated in the same DCI simultaneously, i.e., compared with an existing downlink CP-OFDM system, in the downlink MDFT-S-OFDM system, the virtual resource allocation information in the DFT is required to be additionally indicated in the DCI scheduling PDSCH. In one example, the frequency domain resource allocation information and the virtual resource allocation information in the DFT are respectively indicated using two independent DCI fields. In another example, the frequency domain resource allocation information and the virtual resource allocation information in the DFT are jointly indicated by joint coding using a same DCI field to reduce signaling overhead. Methods in existing systems maybe directly reused for the frequency domain resource information allocation, but the virtual resource allocation information in the DFT requires a new design.

As another example, the base station transmits a high-layer signaling to the user equipment, wherein the high-layer signaling includes an indication about the frequency domain resource allocation information, and transmits DCI to the user equipment, wherein the DCI includes an indication about the virtual resource allocation information in the DFT, such that the UE jointly determines resources of the PDSCH according to the frequency domain resource allocation information indicated by the high-layer signaling and the virtual resource information allocation in the DFT indicated by the DCI. Herein, the high-layer signaling indicating the frequency domain resource allocation information may be a UE-specific RRC signaling or MAC CE, and the size of the frequency domain resource allocation is the DFT size, that is, the DFT size is semi-statically configured through the high-layer signaling. In ultrahigh-frequency communication systems, delay spread of a wireless channel is small, and selectivity gain in frequency domain is not large. This method of semi-statically indicating frequency-domain resource allocation may effectively reduce the physical layer signaling overhead and has low impact on system performance.

As another example, the base station further transmits high-layer signaling to the user equipment, wherein the high-layer signaling includes an indication about the size of the frequency domain resource allocation, and transmits a DCI to the user equipment, wherein the DCI includes an indication about the frequency domain resource allocation position and the virtual resource allocation information in the DFT. Herein, the base station semi-statically indicates the frequency domain resource allocation information of the PDSCH through the UE-specific RRC signaling or MAC CE, including the size (i.e., the number of PRBs) and position of the frequency domain allocation, wherein the number of sub-carriers allocated in the frequency domain is the DFT size, and then, dynamically indicates the virtual resource allocation information in the DFT by the DCI; the UE determines the number of bits in the DCI indicating the virtual resource allocation in the DFT according to the size of semi-statically configured frequency domain resource allocation (i.e., the DFT size).

As another example, the base station transmits a high-layer signaling to the user equipment, wherein the high-layer signaling includes an indication about the virtual resource allocation information in the DFT, and transmits DCI to the user equipment, wherein the DCI includes an indication about the frequency domain resource allocation information, such that the UE jointly determines resources of the PDSCH according to the virtual resource information allocation in the DFT indicated by the high-layer signaling and the frequency domain resource information allocation indicated by the DCI. Herein, the base station indicates the virtual resource allocation information in the DFT through the UE-specific RRC signaling or MAC CE, and due to that the size of the frequency domain resource allocation is uncertain, that is, the DFT size is uncertain, the base station may only indicate relative virtual resource allocation information in the DFT instead of absolute virtual resource allocation information, for example, indicating the ratio and relative position of virtual resources occupied in the DFT, and the UE determines the DFT Size according to the frequency domain resource allocation size indicated by the DCI to determine the absolute virtual resource position in the DFT.

For another example, the base station transmits the high-layer signaling to the user equipment, wherein the high-layer signaling includes an indication of the relative size of the virtual resources in the DFT, for example, the ratio of the relative DFT size, and transmits the DCI to the user equipment, wherein the DCI includes an indication about the frequency domain resource allocation information and an indication about the virtual resource position in the DFT, so that the UE determines the PDSCH resource jointly according to the relative size of the virtual resource in the DFT indicated by the high-layer signaling and the frequency domain resource allocation information and the virtual resource position in the DFT indicated by the DCI. Herein, the UE may obtain the virtual resource allocation information in the DFT according to the relative size of the virtual resources in the DFT indicated by the high-layer signaling and the virtual resource position in the DFT indicated by the DCI.

Alternatively, the base station transmits a first DCI and a second DCI to the user equipment, wherein the first DCI includes an indication about the frequency domain resource allocation information, and the second DCI includes an indication about the virtual resource allocation information in the DFT, the first DCI and the second DCI are different DCI formats, the first DCI is a UE group DCI, and a group of UEs receiving the UE group DCI transmitted by the base station use the same frequency domain resource and different virtual resources in a same DFT. That is, the frequency domain resource allocation information of the PDSCH and the virtual resource allocation information in the DFT are not indicated in the same DCI. The frequency domain resource allocation information and the virtual resource allocation information in the DFT may be separately indicated by two DCIs, or even indicated by signalings in different layers, for example, the frequency domain resource allocation information is semi-statically indicated by high-layer signaling, and the virtual resource allocation information in the DFT is dynamically indicated by the DCI; alternatively, the virtual resource allocation information in the DFT is semi-statically indicated through the high-layer signaling, and the frequency domain resource allocation information is dynamically indicated by the DCI. Herein, the base station indicates the frequency domain resource allocation information of the PDSCH to a group of UEs through the UE-group specific DCI, and the group of UEs share the same piece of frequency domain resource allocation information, that is, the group of UEs is multiplexed in the same DFT, which the UE-group specific DCI only includes indication information of the frequency domain resource allocation information; the base station also indicates to a UE virtual resource allocation information in the DFT of the PDSCH through the UE-specific DCI, which the UE-specific DCI also includes other PDSCH scheduling information, such as MCS, NDI, HARQ process, RV and other scheduling information.

In one example, the above UE-group specific DCI and UE-specific DCI are transmitted simultaneously in the same PDCCH search space. If the UE receives only one of the two, the scheduling information is incomplete and the UE cannot receive the corresponding PDSCH.

In another example, the above UE-group specific DCI and UE-specific DCI may be transmitted at different times based on different PDCCH search spaces. When receiving the UE-specific DCI indicating the virtual resource allocation in the DFT, the UE should jointly determine the PDSCH resource in combination with the recently received UE-group specific DCI indicating the frequency domain resource allocation. Herein, a PDCCH search space where the UE-group specific DCI is located may have a longer monitoring period than a PDCCH search space where the UE-specific DCI is located.

Alternatively, the UE jointly determines the PDSCH resource according to the DFT Size indicated by the high-layer signaling, the frequency domain resource position and the virtual resource information allocation in the DFT indicated by the DCI. The DFT Size is the number of sub-carriers allocated in the frequency domain, and may be obtained by multiplying the number of PRBs allocated in the frequency domain by the number of sub-carriers included in one PRB, that is, the size of the frequency domain resource allocation is indicated semi-statically by the high-layer signaling, but the position of the frequency domain resource allocation is indicated dynamically by the DCI. In one example, the frequency domain resource position indication and the virtual resource allocation in the DFT are indicated in the same DCI, that is, indicated in the DCI scheduling PDSCH. In another example, the frequency domain resource position indication and the virtual resource allocation in the DFT may be indicated separately in different DCIs, for example, the former is indicated by the UE-group specific DCI, and the latter is indicated by the UE-specific DCI.

In yet another alternative implementation manner, the foregoing frequency domain resource allocation information of the PDSCH indicated by the DCI may be used to reduce DCI signaling overhead by some methods, for example, limiting the size of the frequency domain resource allocation, that is, not all possible PRBs may be allocated. Herein, the size of the frequency domain resource allocation may also be referred to as DFT Size, that is, not all possible DFT Sizes are supportable.

In one example, the size of the frequency domain resource allocation (that is, the number of allocated PRBs) is semi-statically configured through the high-layer signaling, and the frequency domain resource allocation position is dynamically configured through the DCI. The size of the frequency domain resource allocation may be configured by the UE-specific RRC signaling, or configured by the MA CE, or jointly configured by the UE-specific RRC signaling and MAC CE, for example, a set of the PRB numbers (or, DFT size) is configured by the UE-specific RRC and then a certain value in the set is indicated by the MAC CE. Assuming that the PDSCH only supports continuous PRB allocation in the frequency domain, then only the starting PRB position needs to be indicated in the DCI.

In another example, the system uses a high-layer signaling (UE-specific RRC signaling or MAC CE) to semi-statically configure a set of PRB numbers (or DFT Size) that may be allocated in frequency domain resources, and dynamically indicate the frequency domain resource allocation information for PDSCH based on this set in the DCI.

Alternatively, similar to the traditional frequency domain resource allocation, the virtual resource allocation pattern in the DFT may be centralized or distributed, which the centralized means that the virtual resources occupied by the UE are continuous, and the distributed means that the virtual resources occupied by the UE are discontinuous. For the virtual resource allocation in a centralized DFT, the system may indicate the starting sub-sample group position and the number of successively allocated subsample groups, and jointly encode these two pieces of information to save signaling overhead. For the virtual resource allocation in a distributed DFT, one of the most flexible indication methods is the utilization of a bit-map, that is, each indication bit corresponds to a sub-sample group, and each sub-sample group may be independently indicated whether to be occupied. The disadvantage of this method is that the signaling overhead is large, and the number of bits required is the total number of sub-sample groups. In order to further reduce the signaling overhead, existing distributed frequency domain resource allocation methods in the LTE or NR system may be used as a reference. In one example, the system supports both centralized and distributed virtual resource allocation for the DFT, and configures one of them through a high-layer signaling (RRC-layer signaling or MAC-layer signaling); or indicates one of them through the DCI. The indication field for virtual resource allocation in the DFT has different interpretations for the centralized and the distributed manners. In another example, the system only supports the centralized virtual resource allocation for the DFT.

Alternatively, it is assumed that the resource scheduling granularity of the PDSCH in the time domain is a slot including multiple OFDM symbols, and in a slot, the number of sub-sample groups of the DFT occupied by the PDSCH in each OFDM symbol is identical, but the position of the sub-sample group of the occupied DFT may be identical or different. In one example, in each OFDM symbol of a slot, there is a certain correlation between the virtual resource positions of the DFT occupied by the UE. The virtual resource allocation in the DFT indicated by the DCI is only used for the first slot in the slot, and virtual resource positions of DFTs in other OFDM symbols may be obtained by the virtual resource position of the DFT in the first OFDM symbol according to a predefined rule. For example, virtual resource positions of DFT in different OFDM symbols are successively hopping throughout the entire DFT with a predefined rule, similar to the frequency hopping mechanism of the existing system, that is, the UE performs hopping to different virtual resource positions of DFT in different OFDM symbols of the same slot, which is referred to as intra-slot hopping. Similarly, the hopping of virtual resources in DFT may also be applied to inter-slot hopping, that is, the UE performs hopping to different virtual resource positions in the DFT in different slots.

In an alternative embodiment, if there is a process of interleaving the DFT input before the DFT transform in the system, the user equipment 3010 further includes a first receiving apparatus (not shown), and the base station 3020 further includes a first transmitting apparatus (not shown). Specifically, the first transmitting apparatus of the base station 3020 transmits the interleaving information in the DFT to the user equipment 3010, and accordingly, the first receiving apparatus of the user equipment 3010 receives the interleaving information in the DFT transmitted by the base station 3020, and the PDSCH resource determining apparatus 3012 determines the PDSCH resource according to the frequency domain resource allocation information, the virtual resource allocation in the DFT, and the interleaving information in the DFT.

Alternatively, before the DFT transform, the base station performs an interleaving process on the input of the DFT, that is, the input of the DFT is rearranged according to a certain rule and then is processed by the DFT-transform. The interleaving may divide data of multiple UEs multiplexed in the DFT, or divide data of UEs and zero-input signals, to improve the anti-interference performance for the PDSCH. The above virtual resource allocation information in the DFT is used to indicate the virtual resources occupied by the UE before interleaving. The UE should deinterleave the output of the IDFT at the receiving end, and then extract the deinterleaved data in the corresponding sub-sample according to the virtual resource allocation in the indicated DFT, which the data is used for demodulation and decoding. That is, in addition to indicating the virtual resource allocation information in the DFT, the system further indicates the interleaving information in the DFT. The UE jointly determines the PDSCH resource according to the virtual resource allocation information in the DFT, and the interleaving information and frequency domain resource allocation information in the DFT.

In one example, the interleaving information in the DFT is dynamically indicated by the DCI, for example, the interleaving of the DFT is activated or deactivated, or one of multiple predefined interleaving modes is indicated. The interleaving information in the DFT and the virtual resource allocation information in the DFT may be both indicated in the same DCI, for example, they are respectively indicated by two different DCI fields, or they are jointly indicated by the same DCI field through joint coding, to reduce signaling overhead; the interleaving information in the DFT and the virtual resource allocation information in the DFT may also be indicated in different DCIs, the former is indicated by the cell-specific DCI or UE-group specific DCI, the latter is indicated by the UE-specific DCI, which the two both may use different RNTI values to scramble the corresponding CRC.

In another example, the interleaving information in the DFT is indicated by the high-layer signaling (UE-specific RRC signaling or MAC CE), for example, the interleaving of the DFT is activated or deactivated through the high-layer signaling, or one of multiple predefined interleaving modes is indicated.

In another example, the interleaving information in the DFT is jointly indicated by the high-layer signaling and the DCI, for example, the interleaving of the DFT is activated or deactivated through the high-layer signaling. When the interleaving of the DFT is activated, one of multiple predefined interleaving modes is indicated through the DCI.

In an alternative embodiment, if there is a process of zero-input the DFT input before the DFT transform in the system, the user equipment 3010 further includes a second receiving apparatus (not shown) and a position determining apparatus (not shown), and the base station 3020 further includes a second transmitting apparatus (not shown). Specifically, the second transmitting apparatus of the base station 3020 transmits the zero-input information in the DFT to the user equipment 3010, and accordingly, the second receiving apparatus of the user equipment 3010 receives the zero-input information in the DFT transmitted by the base station 3010; the position determining apparatus determines a position of a sub-sample wherein the input is zero in DFT according the zero-input information in the DFT, to assist the PDSCH detection.

Alternatively, if there is a process of zero-input the DFT input before the DFT transform in the system, the base station also needs to transmit the zero-input information in the DFT to the user equipment, so that the user equipment determines a position of a sub-sample wherein the input is zero in DFT according the zero-input information in the DFT, to assist the PDSCH detection and improve PDSCH detection performance.

In an example, the system specifies that one DFT includes at most data of one UE, and the input of the DFT may be operated with a zero-input with a fixed ratio or a variable ratio. Then inputs on sub-samples except these of the virtual resource of the DFT actually occupied by the UE are all zero, which means that it is not necessary to be indicated by using additional signaling. Herein, the virtual resource allocation indication in the DFT may be implemented by indicating the ratio and relative position of the occupied virtual resources of the DFT. Alternatively, the system always assumes that the inputs on the sub-samples except these of the virtual resources of the DFT occupied by the UE are all zero. Alternatively, the system indicates, through high-layer signaling, that the inputs on the sub-samples except these of the virtual resources of the DFT occupied by the UE are all zero, for example, to indicate by the cell system information or by UE-specific RRC signaling.

In another example, the system specifies that a DFT may include data of multiple UEs, and the input of the DFT may be operated with a zero-input with a fixed ratio or a variable ratio. Then, additional signaling is required to indicate the DFT zero-input information, that is, the position of sub-sample wherein the input of the DFT is zero.

The virtual resource allocation information in the DFT and the zero-input information of the DFT have a direct correlation. The assignable sub-sample for the UE is a sub-sample other than the sub-sample wherein the input is zero. If the ratio of the sub-samples wherein the input is zero is high, the ratio of assignable sub-samples for the UE is low, and vice versa. The UE may determine the number of bits and/or interpretation of the DCI field for indicating the virtual resource allocation in the DFT according to the indication information for the zero-input operation for DFT. Preferably, the system indicates the zero-input information of the DFT semi-statically through the UE-specific RRC signaling, which including indicating the zero-input ratio and/or the zero-input position of the DFT, and then dynamically allocates the subsample occupied by the UE based on sub-sample other than the sub-sample indicating zero-input, that is, to indicate the virtual resource allocation on the sub-sample other than the sub-sample with zero-input through the DCI.

In one example, the zero-input information in the DFT is dynamically indicated by the DCI, for example, to activate or deactivate the zero-input operation of the DFT, or to indicate one of multiple ratios and one of multiple relative positions of a predefined zero-input operation. The zero-input information in the DFT and the virtual resource allocation information in the DFT may be indicated in the same DCI, for example, they are respectively indicated by two different DCI fields, or they are jointly indicated by the same DCI field through joint coding, to reduce signaling overhead; the zero-input information in the DFT and the virtual resource allocation information in the DFT may also be indicated in different DCIs, the former is indicated by the cell-specific DCI or UE-group specific DCI, the latter is indicated by the UE-specific DCI, which the two both may use different RNTI values to scramble the corresponding CRC.

In another example, the zero-input information in the DFT is indicated by the high-layer signaling (UE-specific RRC signaling or MAC CE), for example, one of the zero-input operation of activating or deactivating the DFT, and the zero-input operation of indicating predefined multiple ratios and multiple relative positions.

In another example, the zero-input information in the DFT is jointly indicated by the high-layer signaling and the DCI, for example, one of the zero-input operation of activating or deactivating the DFT through the high-layer signaling, or the zero-input operation of indicating multiple predefined ratios and multiple relative positions when the zero-input operation of the DFT is activated.

In yet another alternative embodiment, a DCI may schedule PDSCH for a group of multiple UEs simultaneously. The PDSCHs of multiple UEs use the same frequency domain resource (that is, share the same frequency domain resource) and use the different virtual resources in the same DFT, that is, this DCI is a UE-group specific DCI that a group of UEs simultaneously monitor and receive, and the RNTI value used to scramble the CRC is also a dedicated RNTI value, which is different from the C-RNTI value of the existing system. The base station may multiplex a group of UEs with similar service characteristics in the same DFT for scheduling, and configure a unique intra-group UE index for each UE through the high-layer signaling; the UE determines the corresponding virtual resource position of the DFT according to the intragroup UE index.

Figure 32:
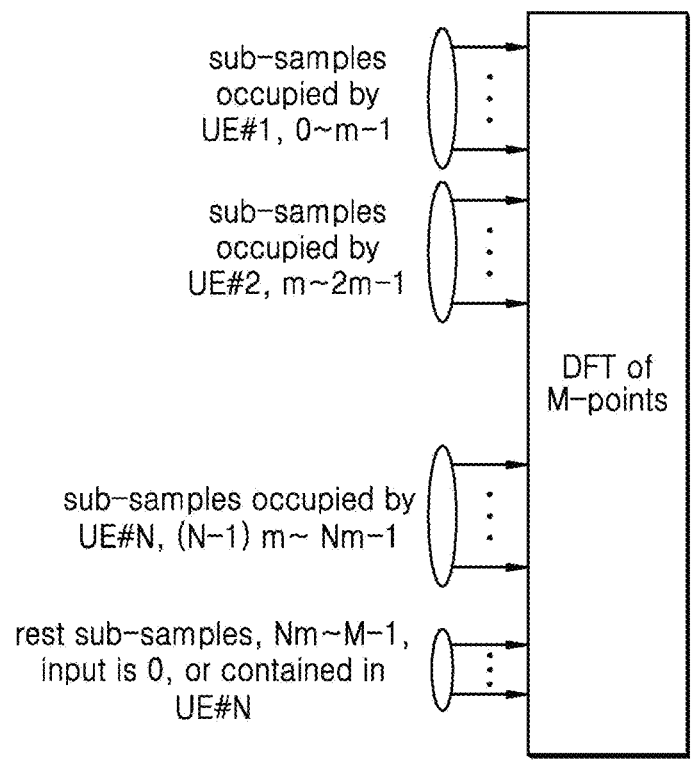
FIG. 32 is a schematic diagram in which a DFT input is evenly divided by a group of UEs according to embodiments of the present disclosure.

FIG. 32 is a schematic diagram in which a DFT input is evenly divided by a group of UEs according to embodiments of the present disclosure.

In one example, a group of UEs sharing the same frequency domain resource allocation are all allocated the same virtual resource size in the DFT, and the virtual resources are allocated in order according to the intra-group UE index, that is, the virtual resources of the DFT are evenly allocated to a group of UEs and allocated in order according to the intra-group UE index. As shown in FIG. 32, the virtual resources of the DFT of the M points are evenly divided by N UEs, which each UE occupies m (herein, m=⌊M/N⌋) sub-samples, and the remaining sub-samples are input as 0 or occupied by the adjacent UE #N together, such that there is no need to indicate the virtual resource allocation information in DFT in the UE-group specific DCI for scheduling PDSCH of a group of UEs simultaneously, and the UE is capable of determining the PDSCH resource according frequency domain resource allocation information indicated in the DCI and the intra-group UE index.

Alternatively, the above UE-group specific DCI that schedules the PDSCH of a group of UEs simultaneously may also schedule only one or more of the group of UEs. For example, when the DCI includes a bit-map and each bit corresponds to a UE, wherein 1 indicates that the UE has corresponding PDSCH transmission and 0 indicates that the UE does not have corresponding PDSCH transmission, the UE determines the corresponding indication bit according to its intra-group UE index. This method may ensure scheduling flexibility, that is, scheduling may be performed without waiting for all UEs to have downlink data transmission, but the disadvantage is that there may be a waste of resources.

In another example, the sizes of virtual resources allocated in the DFT by a group of UEs sharing the same frequency domain resource allocation have no correlation, but the positions of the virtual resources are related. For example, the relative virtual resource position in the DFT for this group of UEs are allocated in order according to the intra-group UE index, and then the UE-group specific DCI that schedules the PDSCH of a group of UEs simultaneously may indicate the size of the DFT virtual resources occupied by each UE, without indicating the positions of the virtual resources, that is, each UE has its corresponding indication fields for the sizes of the virtual resources of the DFT, which these indication fields are arranged in order in the DCI according to the intra-group UE index. Alternatively, the sizes of the virtual resources of the DFT of the last UE in the group does not need to be indicated, and may be obtained according to the sizes of the virtual resources of the DFTs of other UEs in the group, for example, by default using a sub-sample other than sub-samples allocated by other UEs.

In another example, the sizes and positions of the virtual resources allocated in the DFT by a group of UEs that share the same frequency domain resource allocation have no correlation, then the above UE-group specific DCI that schedules PDSCH of a group of UEs simultaneously indicates the virtual resource allocation in the DFT of each UE, including the allocation of the size and position of the virtual resource, that is, each UE has a corresponding indication field for the virtual resource allocation in the DFT, and these indication fields are sequentially arranged in the DCI according to the intra-group UE index. Alternatively, the virtual resource allocation in the DFT of the last UE in the group does not need to be indicated, and may be obtained according to the virtual resource allocation in the DFTs of other UEs in the group, for example, by default using sub-sample(s) other than sub-samples allocated by other UEs.

Figure 33:
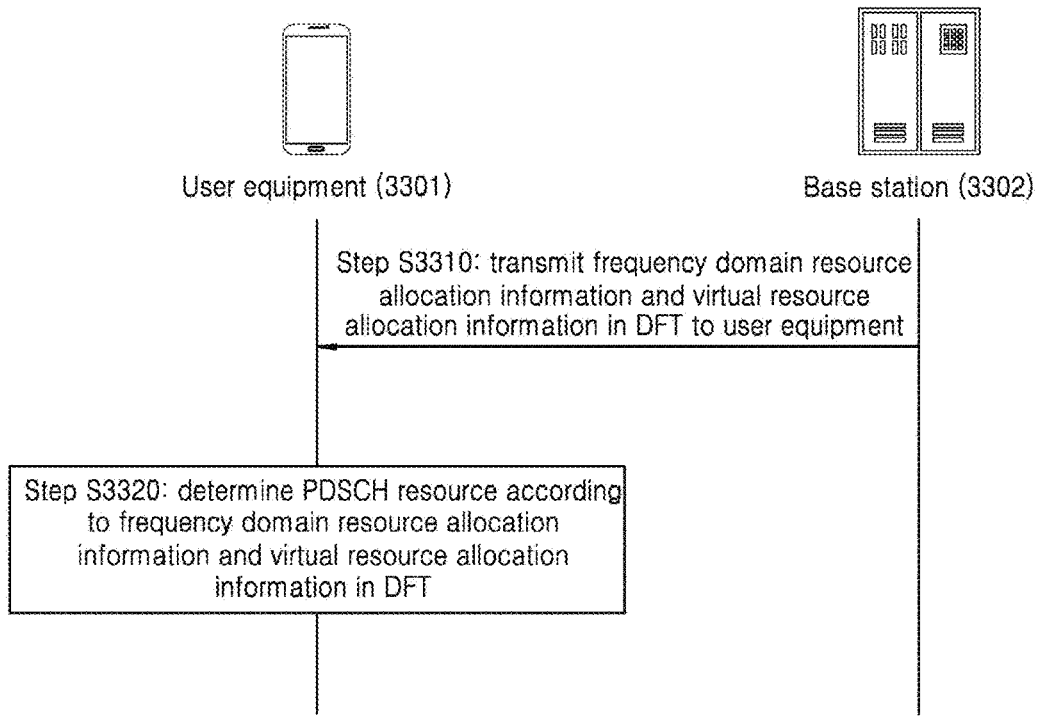
FIG. 33 is a schematic flowchart of PDSCH resource allocation in an MDFT-S-OFDM-based high-frequency communication system implemented by coordination of a user equipment and base station according to an embodiment of the present application.

FIG. 33 is a schematic flowchart of PDSCH resource allocation in an MDFT-S-OFDM-based high-frequency communication system implemented by coordination of a user equipment and base station according to an embodiment of the present disclosure.

The method includes steps S3310 and S3320.

Specifically, in step S3310 the base station 3302 transmits frequency domain resource allocation information and the virtual resource allocation information in the DFT to the user equipment 3301, so that the user equipment 3301 determines the PDSCH resource according to the frequency domain resource allocation information and the virtual resource allocation information in the DFT, and accordingly, the user equipment 3301 obtains the frequency domain resource allocation information and virtual resource allocation information in the DFT; in step S3320, the user equipment 3301 determines the PDSCH resource according to the frequency domain resource allocation information and the virtual resource allocation information in the DFT.

Alternatively, in step S3310, the base station 3302 transmits the frequency domain resource allocation information and the virtual resource allocation information in the DFT to the user equipment 3301 according to any one of the following:

transmitting a DCI to the user equipment, wherein the DCI includes an indication about the frequency domain resource allocation information and an indication about the virtual resource allocation information in the DFT;

transmitting a high-layer signaling to the user equipment, wherein the high-layer signaling includes an indication about the frequency domain resource allocation information, and transmitting a DCI to the user equipment, wherein the DCI includes an indication about the virtual resource allocation information in the DFT;

transmitting a high-layer signaling to the user equipment, wherein the high-layer signaling includes an indication about the virtual resource allocation information in the DFT, and transmitting a DCI to the user equipment, wherein the DCI includes an indication about the frequency domain resource allocation information;

transmitting a high-layer signaling to the user equipment, wherein the high-layer signaling includes an indication about the size of the frequency domain resource allocation, and transmitting a DCI to the user equipment, wherein the DCI includes an indication about the frequency domain resource allocation position and the virtual resource allocation information in the DFT;

transmitting a high-layer signaling to the user equipment, wherein the high-layer signaling includes an indication about the relative size of the virtual resource in the DFT, and transmitting a DCI to the user equipment, wherein the DCI includes an indication about the frequency domain resource allocation information and an indication about the virtual resource allocation position in the DFT;

transmitting a first DCI and a second DCI to the user equipment, wherein the first DCI includes an indication about the frequency domain resource allocation information, and the second DCI includes an indication about the virtual resource allocation information in the DFT, the first DCI and the second DCI are different DCI formats, the first DCI is a UE group DCI, and a group of UEs receiving the UE group DCI transmitted by the base station use the same frequency domain resource and different virtual resources in a same DFT.

Correspondingly, in step S3310, the user equipment 3301 obtains the frequency domain resource allocation information and the virtual resource allocation information in the DFT according to any one of the following:

receiving a DCI transmitted by a base station, wherein the DCI includes an indication about the frequency domain resource allocation information and an indication about the virtual resource allocation information in the DFT;

receiving a high-layer signaling transmitted by a base station, wherein the high-layer signaling includes an indication about the frequency domain resource allocation information, and receiving a DCI transmitted by the base station, wherein the DCI includes an indication about the virtual resource allocation in the DFT;

receiving a high-layer signaling transmitted by a base station, wherein the high-layer signaling includes an indication about the virtual resource allocation information in the DFT, and receiving a DCI transmitted by the base station, wherein the DCI includes an indication about the frequency domain resource allocation information;

receiving a high-layer signaling transmitted by a base station, wherein the high-layer signaling includes an indication about the size of the frequency domain resource allocation, and receiving a DCI transmitted by the base station, wherein the DCI includes an indication about the frequency domain resource allocation position and the virtual resource allocation position in the DFT;

receiving a high-layer signaling transmitted by a base station, wherein the high-layer signaling includes an indication about the relative size of the virtual resource in the DFT, and receiving a DCI transmitted by the base station, wherein the DCI includes an indication about the frequency domain resource allocation information and an indication about the virtual resource allocation position in the DFT;

receiving a first DCI and a second DCI transmitted by the base station, wherein the first DCI includes an indication about the frequency domain resource allocation information, and the second DCI includes an indication about the virtual resource allocation information in the DFT, the first DCI and the second DCI are different DCI formats, the first DCI is a UE group DCI, and a group of UEs receiving the UE group DCI transmitted by the base station use the same frequency domain resource and different virtual resources in a same DFT.

Alternatively, if there is a process of interleaving the DFT input before the DFT transform in the system, the method further includes step S3330 (not shown). The user equipment 3301 further includes a first receiving apparatus (not shown), and the base station 3302 further includes a first transmitting apparatus (not shown). Specifically, in step S3330, the base station 3302 transmits the interleaving information in the DFT to the user equipment 3301, and accordingly, the user equipment 3301 receives the interleaving information in the DFT transmitted by the base station 3302; in step S3320, the user equipment 3301 determines the PDSCH resource according to the frequency domain resource allocation information, the virtual resource allocation in the DFT, and the interleaving information in the DFT.

Alternatively, if there is a process of zero-input the DFT input before the DFT transform in the system, the method further includes step S3340 (not shown) and S3350 (not shown), the user equipment 3301 further includes a second receiving apparatus (not shown) and a position determining apparatus (not shown), and the base station 3302 further includes a second transmitting apparatus (not shown). Specifically, in step S3340, the base station 3302 transmits the zero-input information in the DFT to the user equipment 3301, and accordingly, the user equipment 3301 receives the zero-input information in the DFT transmitted by the base station 3302; in step S3350, the user equipment 3301 determines a position of a sub-sample wherein the input is zero in DFT according to the zero-input information in the DFT, to assist the PDSCH detection.

It should be noted that: the PDSCH resource allocation method in the MDFT-S-OFDM-based high-frequency communication system provided by the above embodiments and embodiments of the PDSCH resource allocation apparatus in the MDFT-S-OFDM-based high-frequency communication system belong to the same concept, and the detailed implementation processes may be described in embodiments for apparatus, which will not be repeated herein.

Figure 34:
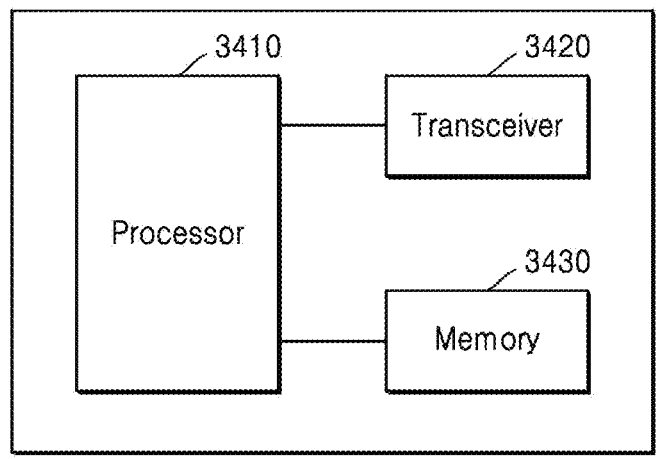
FIG. 34 schematically illustrates the base station according to embodiments of the present disclosure.

FIG. 34 schematically illustrates the base station according to embodiments of the present disclosure.

Referring to the FIG. 34, the Base station 3400 may include a processor 3410, a transceiver 3420 and a memory 3430. However, all of the illustrated components are not essential. The Base station 3400 may be implemented by more or less components than those illustrated in FIG. 34. In addition, the processor 3410 and the transceiver 3420 and the memory 3430 may be implemented as a single chip according to another embodiment.

The Base station 3400 may correspond to basestation described above. For example, the Base station 3400 may correspond to the base station 20 illustrated in FIG. 1. Also, the Base station 3400 may correspond to the entity 700 illustrated in FIG. 7. Another example, the Base station 3400 may correspond to the base station 3020 illustrated in FIG. 30 and the base station 3302 illustrated in FIG. 32.

The aforementioned components will now be described in detail.

The processor 3410 may include one or more processors or other processing devices that control the proposed function, process, and/or method. Operation of the Base station 3400 may be implemented by the processor 3410.

The transceiver 3420 may include a RF transmitter for up-converting and amplifying a transmitted signal, and a RF receiver for down-converting a frequency of a received signal. However, according to another embodiment, the transceiver 3420 may be implemented by more or less components than those illustrated in components.

The transceiver 3420 may be connected to the processor 3410 and transmit and/or receive a signal. The signal may include control information and data. In addition, the transceiver 3420 may receive the signal through a wireless channel and output the signal to the processor 3410. The transceiver 3420 may transmit a signal output from the processor 3410 through the wireless channel.

The memory 3430 may store the control information or the data included in a signal obtained by the Base station 3400. The memory 3430 may be connected to the processor 3410 and store at least one instruction or a protocol or a parameter for the proposed function, process, and/or method. The memory 3430 may include read-only memory (ROM) and/or random access memory (RAM) and/or hard disk and/or CDROM and/or DVD and/or other storage devices.

Figure 35:
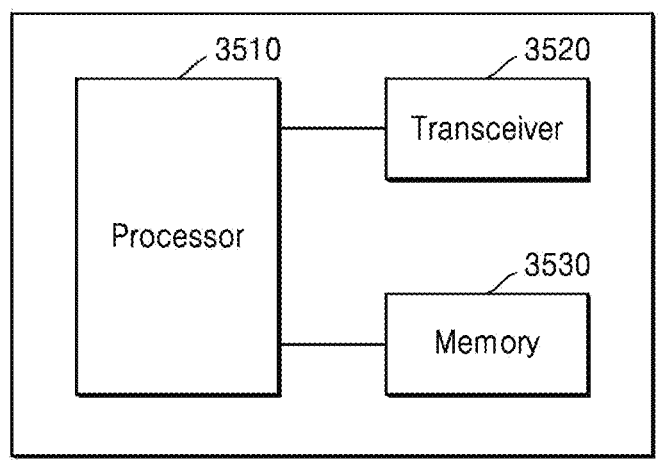
FIG. 35 illustrates a user equipment (UE) according to embodiments of the present disclosure.

FIG. 35 illustrates a user equipment (UE) according to embodiments of the present disclosure.

Referring to the FIG. 35, the UE 3500 may include a processor 3510, a transceiver 3520 and a memory 3530. However, all of the illustrated components are not essential. The UE 3500 may be implemented by more or less components than those illustrated in FIG. 35. In addition, the processor 3510 and the transceiver 3520 and the memory 3530 may be implemented as a single chip according to another embodiment.

The UE 3500 may correspond to basestation described above. For example, UE 3500 may correspond to the terminal 10 illustrated in FIG. 1. Also, the UE 3500 may correspond to the entity 700 illustrated in FIG. 7. For example, UE 3500 may correspond to the UE1800, the UE 1900, the UE 2000, the UE 2100, the UE 2200 and the UE 2300 illustrated in FIGS. 18 to 23. Another example, the UE 3500 may correspond to the User equipment 3010 illustrated in FIG. 30 and the User equipment 3301 illustrated in FIG. 32.

The aforementioned components will now be described in detail.

The processor 3510 may include one or more processors or other processing devices that control the proposed function, process, and/or method. Operation of the UE 3500 may be implemented by the processor 3510.

The transceiver 3520 may include a RF transmitter for up-converting and amplifying a transmitted signal, and a RF receiver for down-converting a frequency of a received signal. However, according to another embodiment, the transceiver 3520 may be implemented by more or less components than those illustrated in components.

The transceiver 3520 may be connected to the processor 3510 and transmit and/or receive a signal. The signal may include control information and data. In addition, the transceiver 3520 may receive the signal through a wireless channel and output the signal to the processor 3510. The transceiver 3520 may transmit a signal output from the processor 3510 through the wireless channel.

The memory 3530 may store the control information or the data included in a signal obtained by the UE 3500. The memory 3530 may be connected to the processor 3510 and store at least one instruction or a protocol or a parameter for the proposed function, process, and/or method. The memory 3530 may include read-only memory (ROM) and/or random access memory (RAM) and/or hard disk and/or CD-ROM and/or DVD and/or other storage devices. As will be appreciated by those skilled in the art, the present disclosure may involve apparatus for carrying out one or more the operations as described in the present disclosure. The apparatus may be specially designed and manufactured as required, or may include well known equipment in a general-purpose computer. These apparatuses store computer programs that are selectively activated or reconstructed. Such computer programs may be stored in device (for example, computer) readable media or in any type of medium suitable for storing electronic signaling and respectively coupled to a bus, the computer readable medium includes but not limited to any type of disk (including floppy disk, hard disk, optical disk, CDROM, and magneto optical disk), read-only memory (ROM), random access memory (RAM), Erasable Programmable Read-Only Memory (EPROM), Electrically Erasable Programmable Read-Only Memory (EEROM), flash memory, magnetic card or optical line card. That is, the readable media include any medium for storing or transmitting information in a device (for example, computer) readable form.

It should be appreciated by those skilled in the art that each block as well as the combination of the blocks in the structural diagrams and/or block diagrams and/or flowcharts may be implemented through computer program instructions. It should be appreciated by those skilled in the art that these computer program instructions may be provided to a general-purpose computer, a professional computer, or a processor of other programmable data processing method, so that the solutions specified in the one or more blocks in the structural diagrams and/or block diagrams and/or flowcharts of the present disclosure by the computer or the processor of other programmable data processing method.

It should be appreciated by those skilled in the art that the various operations, methods, steps in the flow, measures and schemes discussed in the present disclosure may be alternated, modified, combined or deleted. Furthermore, operations, methods, steps in the flow, measures and schemes having the various operations, methods, other steps in the flow, measures and schemes discussed in the present disclosure may also be alternated, modified, rearranged, dissolved, combined or deleted. Furthermore, the operations, methods, steps in the flow, measures and schemes similar to the various operations, methods, other steps in the flow, measures and schemes discussed in the present disclosure may also be alternated, modified, rearranged, dissolved, combined or deleted.

The foregoing is only a part of the embodiments of the present disclosure, and it should be noted that those skilled in the art may also make several improvements and retouching without departing from the principles of the present disclosure, which should be considered as the protection scope of the present disclosure.

The invention claimed is:

1. A method performed by a terminal in a wireless communication system, the method comprising:
   receiving a physical downlink control channel (PDCCH), the PDCCH including downlink control information (DCI) for scheduling one or more physical downlink shared channels (PDSCHs);

receiving the PDSCHs according to the DCI;
transmitting a hybrid automatic repeat request acknowledgement (HARQ-ACK/NACK) codebook for the PDSCHs;
grouping, for a plurality of PDSCHs that are fed back in the HARQ-ACK/NACK codebook, the PDSCHs according to a DCI format of the DCI for scheduling each of the PDSCHs, wherein PDSCHs scheduled by DCI of a given DCI format belong to a given PDSCH group; and
determining the codebook for each PDSCH group.

2. The method of claim 1,
wherein the DCI comprises a downlink assignment index (DAI); and
wherein, where one DCI schedules a plurality of PDSCHs, the DAI indicates information on a first PDSCH of the plurality of PDSCHs, or indicates information on a last PDSCH of the plurality of PDSCHs.

3. The method of claim 1,
wherein the DCI comprises a downlink assignment index (DAI); and
wherein, where a plurality of PDSCHs scheduled by one PDCCH belong to one or more PDSCH groups, the DAI includes one or more DAI bit fields, and each of the DAI bit fields respectively corresponds to DAI information of one PDSCH group.

4. The method of claim 1, further comprising:
grouping, for a plurality of PDSCHs that are fed back in the HARQ-ACK/NACK codebook, the PDSCHs according to a number of PDSCHs scheduled by each DCI for scheduling the plurality of PDSCHs, wherein a PDSCH scheduled by such DCI that schedules PDSCHs of a number greater than a threshold value, and a PDSCH scheduled by such DCI that schedules PDSCHs, a number of which is less than or equal to the threshold value, belong to different PDSCH groups; and
determining the codebook for each PDSCH group.

5. The method of claim 1, further comprising:
grouping, for a plurality of PDSCHs that are fed back in a HARQ-ACK/NACK codebook, the PDSCHs according to a transmission granularity, wherein PDSCHs having a given transmission granularity belong to a given PDSCH group, and PDSCHs having different transmission granularities belong to different PDSCH groups, or PDSCHs having different granularities belong to a given PDSCH group determined according to a transmission granularity of a reference PDSCH; and
determining the codebook for each PDSCH group.

6. The method of claim 1,
wherein the DCI comprises a downlink assignment index (DAI) for counting the PDCCHs, and
wherein a number of bits of a HARQ-ACK/NACK corresponding to one PDCCH Nt=Nmax_p×Nmax_pdsch and a total number of bits of the sent HARQ-ACK/NACK codebook M×Nt=M×Nmax_p×Nmax_pdsch, where Nmax_p is a number of bits of a HARQ-ACK/NACK of each PDSCH, Nmax_pdsch is a maximum number of PDSCHs scheduled by the one PDCCH and belonging to a given PDSCH group and M is a value of the DAI in the PDSCH group.

7. The method of claim 1,
wherein the DCI comprises a downlink assignment index (DAI) for counting the PDSCHs, the DAI indicates information on a last PDSCH of the PDSCHs scheduled by the DCI, and wherein a total number of bits of the sent HARQ-ACK/NACK codebook is M×Nmax_p, where Nmax_p is a number of bits of a HARQ-ACK/NACK of each PDSCH and M is a value of the DAI in a PDSCH group.

8. The method of claim 1,
wherein the DCI comprises a downlink assignment index (DAI) for counting the PDCCHs, and,
wherein a total number of bits of the sent HARQ-ACK/NACK codebook is M×Nt, where M is a value of the DAI in a PDSCH group and Nt is a number of bits of a HARQ-ACK/NACK corresponding to one PDCCH, and
wherein Nt is predefined or semi-statically configured, and Nt is not less than a sum $\Sigma_{i=0}^{X} Ni$ of numbers of bits of the HARQ-ACK/NACKs of the PDSCHs scheduled by the one PDCCH, wherein Ni is a number of bits of the HARQ-ACK/NACK of an i-th PDSCH scheduled by the one PDCCH.

9. The method of claim 1,
wherein the DCI comprises zero power channel state information reference signal (ZP CSI-RS) information, and
wherein, where one DCI schedules a plurality of PDSCHs, the method further comprises:
performing rate matching on the plurality of PDSCHs according to the ZP CSI-RS information.

10. The method of claim 1,
wherein the DCI comprises control channel resource set (CORESET) information, and
wherein, for DCI for scheduling the plurality of PDSCHs, the CORESET information comprises a plurality of CORESETs.

11. The method of claim 1,
wherein the receiving the PDSCHs according to the DCI further comprises:
receiving a demodulation reference signal (DMRS) of the PDSCHs according to the DCI, and receiving the PDSCHs according to the DMRS,
wherein the DCI indicates a pattern of the DMRS, and the pattern of the DMRS comprises one or more of period information, time offset information, a duration and a symbol index; and/or
wherein the DCI indicates position information on the DMRS, and the position information on the DMRS is determined by time domain information on each PDSCH; or the position information on the DMRS is determined by time domain information on all PDSCHs scheduled by DCI of one PDCCH.

12. A method performed by a base station in a wireless communication system, comprising:
transmitting a physical downlink control channel (PDCCH), the PDCCH including downlink control information (DCI) for scheduling one or more physical downlink shared channels (PDSCHs);
transmitting the PDSCHs according to the DCI; and
receiving a hybrid automatic repeat request acknowledgement (HARQ-ACK/NACK) codebook for the PDSCHs,
wherein, for a plurality of PDSCHs that are fed back in the HARQ-ACK/NACK codebook, the PDSCHs are grouped according to a DCI format of the DCI for scheduling each of the PDSCHs,
wherein PDSCHs scheduled by DCI of a given DCI format belong to a given PDSCH group, and
wherein the codebook is determined for each PDSCH group.

13. The method of claim 12, wherein the DCI comprises a downlink assignment index (DAI), and in a situation where one DCI schedules a plurality of PDSCHs, the DAI indicates information on a first PDSCH of the plurality of PDSCHs, or indicates information on a last PDSCH of the plurality of PDSCHs.

14. A terminal in a wireless communication system, the terminal comprising:
- a transceiver;
- a memory configured to store at least one instruction; and
- a processor configured to:
    - receive a physical downlink control channel (PDCCH), the PDCCH including downlink control information (DCI) for scheduling one or more physical downlink shared channels (PDSCHs),
    - receive the PDSCHs according to the DCI,
    - transmit a hybrid automatic repeat request acknowledgement (HARQ-ACK/NACK) codebook for the PDSCHs,
    - group, for a plurality of PDSCHs that are fed back in the HARQ-ACK/NACK codebook, the PDSCHs according to a DCI format of the DCI for scheduling each of the PDSCHs, wherein PDSCHs scheduled by DCI of a given DCI format belong to a given PDSCH group, and
    - determine the codebook for each PDSCH group.

* * * * *